US012797284B2

(12) United States Patent
Silva de Macedo et al.

(10) Patent No.: US 12,797,284 B2
(45) Date of Patent: Nov. 17, 2026

(54) POSTURAL LIFTING EXOSKELETON FOR PEOPLE WITH DISABILITIES

(71) Applicant: Dell Products L.P., Round Rock, TX (US)

(72) Inventors: Jean Carlo Silva de Macedo, Campinas (BR); Paulo Cezar de Castro Junior, Campinas (BR); Valter Antonio Tunin, Americana (BR); Alex Sandro Brum de Carvalho, Sumaré (BR); Lidiane Castro Silva, Fortaleza (BR); José Adriano Filho, Fortaleza (BR); Francisco Fleury Uchoa Santos Júnior, Fortaleza (BR); Bruno da Silva Queiroz, Fortaleza (BR); Jessiane Rodrigues dos Santos, Ribeirão Preto (BR)

(73) Assignee: Dell Products L.P., Round Rock, TX (US)

(*) Notice: Subject to any disclaimer, the term of this patent is extended or adjusted under 35 U.S.C. 154(b) by 132 days.

(21) Appl. No.: 18/891,255

(22) Filed: Sep. 20, 2024

(65) Prior Publication Data

US 2026/0021006 A1 Jan. 22, 2026

Related U.S. Application Data

(60) Provisional application No. 63/673,102, filed on Jul. 18, 2024.

(51) Int. Cl.

*A61G 5/14* (2006.01)
*A61H 1/00* (2006.01)
(Continued)

(52) U.S. Cl.

CPC ............... *A61H 3/008* (2013.01); *A61G 5/14* (2013.01); *A61H 1/005* (2013.01); *A61G 5/04* (2013.01);
(Continued)

(58) Field of Classification Search

CPC .... A61H 3/008; A61H 1/005; A61H 2209/00; A61G 5/14; A61G 5/04; A61G 2200/34; A61G 2200/36
See application file for complete search history.

(56) References Cited

U.S. PATENT DOCUMENTS

| | | | | |
|---|---|---|---|---|
| 3,787,089 A * | 1/1974 | Wrethander | A61G 5/1054 | 297/DIG. 10 |
| 4,054,319 A * | 10/1977 | Fogg, Jr. | A61G 5/042 | 297/DIG. 10 |

(Continued)

FOREIGN PATENT DOCUMENTS

| | | | |
|---|---|---|---|
| CN | 105832474 A * | 8/2016 | A61H 1/001 |
| CN | 106344288 A * | 1/2017 | A61G 5/14 |

(Continued)

OTHER PUBLICATIONS

Gabriella Coelho Vieira de Melo Alves et al., "Immediate Effect of an Orthostatic Device in Amputees who Practice Physical Activity" Rev Bras Med Esporte, 2023, vol. 29, (5 pages).

(Continued)

*Primary Examiner* — John Olszewski
*Assistant Examiner* — Matthew D Lee
(74) *Attorney, Agent, or Firm* — Chamberlain, Hrdlicka, White, Williams & Aughtry; Aly Z. Dossa

(57) ABSTRACT

A postural lifting exoskeleton includes: a chair, in which (i) the chair includes a first portion and a second portion and (ii) a first armrest is affixed to a right side of the first portion and a second armrest is affixed to a left side of the first portion;
(Continued)

a set of electric actuators including at least a first electric actuator and a second electric actuator, in which, upon receiving a first request from a user via a first control panel, a second control panel triggers at least the first electric actuator and the electric actuator to transform the exoskeleton from a first position to a second position; and a footplate, in which, once the user is in an orthostatic position, the footplate's oscillatory movement causes the user's ankles to move upwards and downwards in order to improve the user's blood circulation.

20 Claims, 34 Drawing Sheets

(51) Int. Cl.
*A61H 3/00* (2006.01)
*A61G 5/04* (2013.01)

(52) U.S. Cl.
CPC .. *A61H 2003/006* (2013.01); *A61H 2003/007* (2013.01); *A61H 2201/0149* (2013.01); *A61H 2201/0157* (2013.01); *A61H 2201/0173* (2013.01); *A61H 2201/0192* (2013.01); *A61H 2201/0196* (2013.01); *A61H 2201/1207* (2013.01); *A61H 2201/1623* (2013.01); *A61H 2201/164* (2013.01); *A61H 2201/1642* (2013.01); *A61H 2201/1652* (2013.01); *A61H 2201/1661* (2013.01); *A61H 2201/1664* (2013.01); *A61H 2201/503* (2013.01); *A61H 2201/5035* (2013.01); *A61H 2203/0431* (2013.01); *A61H 2203/0487* (2013.01); *A61H 2205/12* (2013.01); *A61H 2209/00* (2013.01)

(56) References Cited

U.S. PATENT DOCUMENTS 4,455,050 A * 6/1984 Kubek .................. A61G 5/128 297/464
5,346,280 A * 9/1994 Deumite .................. A61G 5/14 297/DIG. 10
5,366,036 A * 11/1994 Perry .................... A61G 5/006 180/907
5,556,121 A * 9/1996 Pillot ...................... A61G 5/14 297/DIG. 10
6,796,928 B1 * 9/2004 Christopher ....... A63B 22/0056 482/52
2001/0018564 A1 * 8/2001 Manor ................ A61H 9/0078 601/152
2007/0063480 A1 * 3/2007 Porcheron ............. A61G 5/127 280/304.1
2011/0179577 A1 * 7/2011 Gould ..................... A61G 5/12 5/652
2012/0022412 A1 * 1/2012 Bryant ................ A61H 1/0266 601/24
2014/0138995 A1 * 5/2014 Leib ....................... A61H 3/008 297/283.2
2015/0283009 A1 * 10/2015 Borisoff ............... A61H 1/0262 280/47.41
2017/0055713 A1 * 3/2017 Ravn ........................ A61G 5/14
2019/0053970 A1 * 2/2019 Vatti .................... A61G 7/1076
2019/0282423 A1 * 9/2019 Nam ...................... B25J 9/0006
2020/0179195 A1 * 6/2020 Huang ................... A61G 5/128
2021/0401643 A1 * 12/2021 Moore ..................... A61G 5/12
2021/0401644 A1 * 12/2021 Villarreal Suarez ... A61G 5/041
2022/0313510 A1 * 10/2022 Shenhod Malihi .. A61H 1/0262
2023/0039084 A1 * 2/2023 Okolo ...................... A61G 5/04
2024/0033158 A1 * 2/2024 Eidelberg ............. A61H 1/0262
2024/0415711 A1 * 12/2024 Hendriks ............. A61G 5/1067
2025/0326108 A1 * 10/2025 Kube ................. A63C 17/0073
2026/0034002 A1 * 2/2026 Johnson ................... A61G 5/04

FOREIGN PATENT DOCUMENTS

CN 112932890 A * 6/2021 ............. A61H 23/02
CN 113855416 A * 12/2021 ............. A61B 5/112
KR 20110101851 A * 9/2011 ............... A61G 5/14
KR 20140088757 A * 7/2014 ............... A61G 5/04
KR 20160149679 A * 12/2016 ........... A61G 5/1056
WO WO-2017121576 A1 * 7/2017 ............... A61G 5/14

OTHER PUBLICATIONS

Robert B. Dunn Ph.D. et al., "Follow-up Assessment of Standing Mobility Device Users" Assistive Technology: The Official Journal of RESNA, 1998 (11 pages).
S. Goemaere et al., "Bone Mineral Status in Paraplegic Patients Who Do or Do Not Perform Standing", Osteoporosis Int., European Foundation for Osteoporosis, 1994 (6 pages).
B. Issekutz, Jr. et al., "Effect of Prolonged Bed Rest on Urinary Calcium Output" Division of Research, The Lankenau Hospital, Philadelphia, Pennsylvania, dowloaded from https://journals.physiology.org/journal/jappl, 1966 (8 pages).
S. James Walter PHD et al., "Indications for a Home Standing Program for Individuals with Spinal Cord Injury", The Journal of Spinal Cord Medicine, vol. 22 No. 3, 1999, (8 pages).
Julianna Arva, MS, ATP et al., "RESNA Position on the Application of Wheelchair Standing Devices", Assistive Technology, ISSN: 1040-0435 print/1949-3614 online, 2009 (8 pages).
Weidiner, Robert et al., "Human Hybrid Robot: A new concept for supporting manual assembly tasks" German Academic Society for Production Engineering (WGP) 2013, ResearchGate, (11 pages).
George R. Cybulski, MD et al., "Standing Performance of Persons with Paraplegia" Arch Phys Med Rehab vol. 67, Feb. 1986. (6 pages).
Brad E. Dicianno et al., "The future of the provision process for mobility assistive technology: a survey of providers" Disability and Rehabilitation: Assistive Technology, Disability and Rehabilitation: Assistive Technology. Published online Mar. 20, 2018. (9 pages).

* cited by examiner

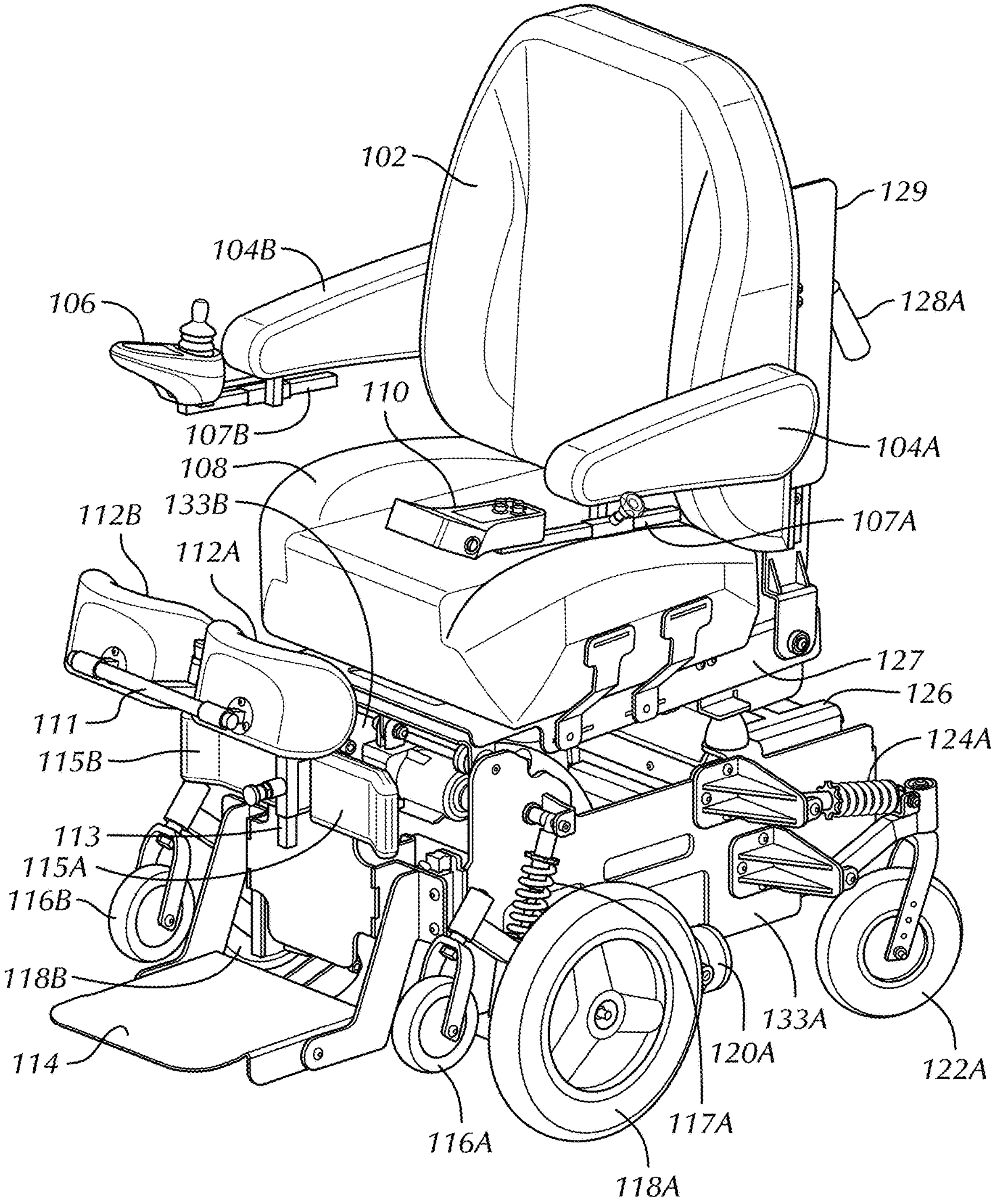
FIG. 1.1

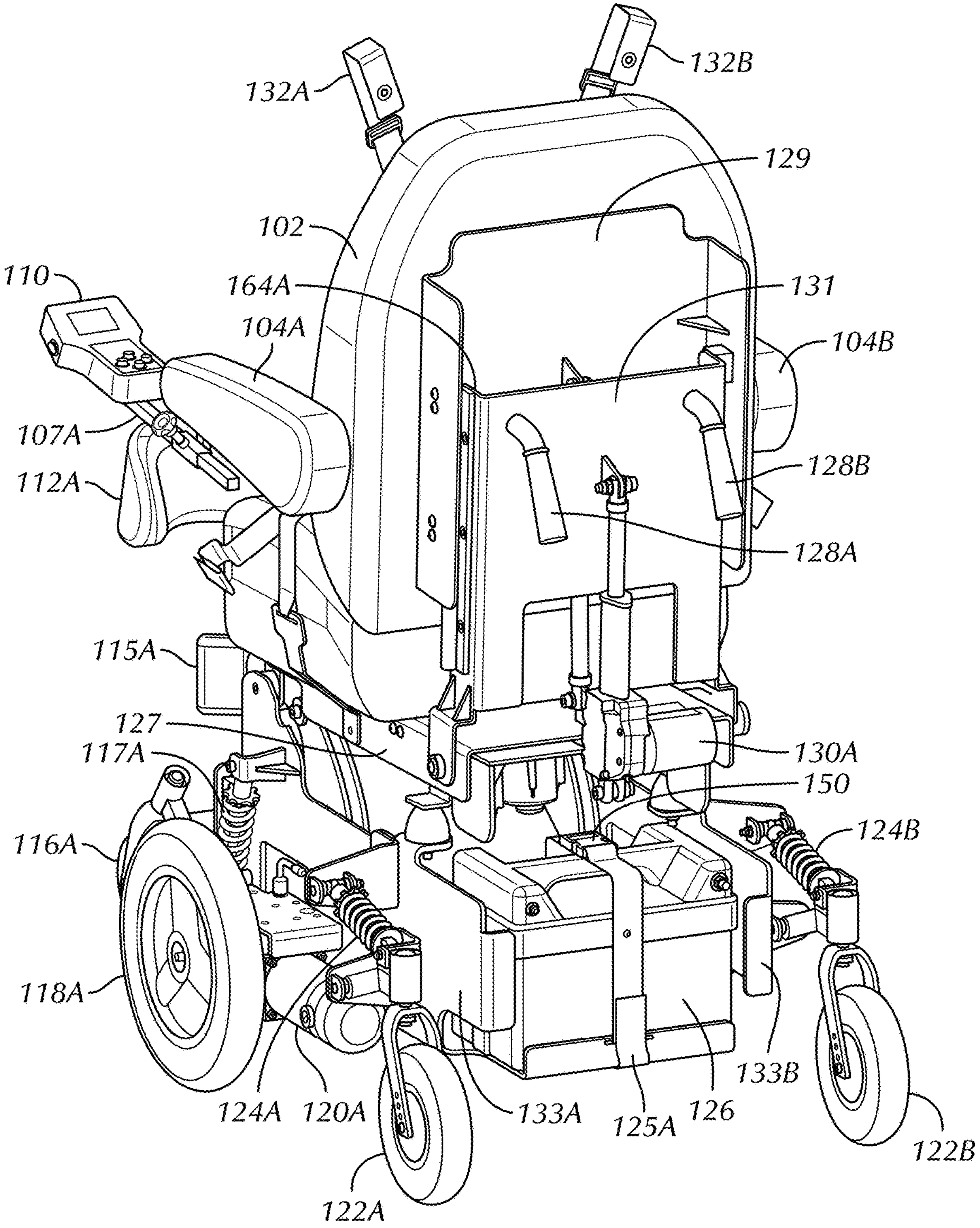
FIG. 1.2

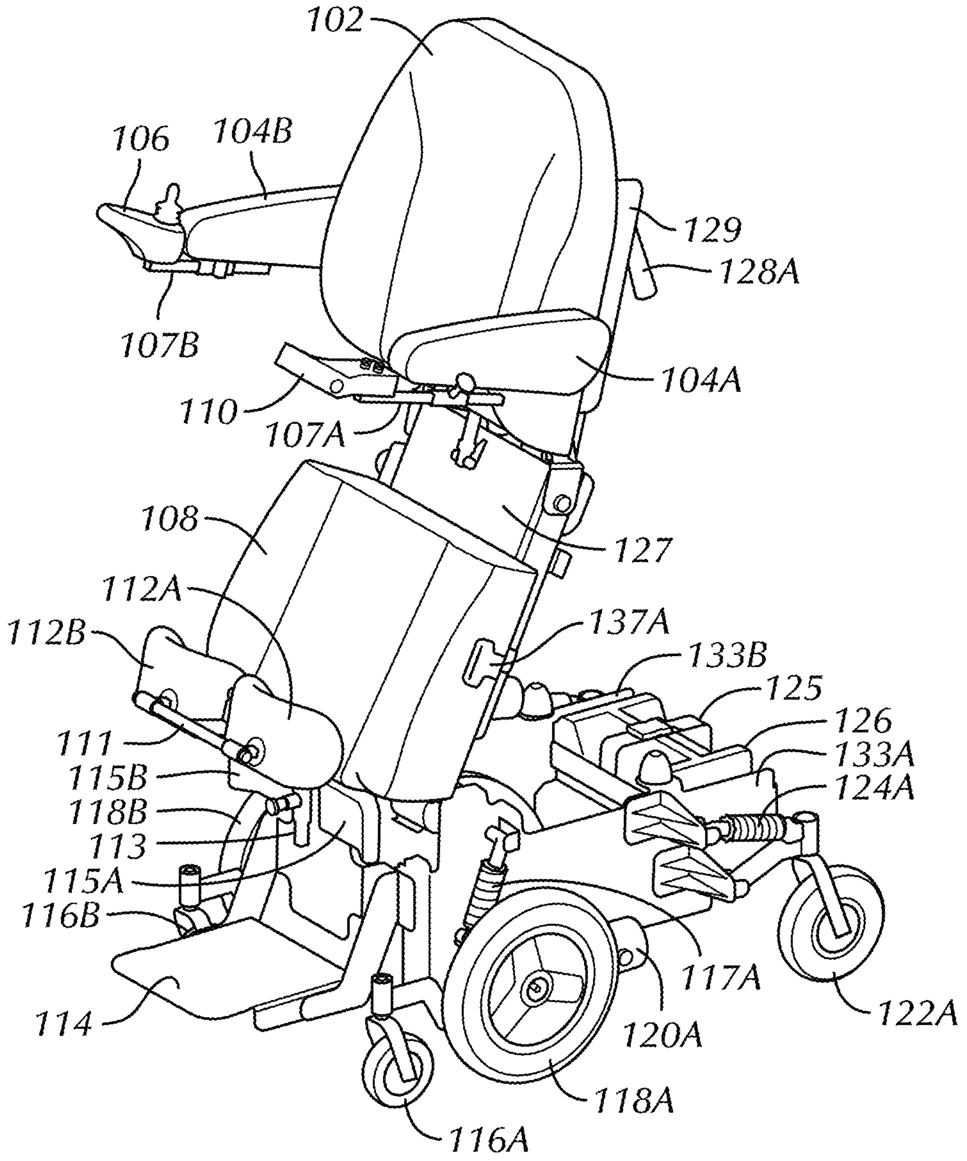
FIG. 1.3

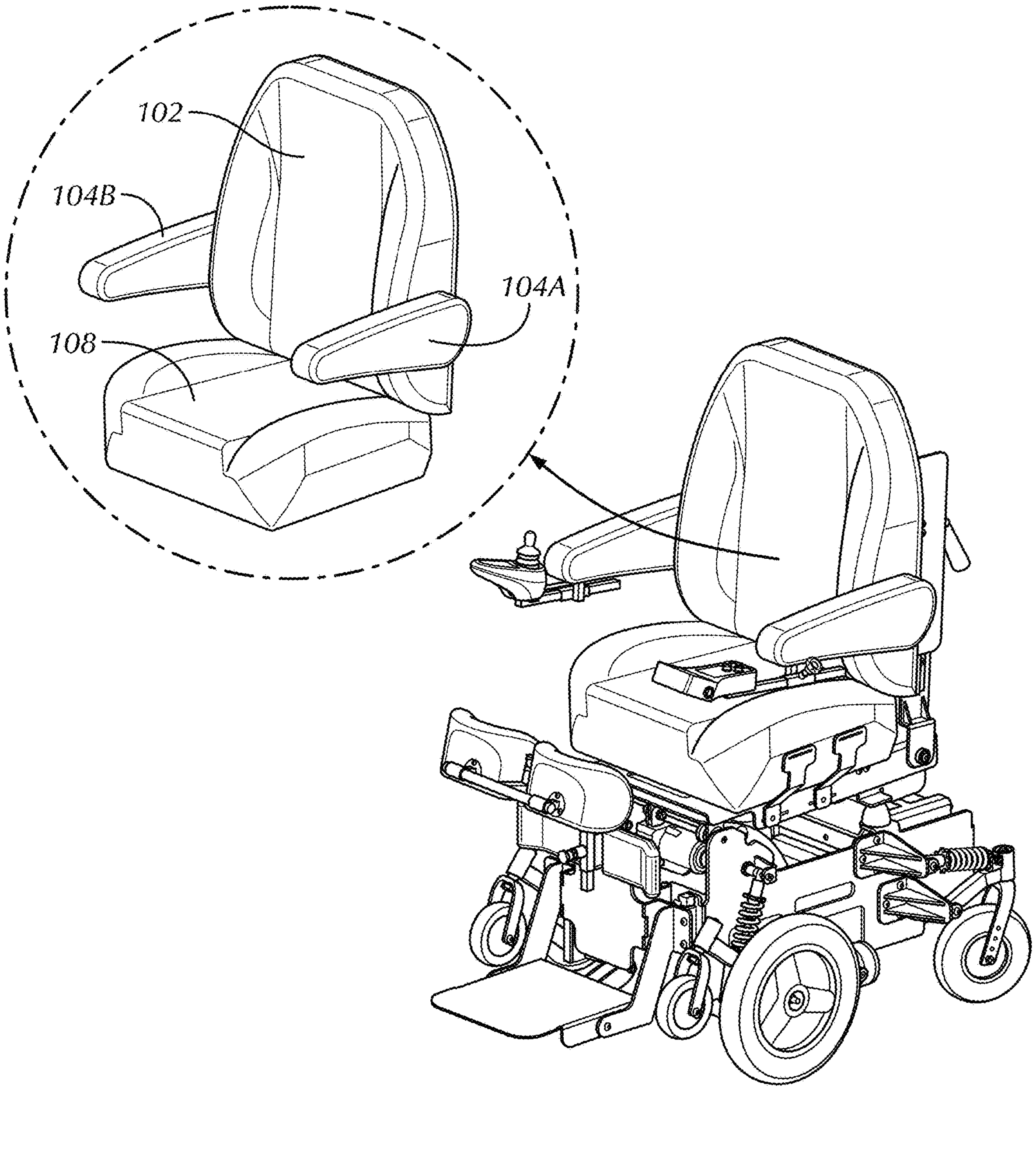
FIG. 1.4

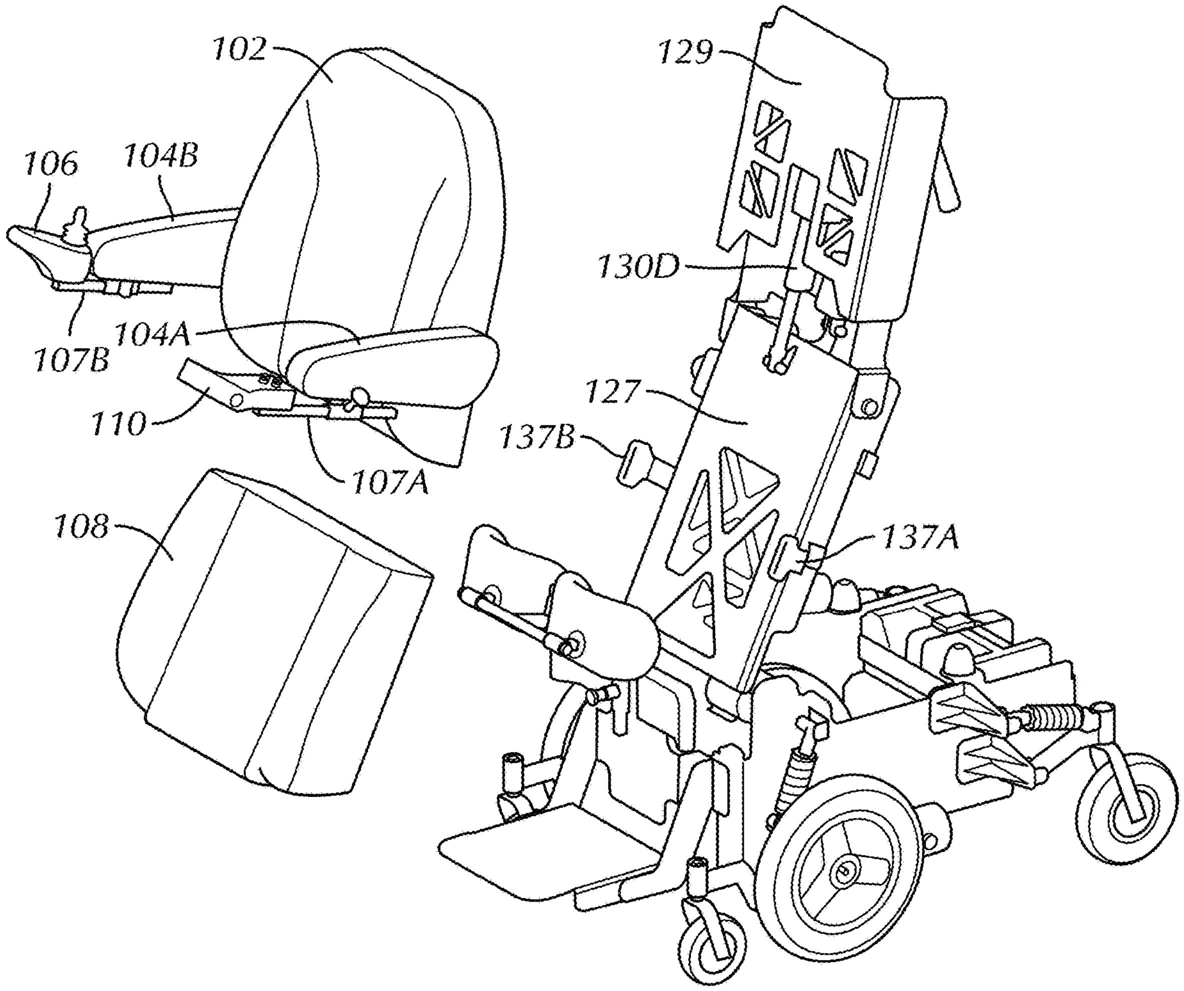
FIG. 1.5

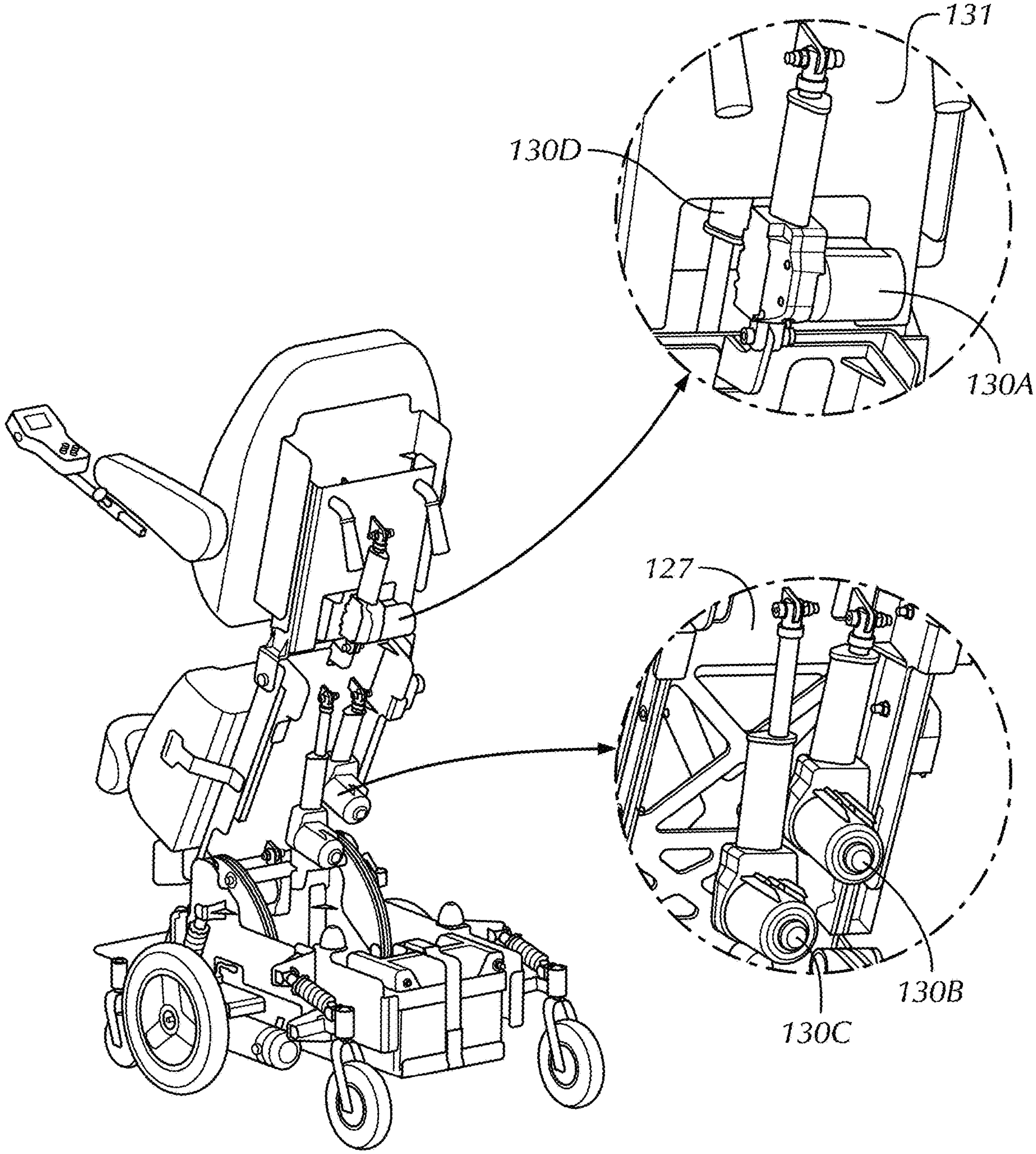
*FIG. 1.6*

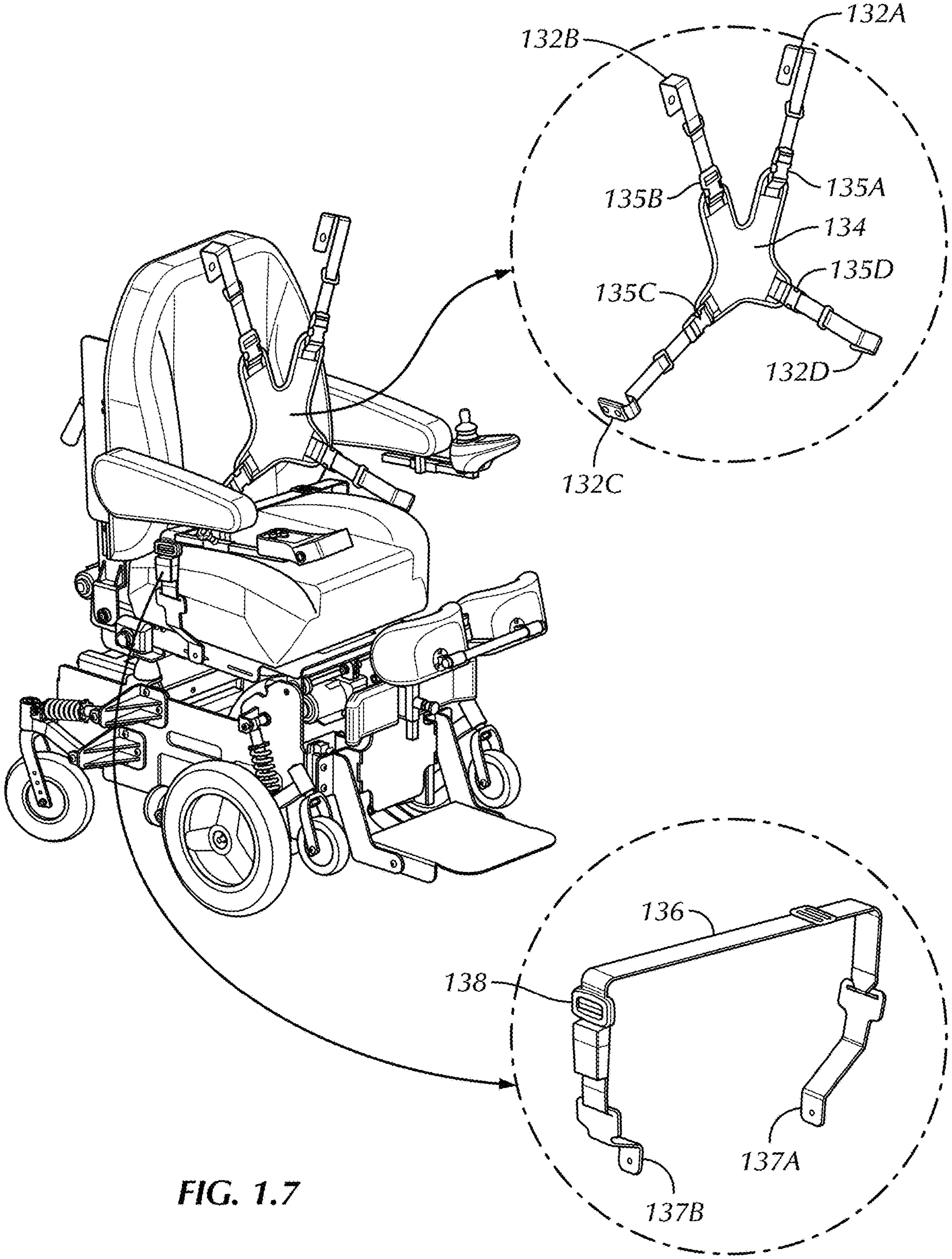
FIG. 1.7

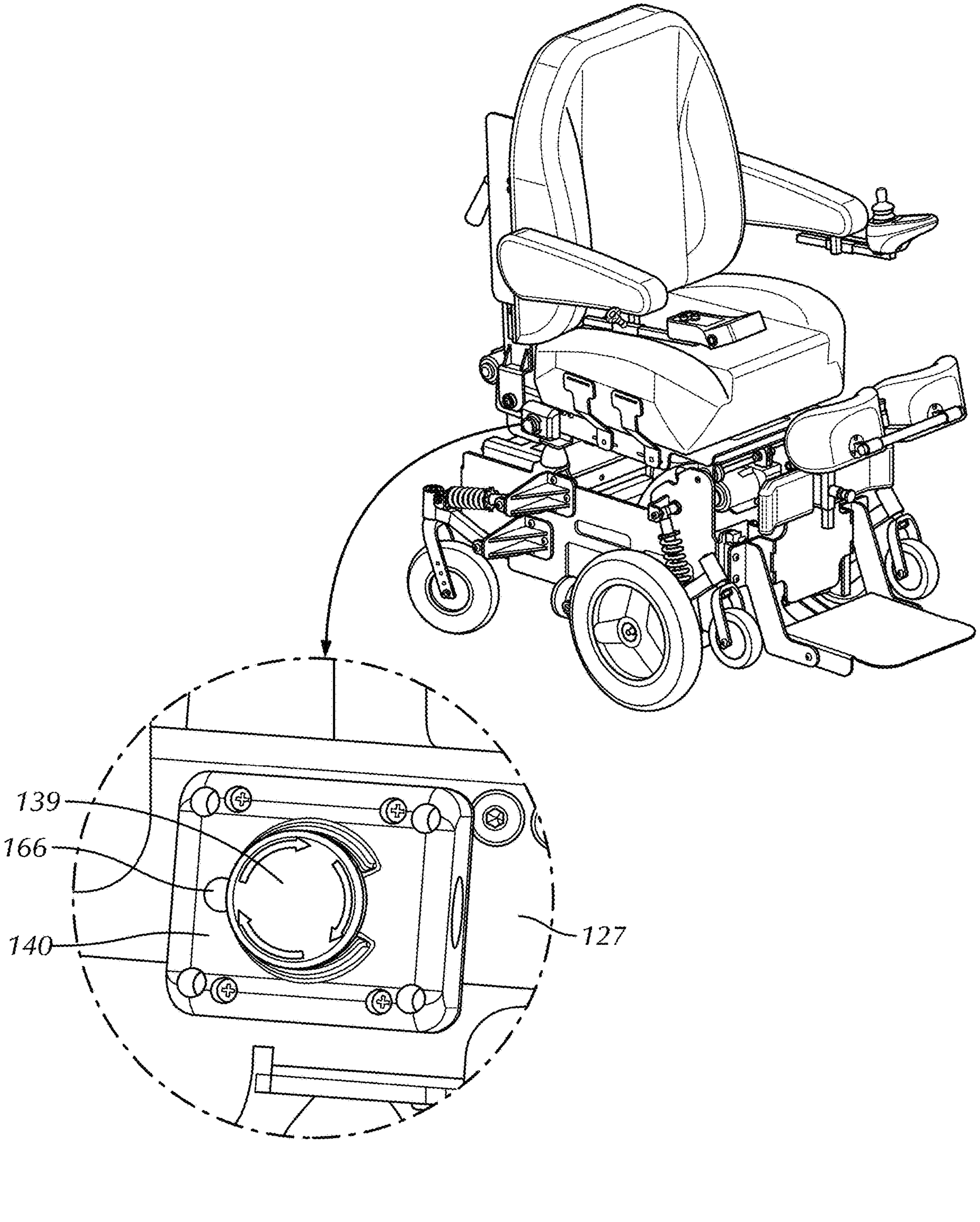
FIG. 1.8

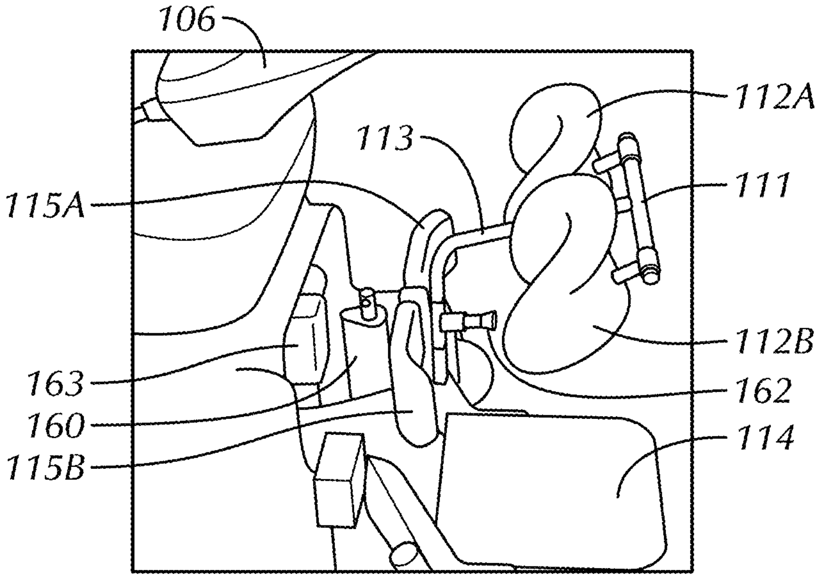
FIG. 1.9

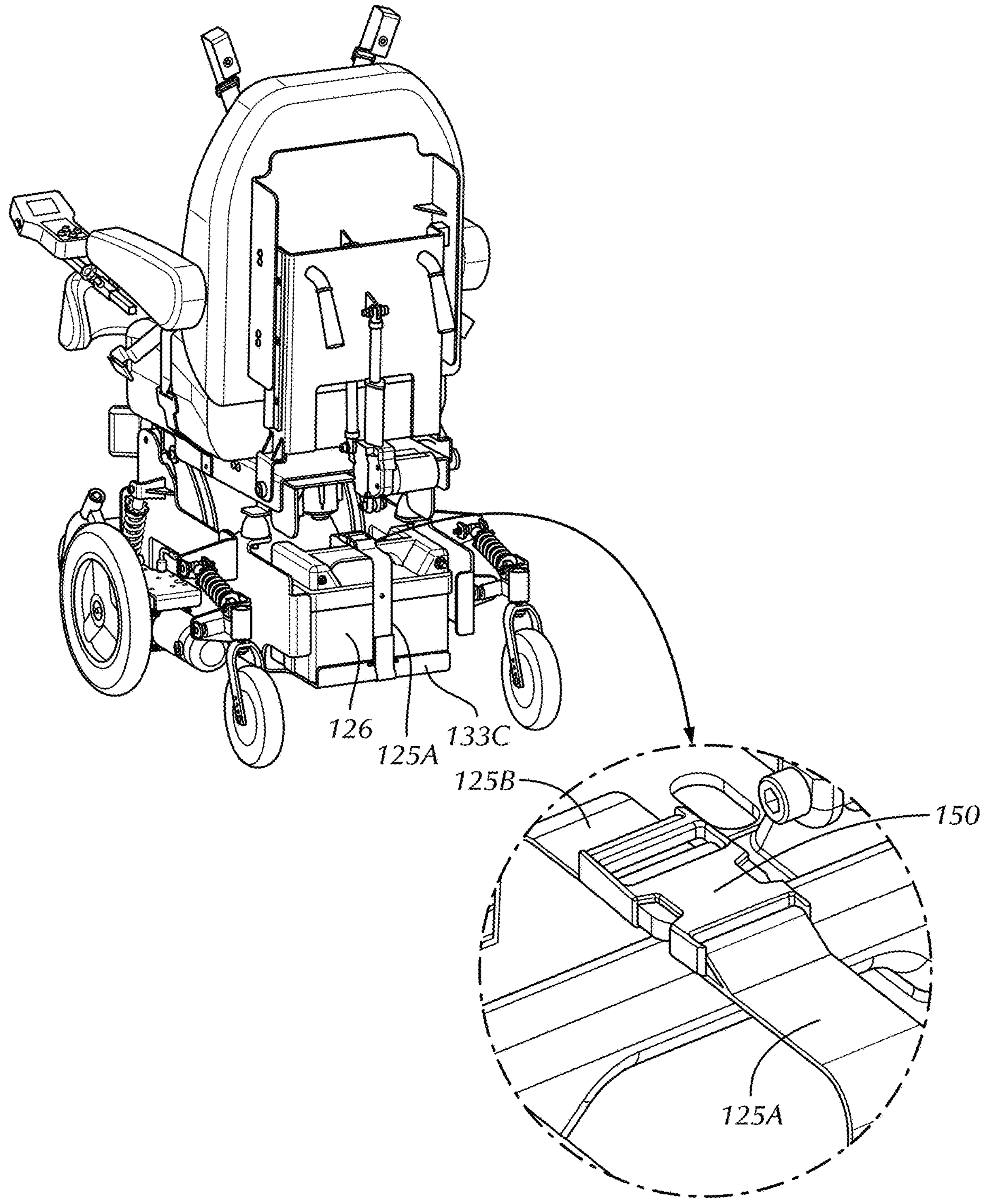
FIG. 1.10A

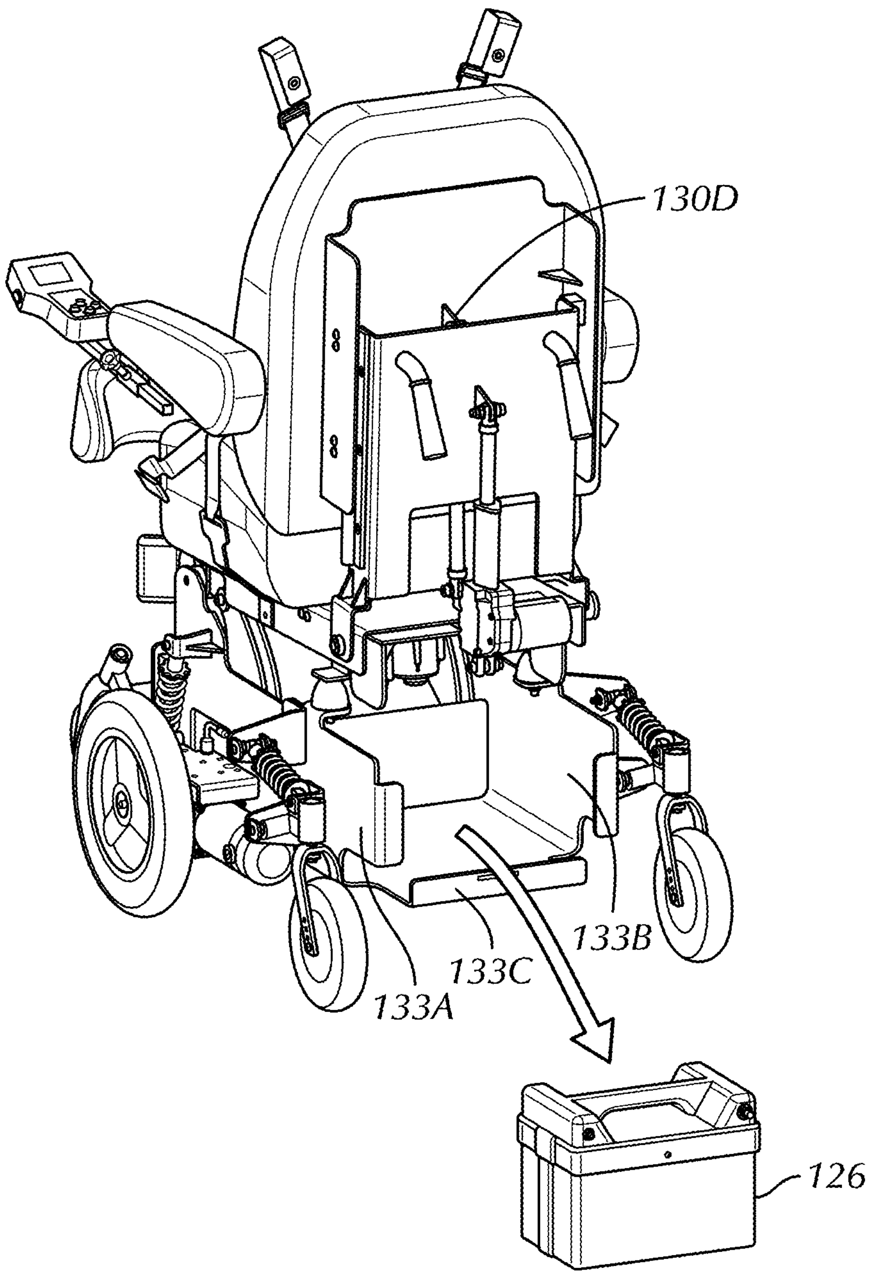
FIG. 1.10B

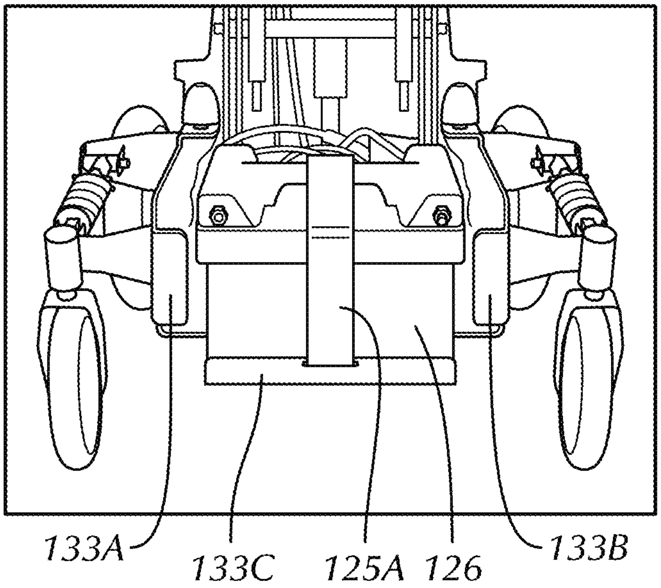
FIG. 1.10C
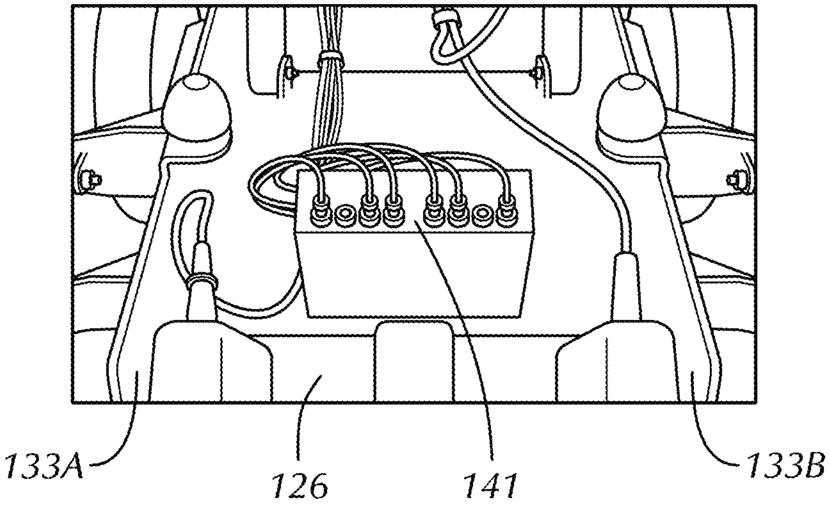
FIG. 1.10D

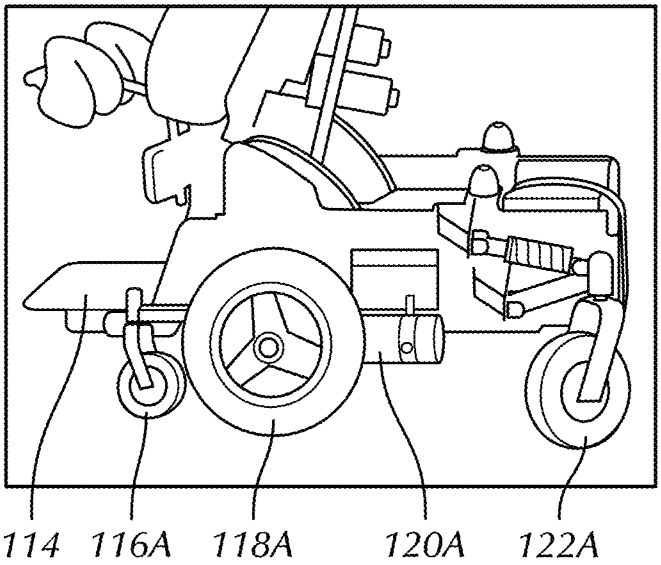
FIG. 1.11A
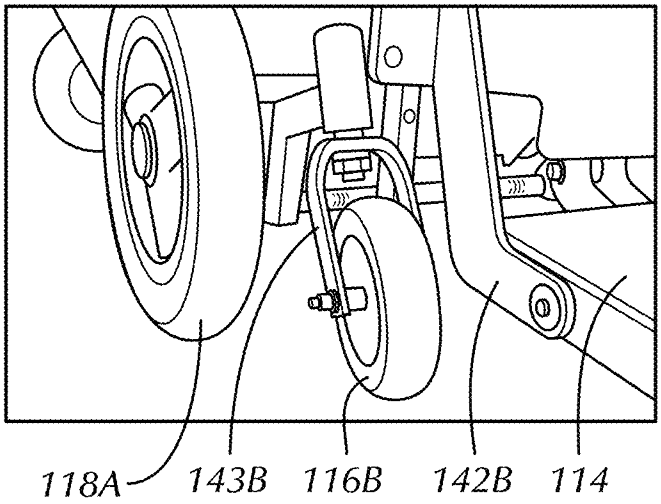
FIG. 1.11B

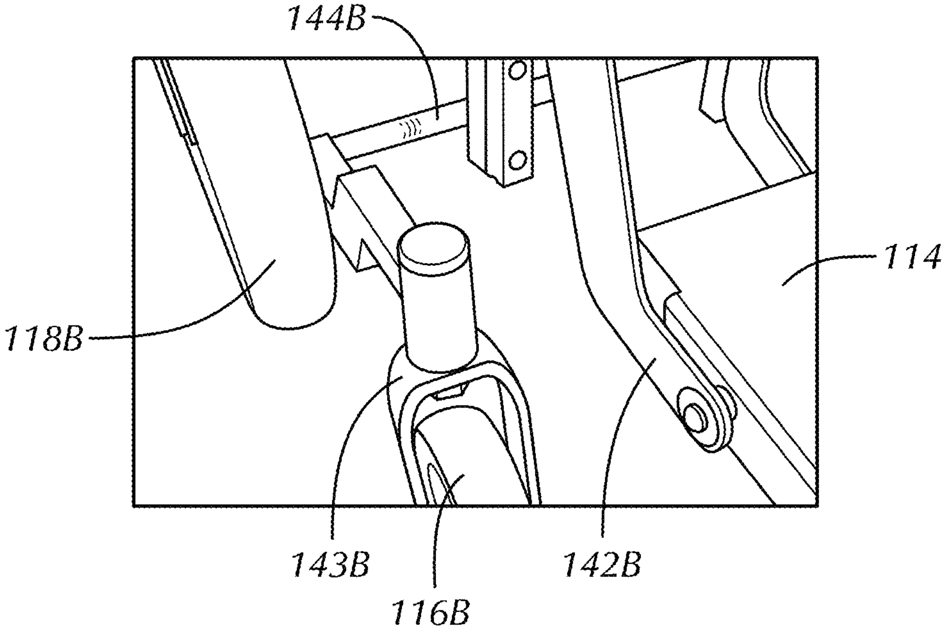
FIG. 1.11C
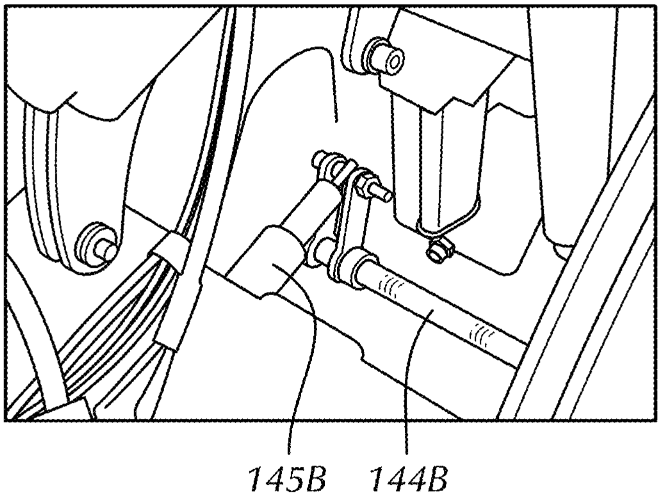
FIG. 1.11D

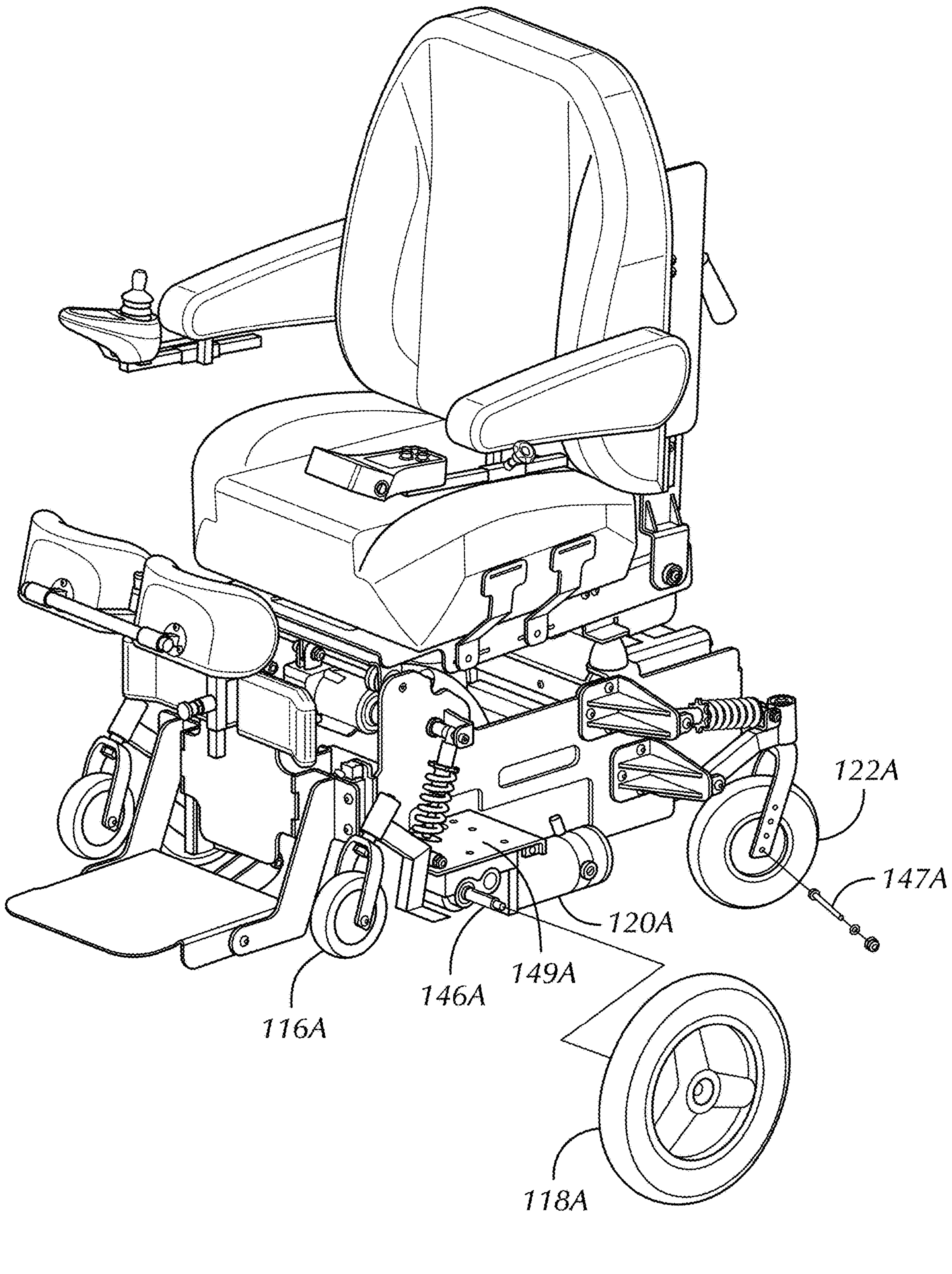
FIG. 1.12A

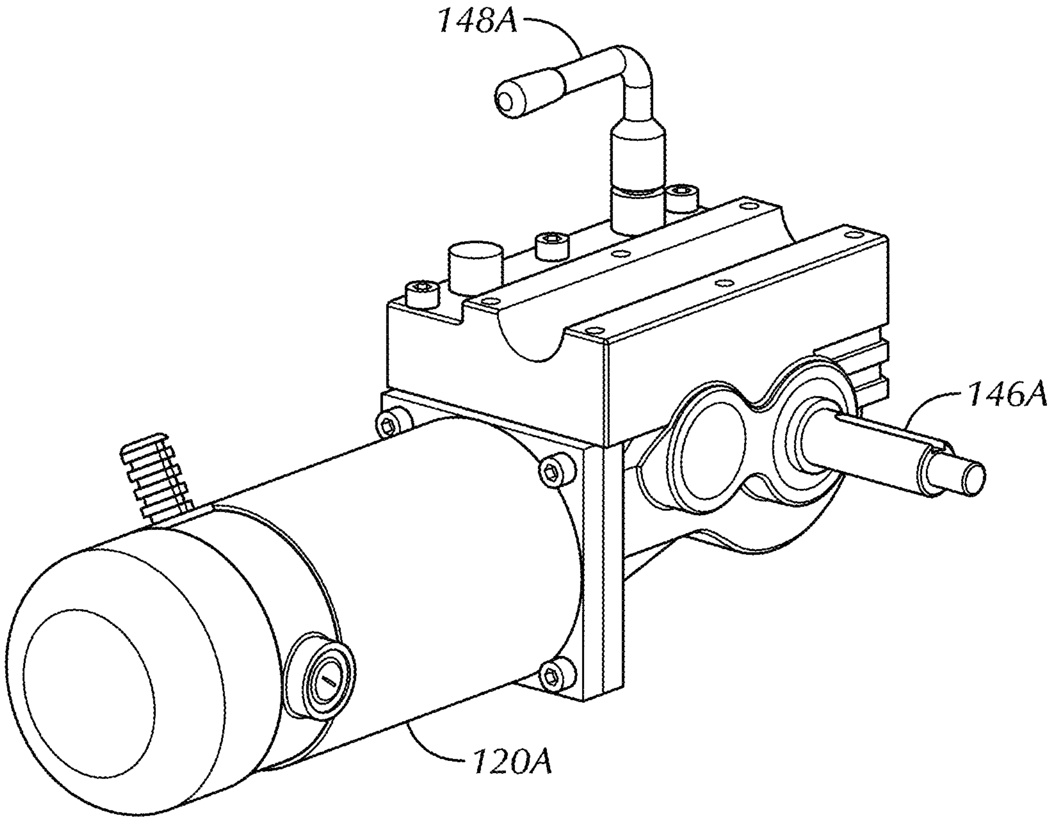
FIG. 1.12B

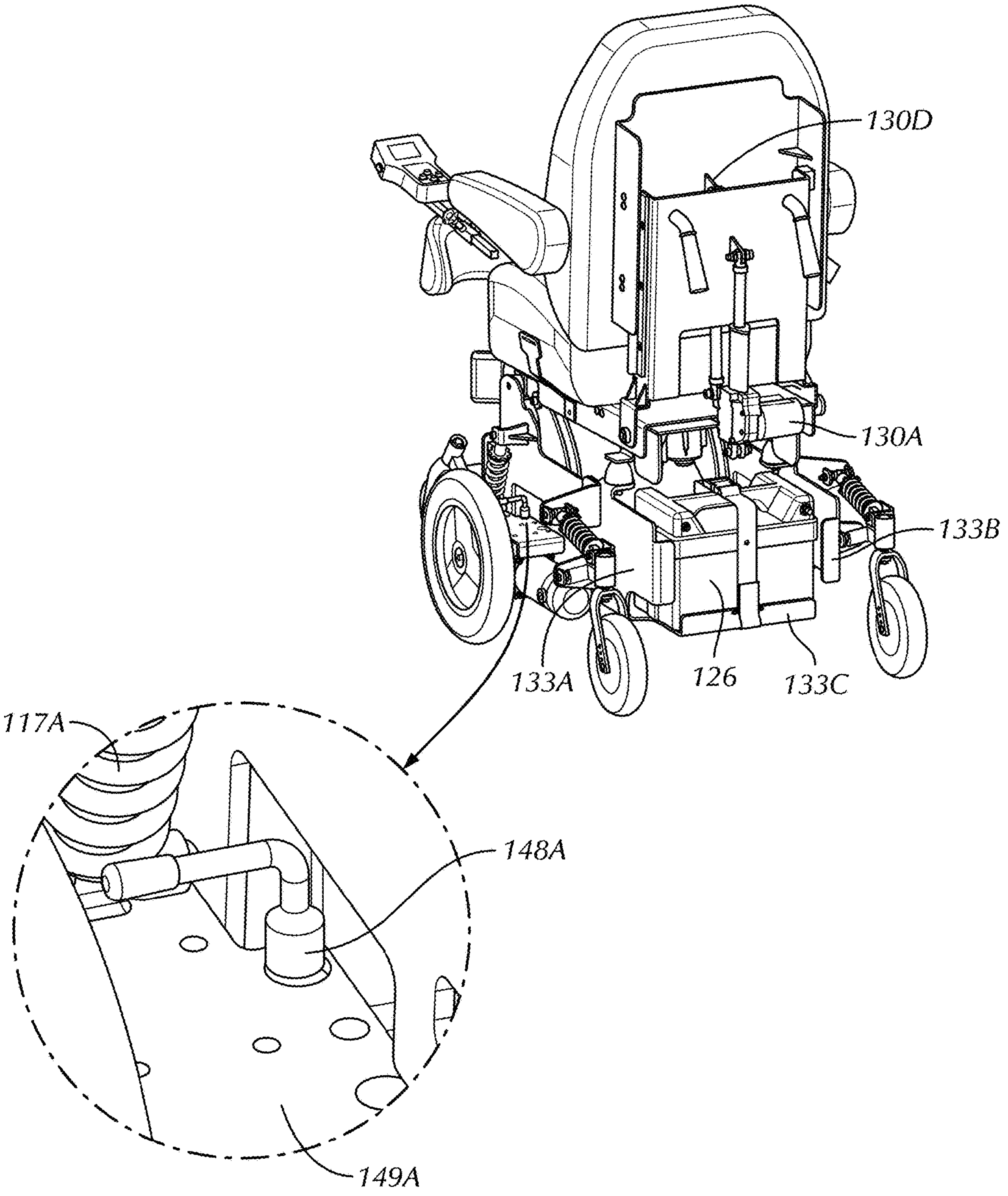
FIG. 1.12C

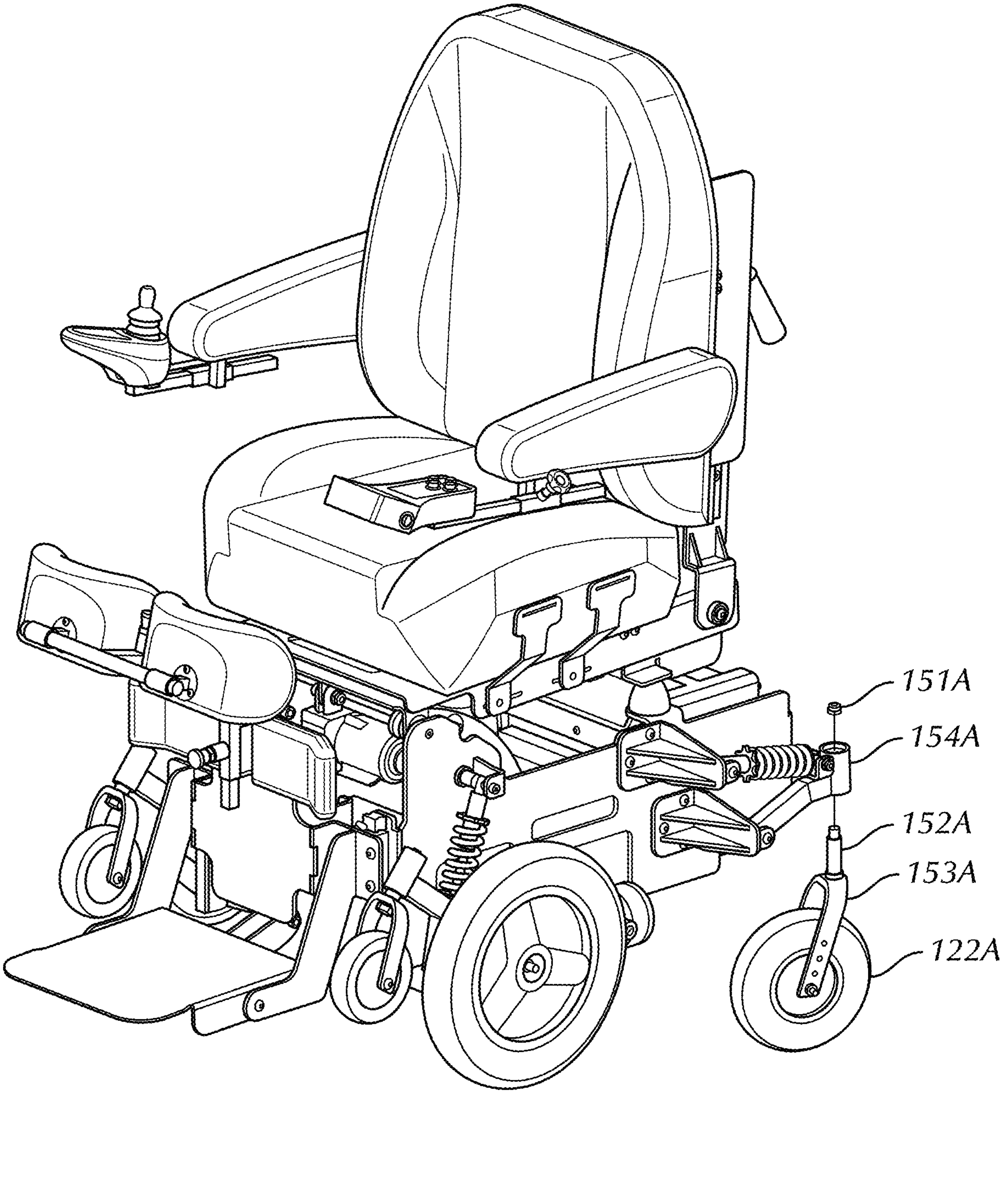
FIG. 1.12D

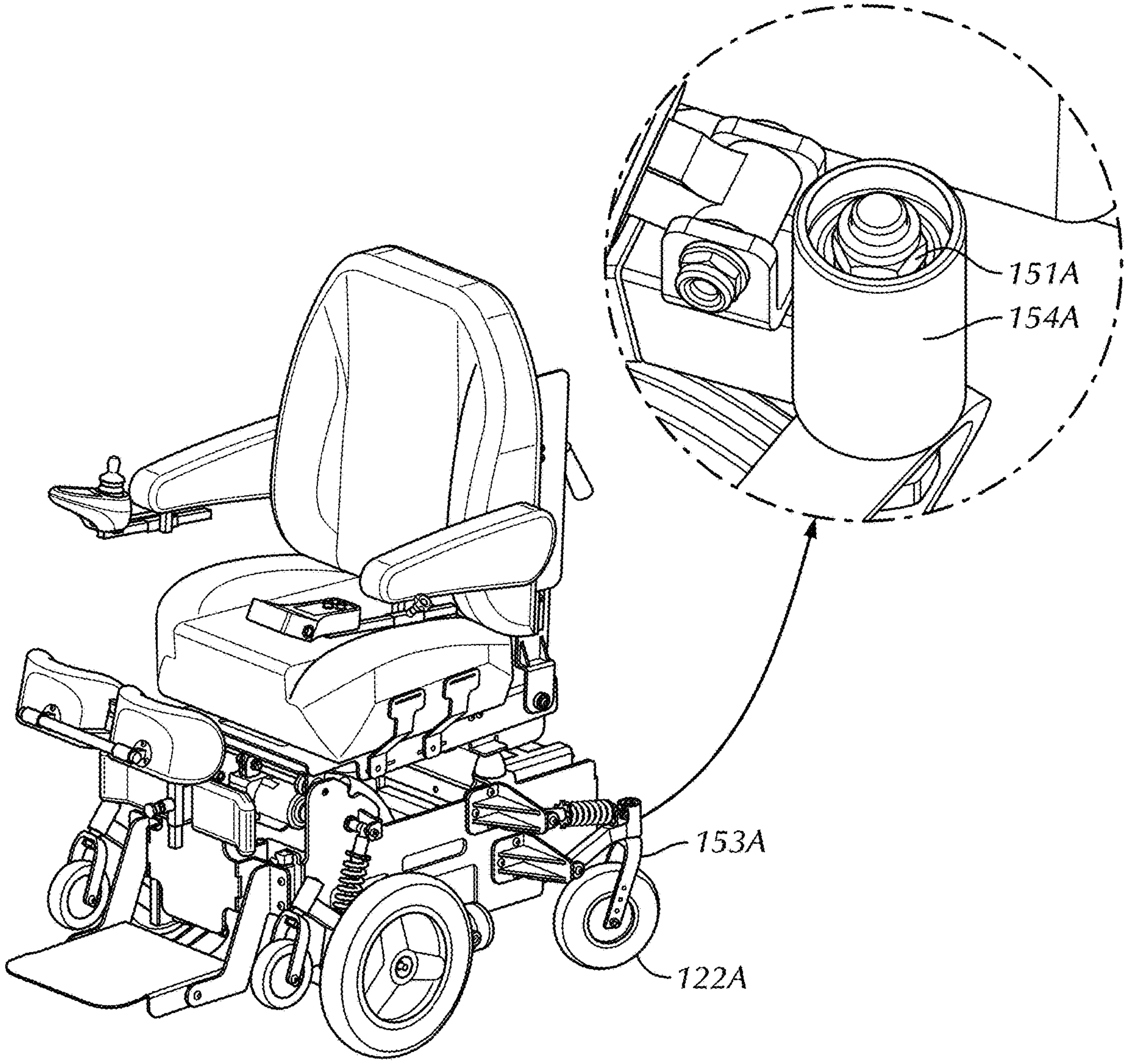
FIG. 1.12E

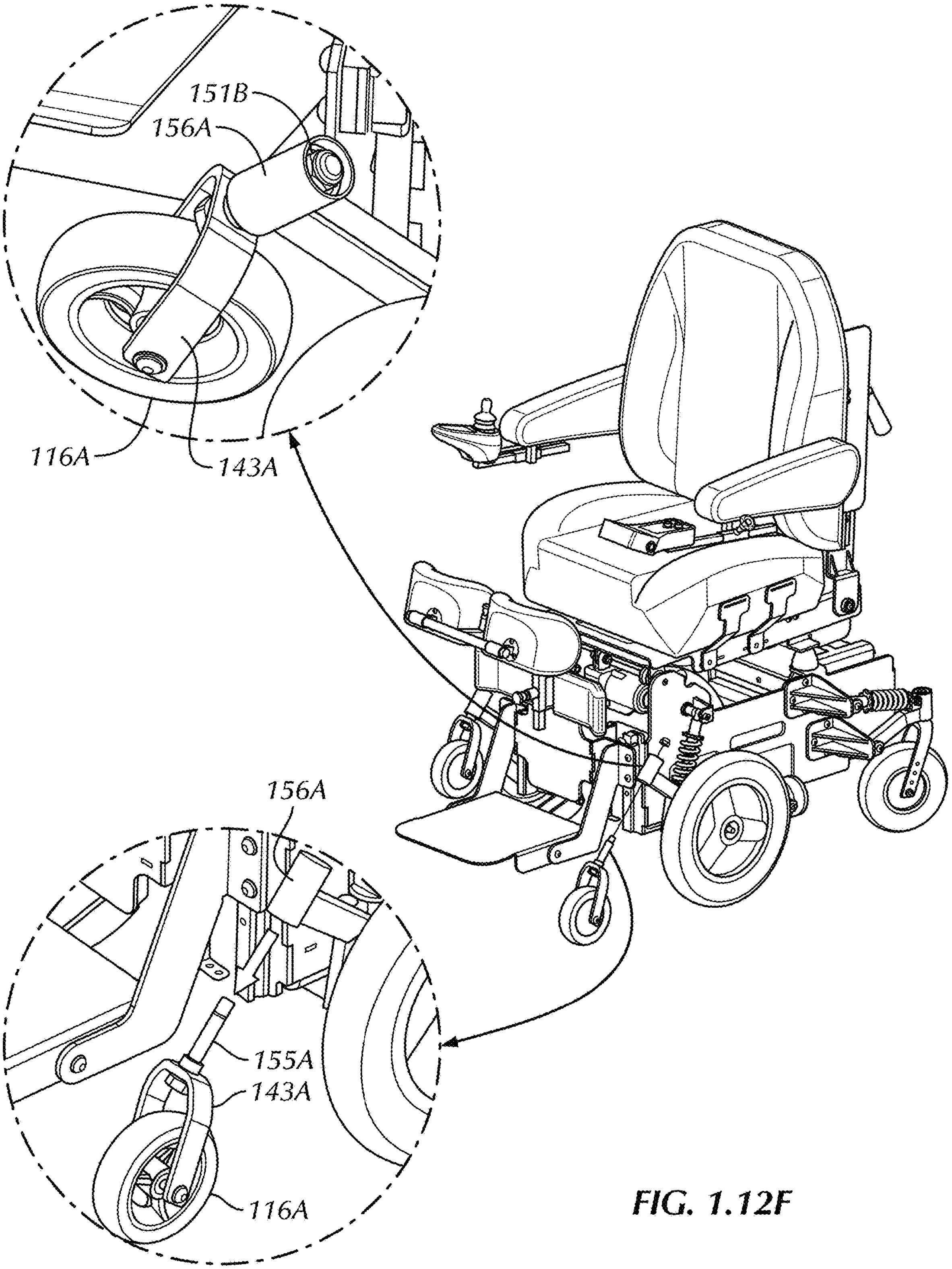
FIG. 1.12F

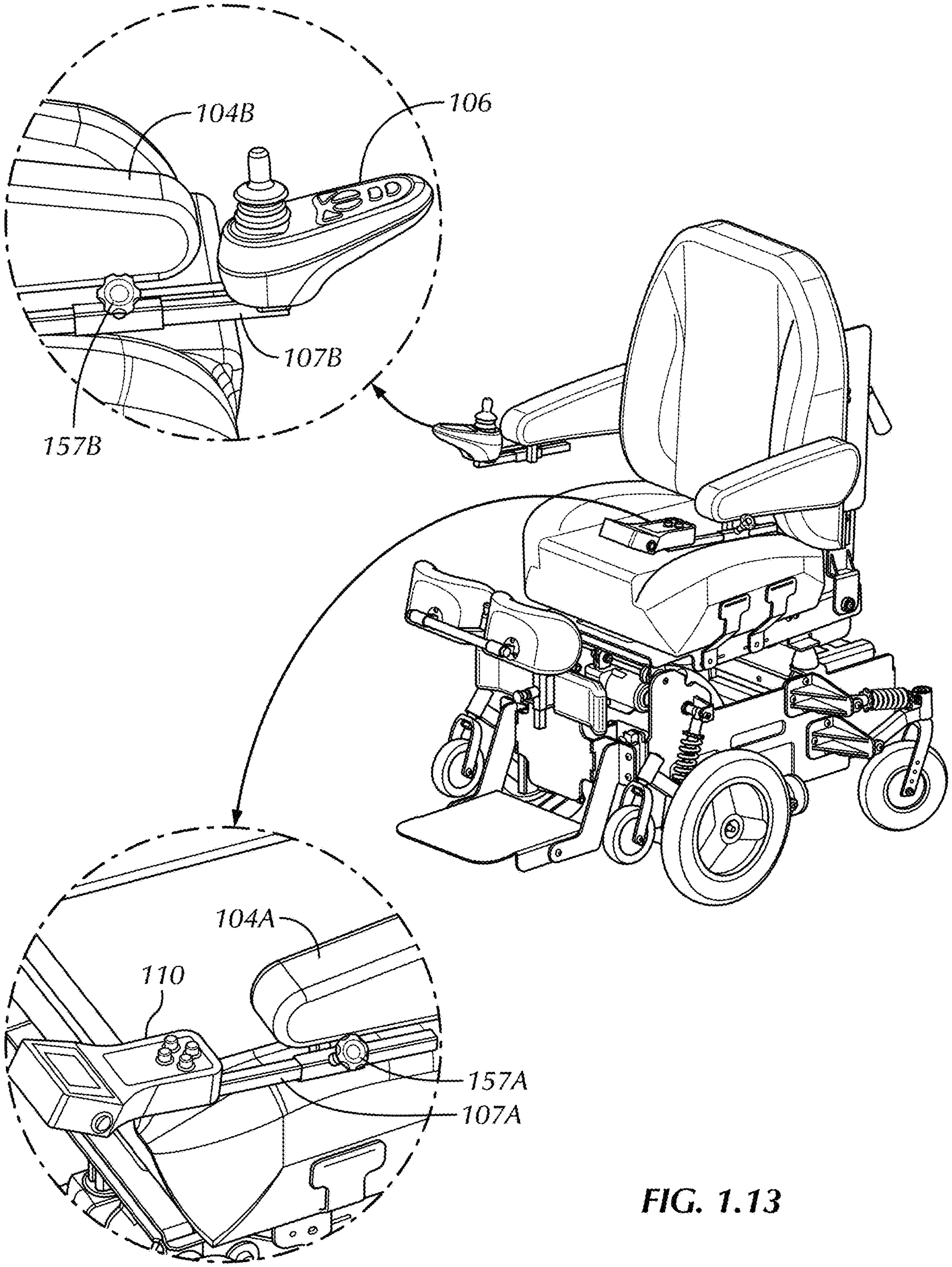
FIG. 1.13

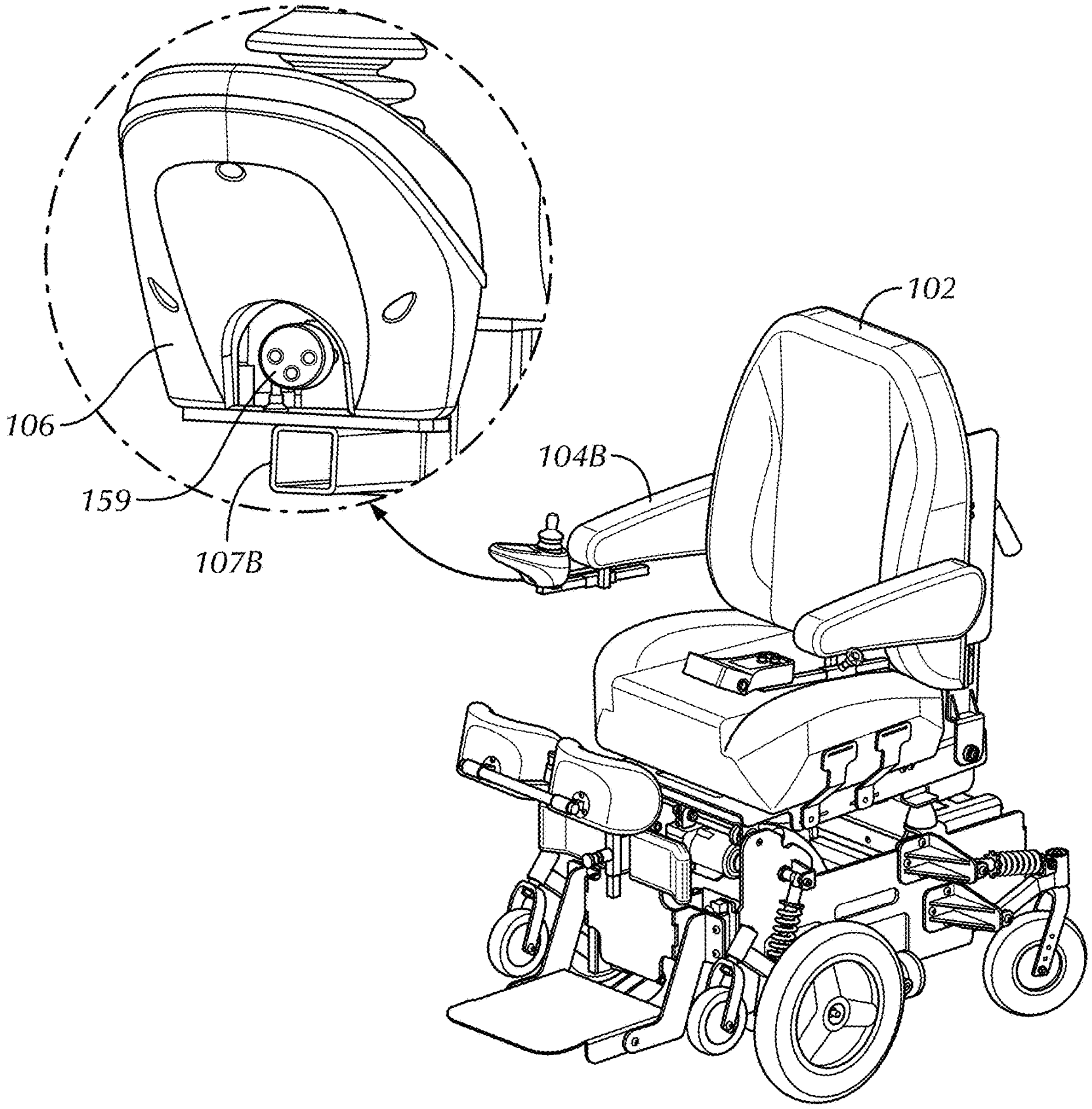
FIG. 1.14

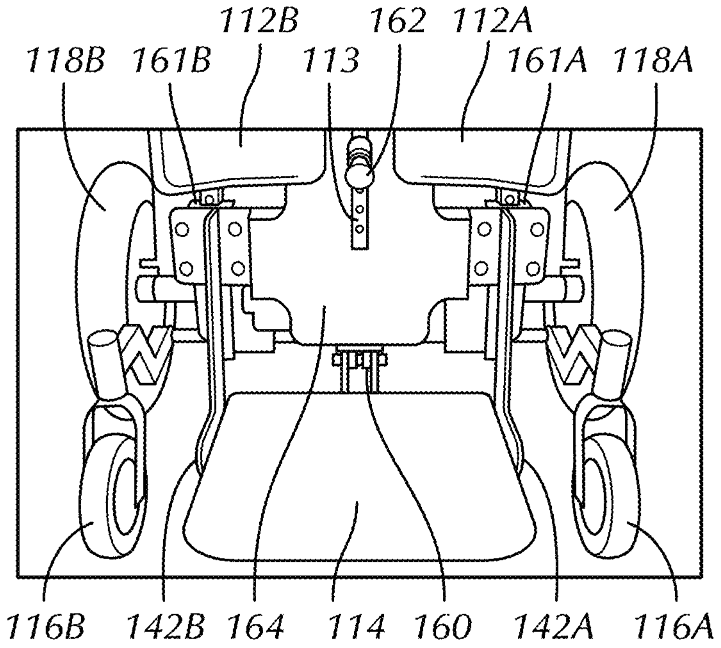
FIG. 1.15A
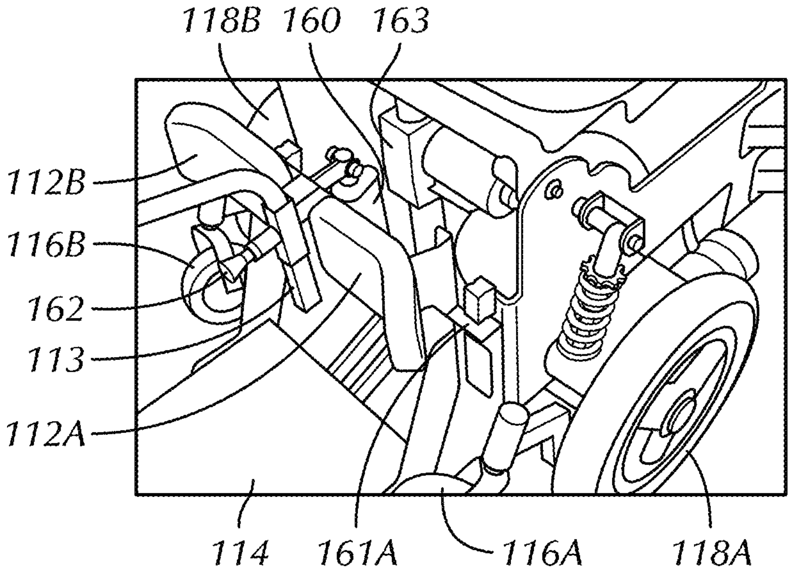
FIG. 1.15B

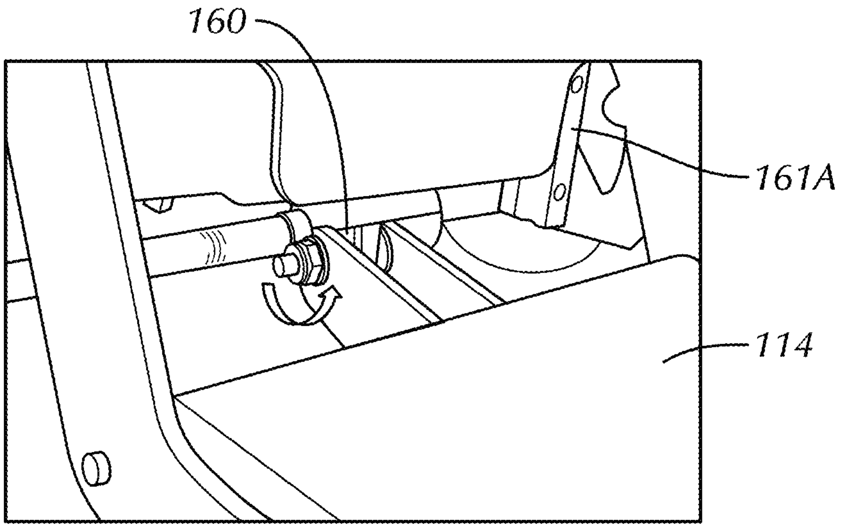
FIG. 1.15C

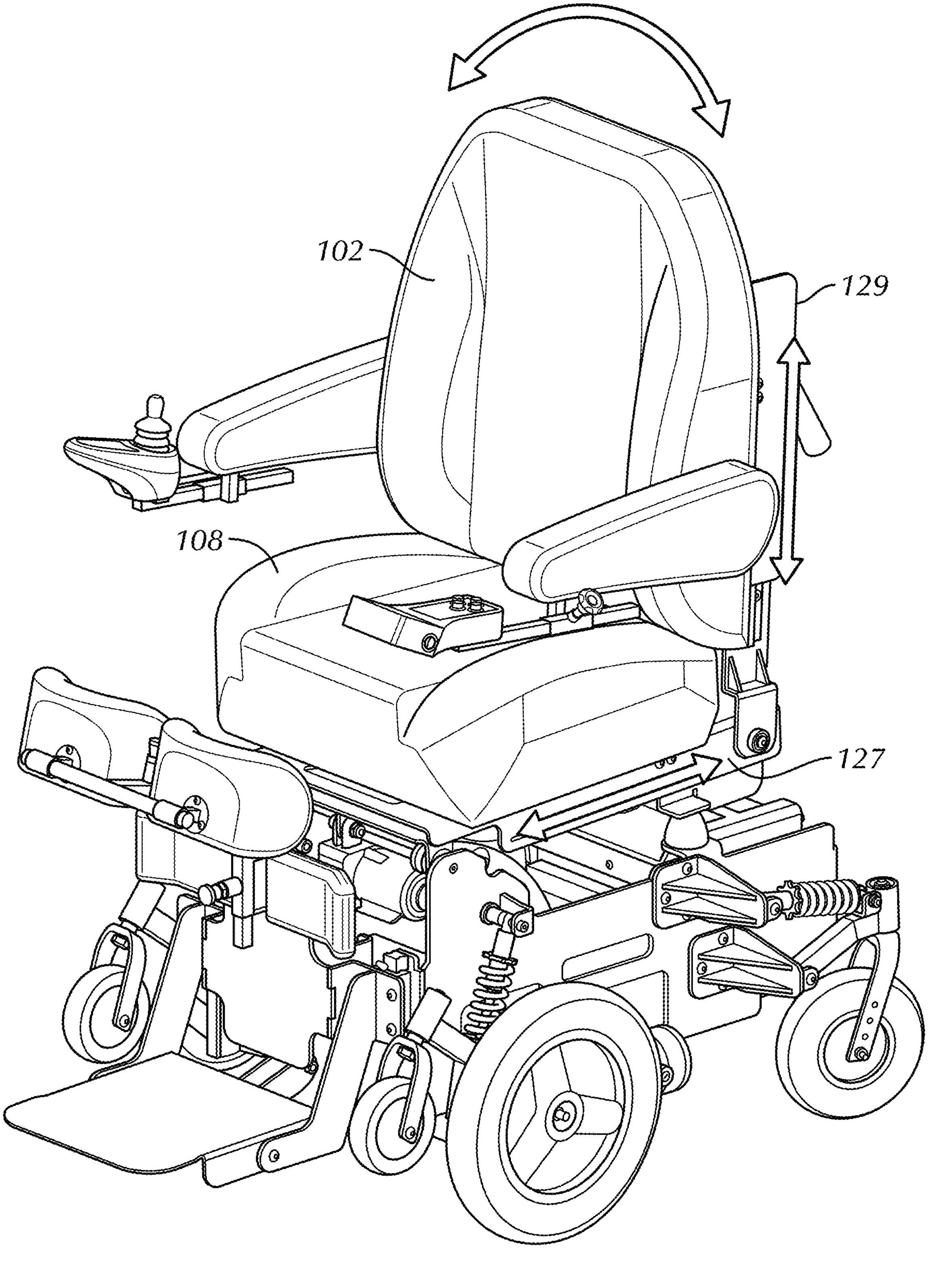
FIG. 1.16

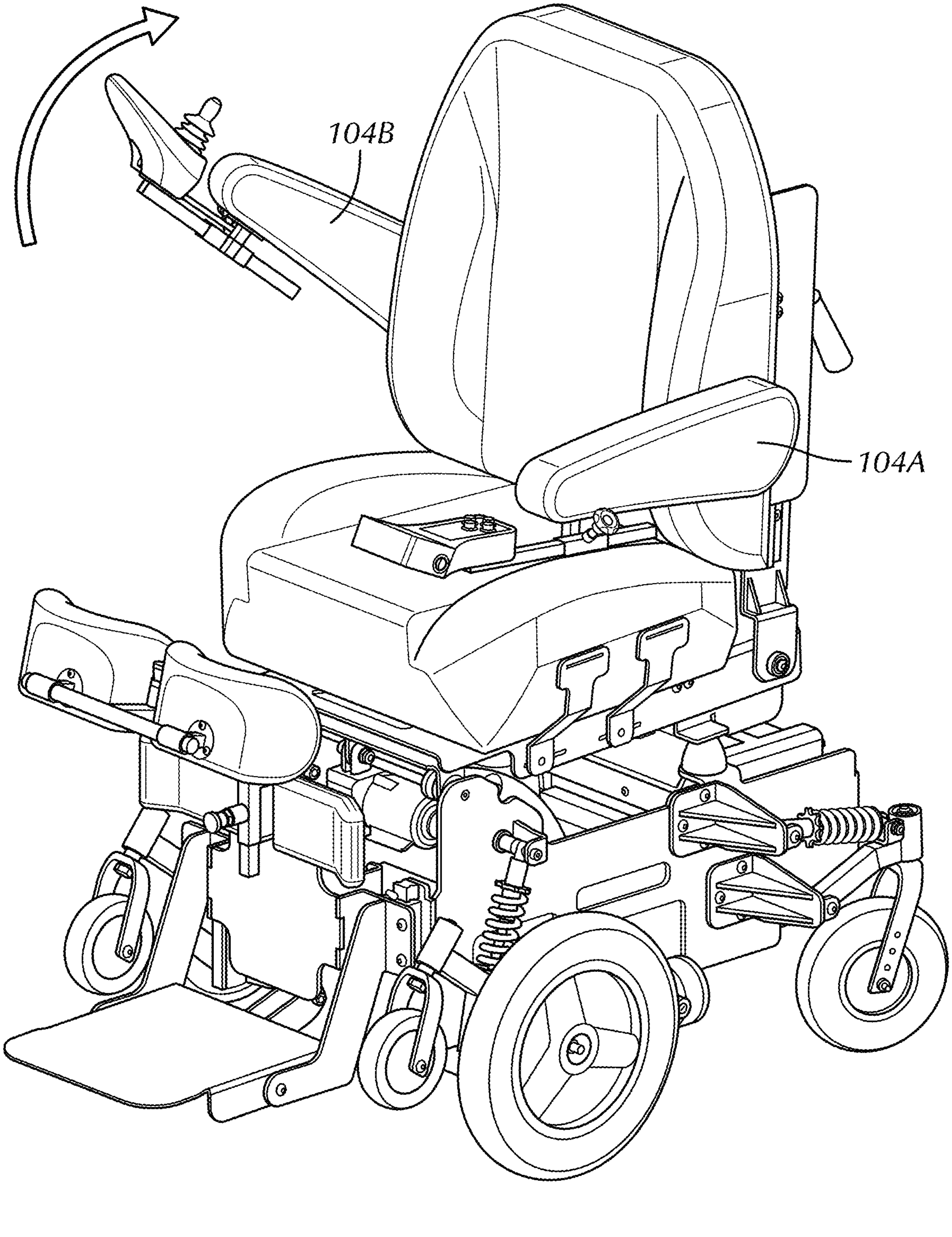
FIG. 1.17

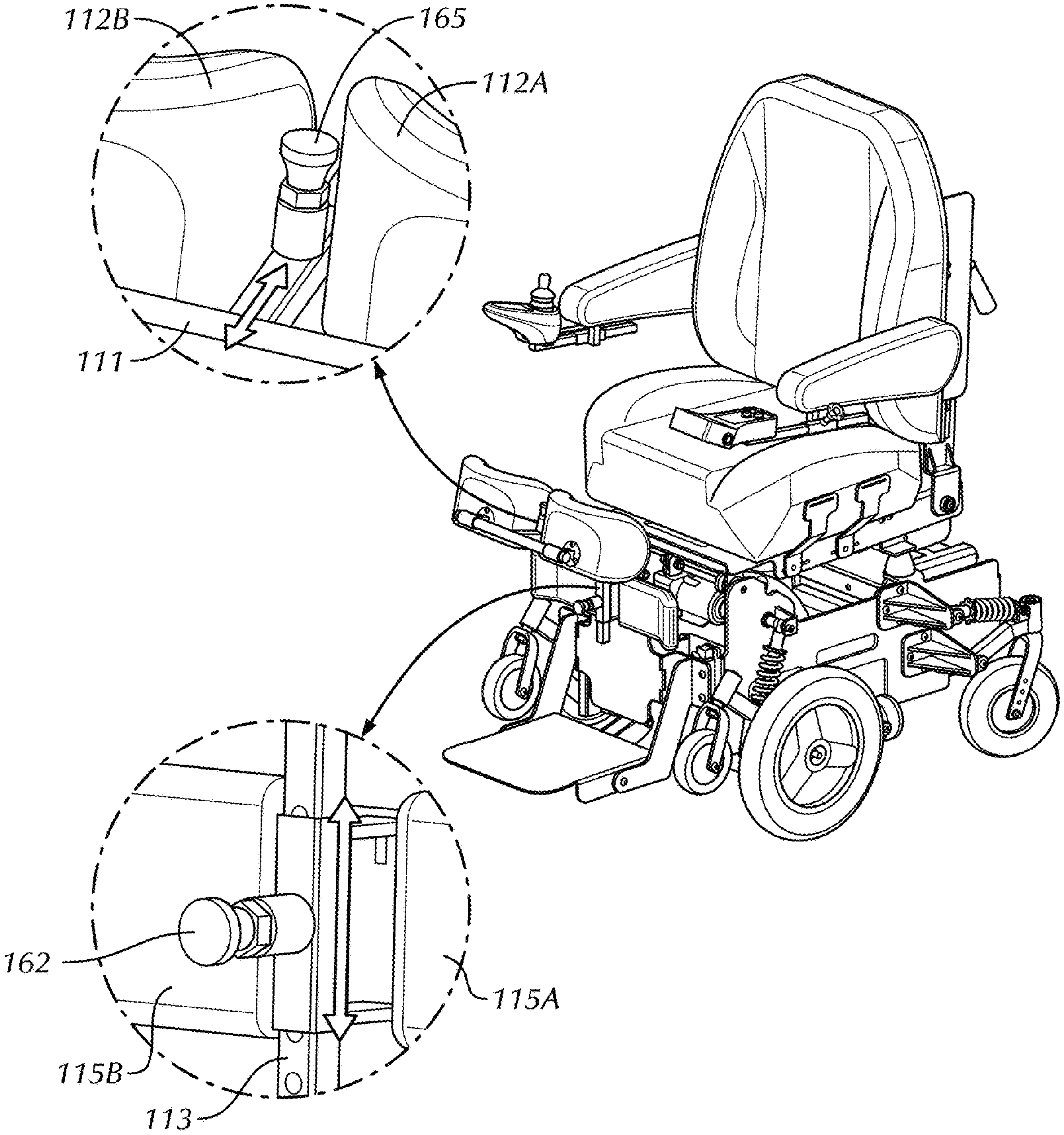
FIG. 1.18

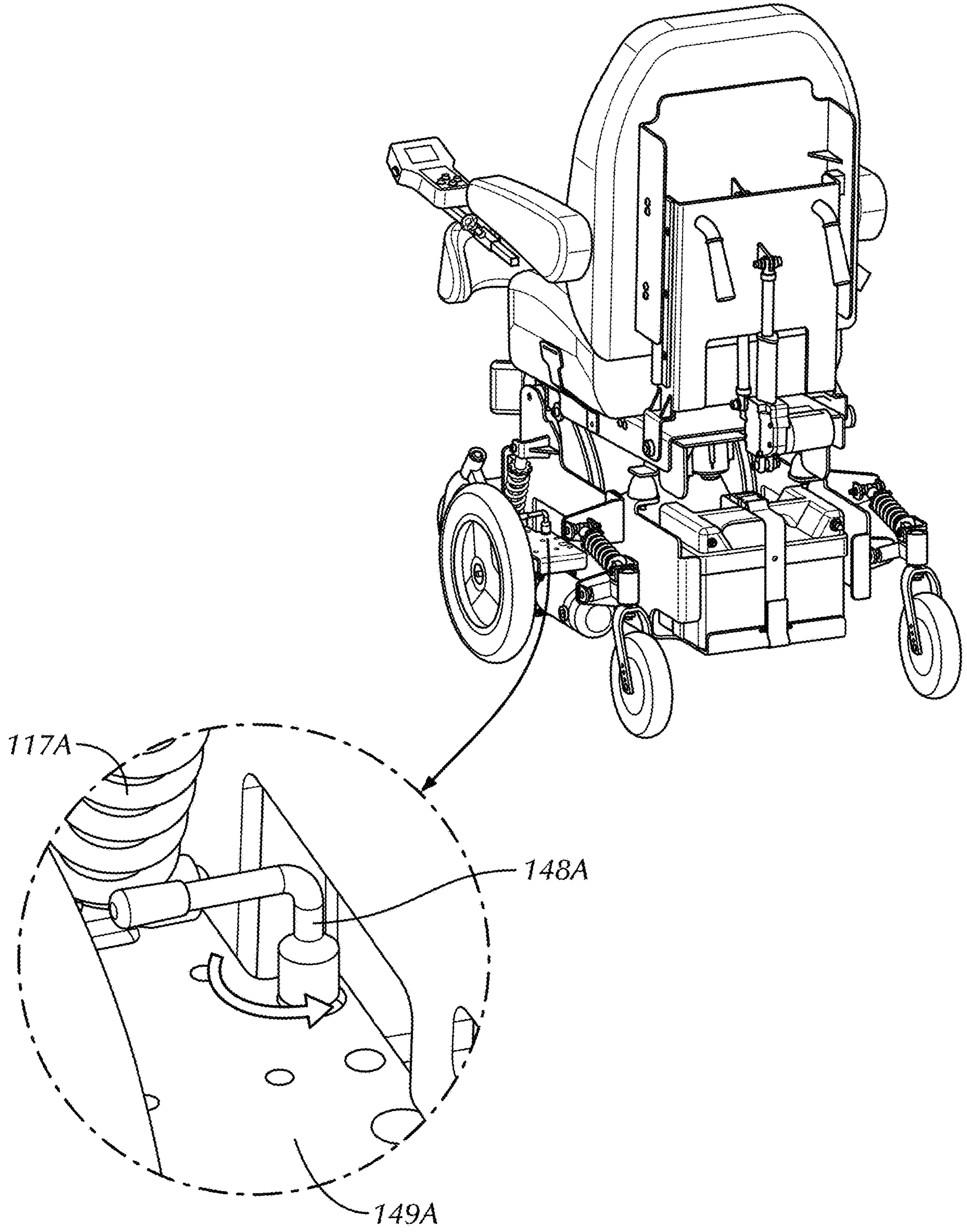
FIG. 1.19

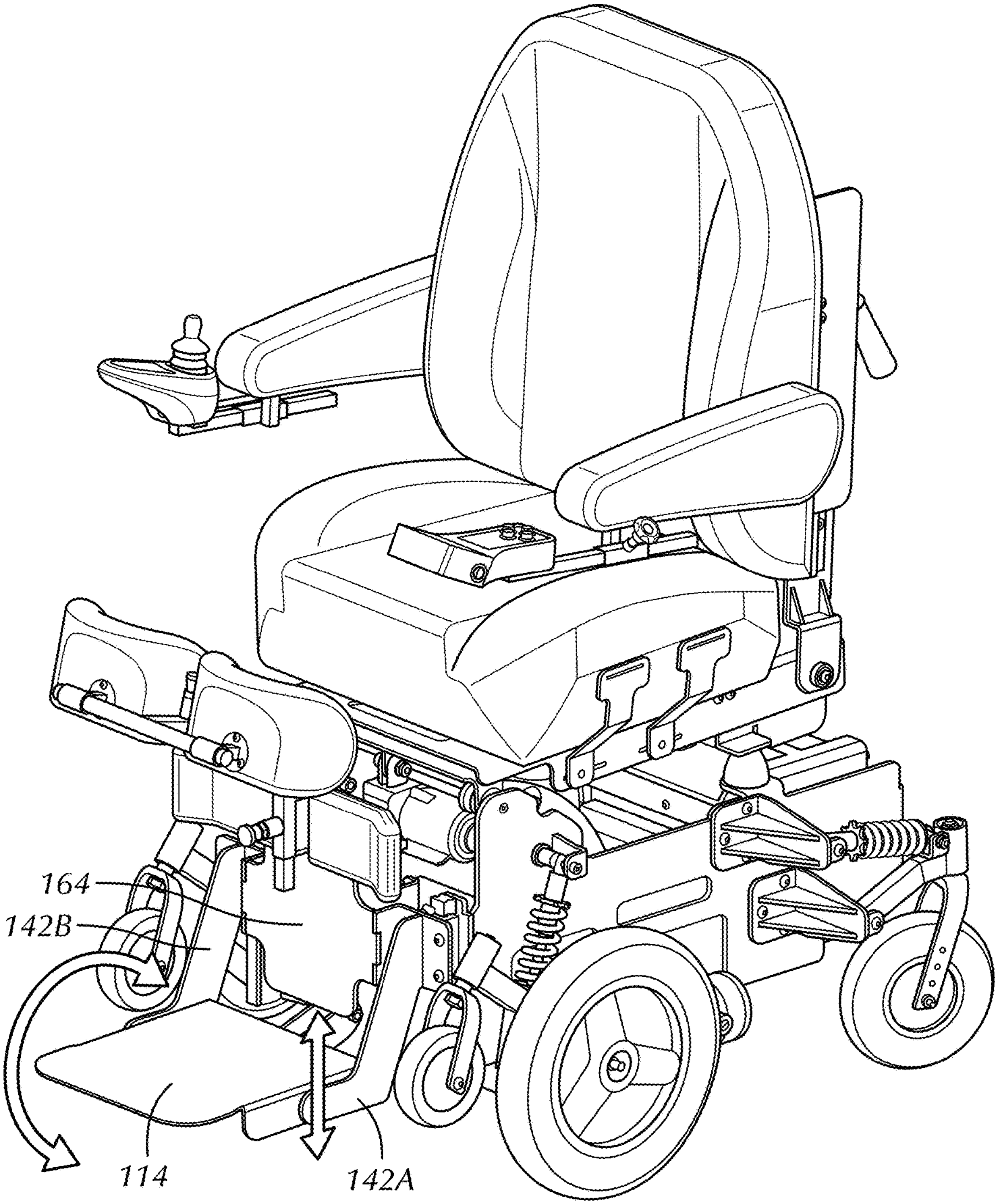
FIG. 1.20

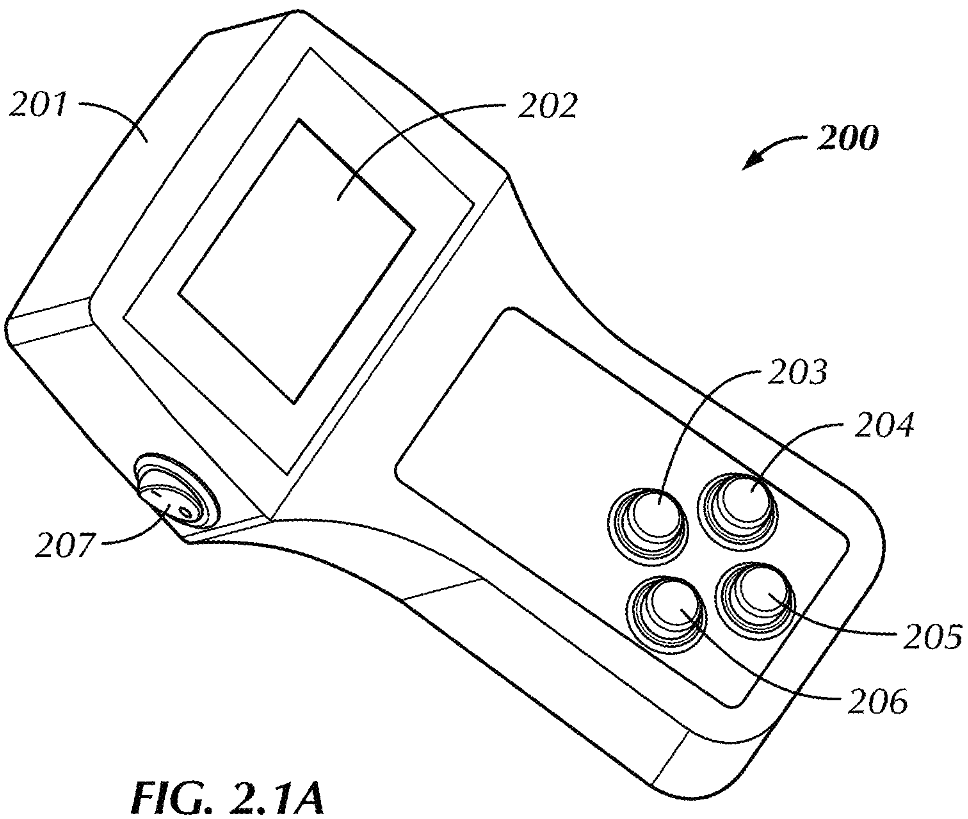
FIG. 2.1A

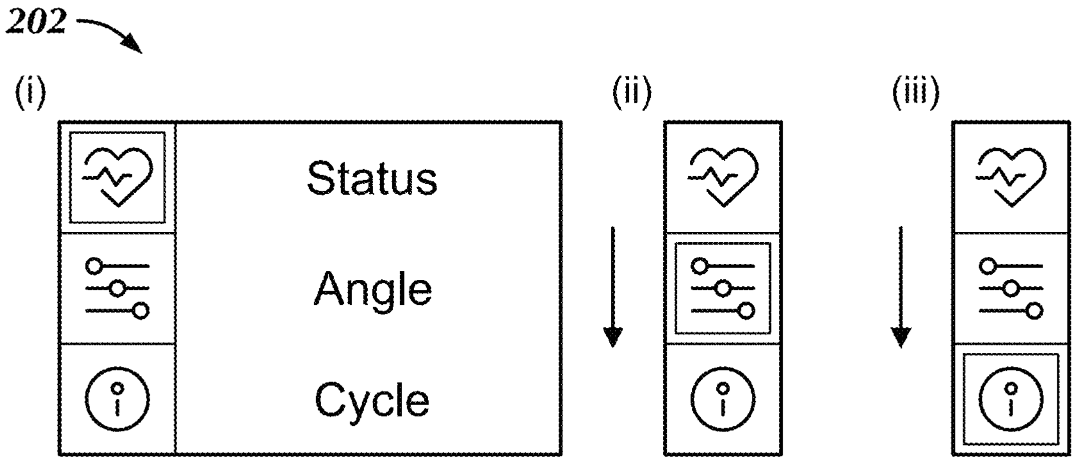
*FIG. 2.1B*
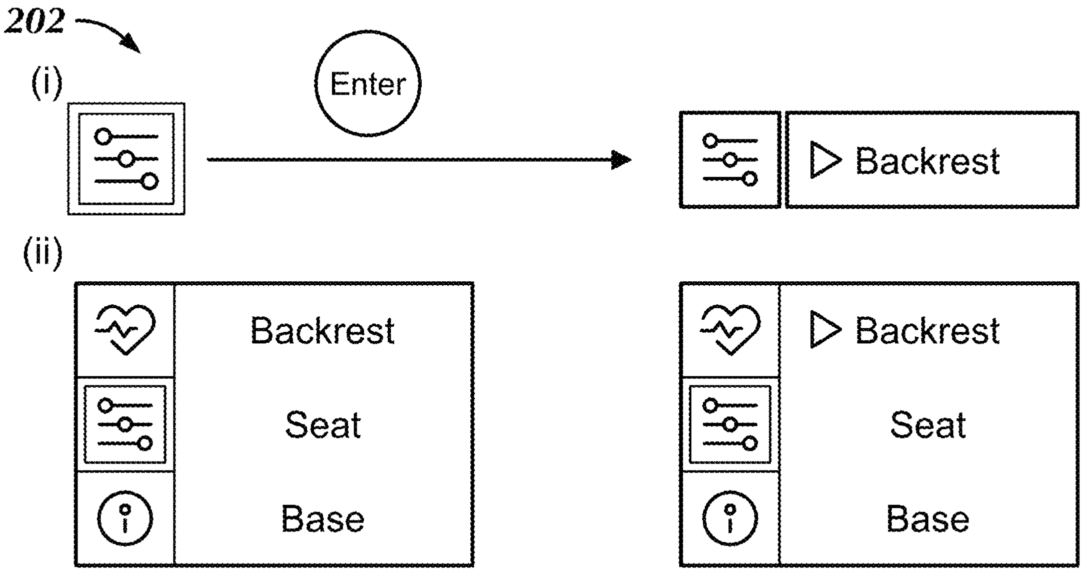
*FIG. 2.1C*

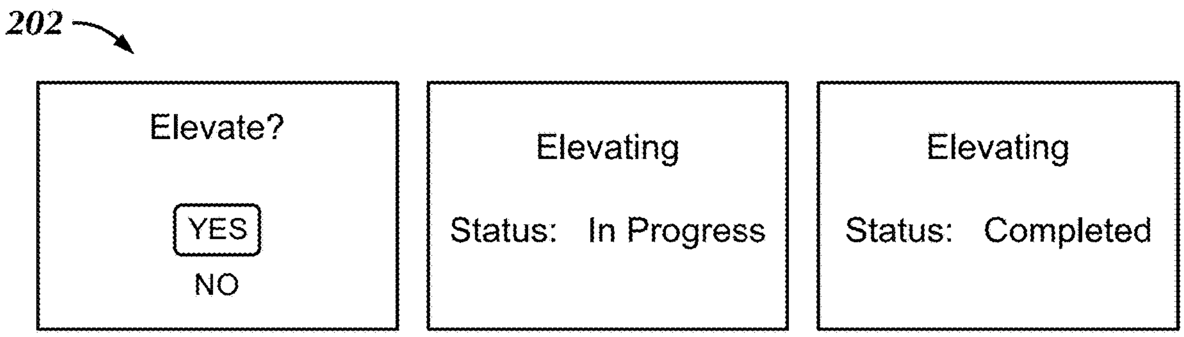
FIG. 2.1D FIG. 2.1E FIG. 2.1F
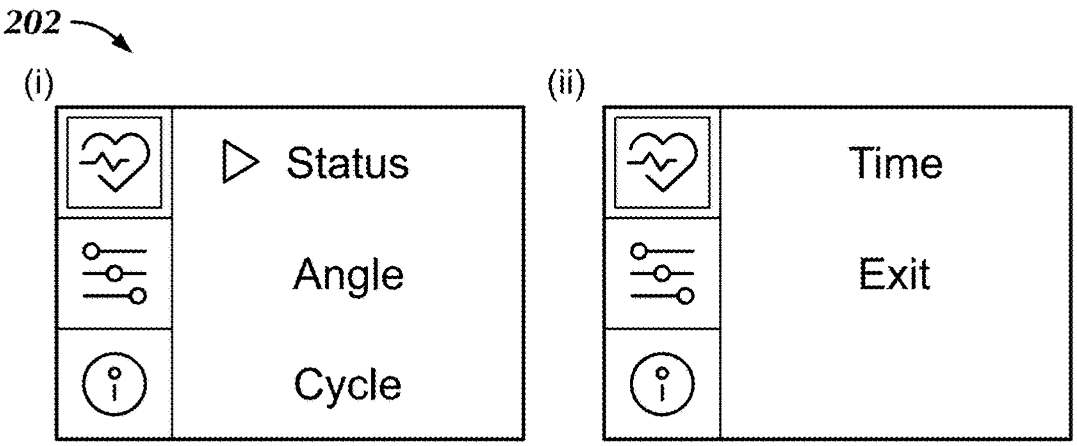
FIG. 2.1G

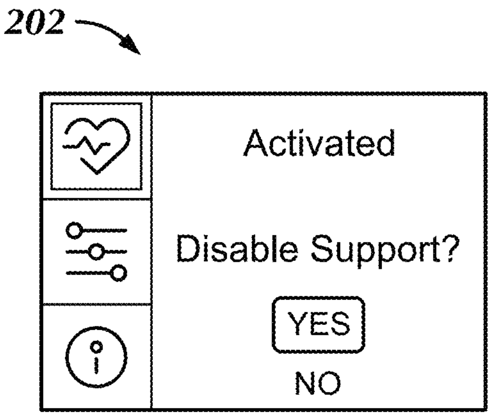
FIG. 2.1H
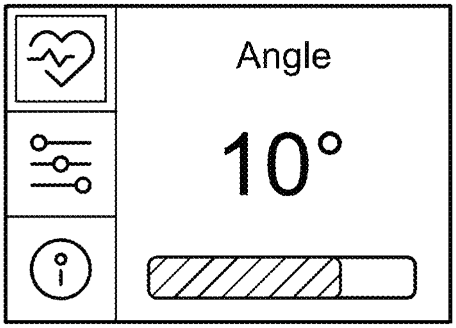
FIG. 2.1I
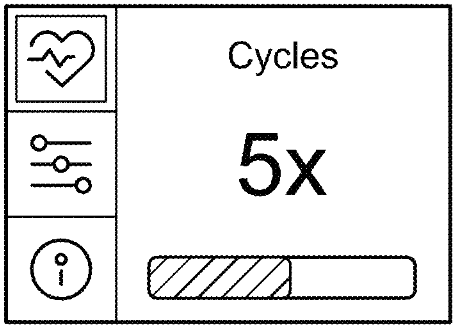
FIG. 2.1J
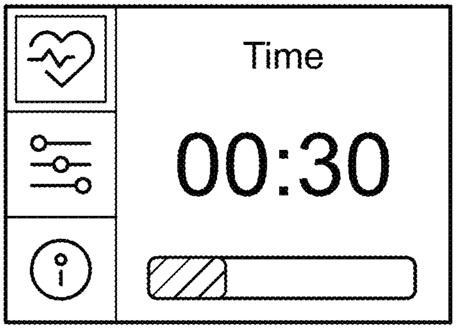
FIG. 2.1K
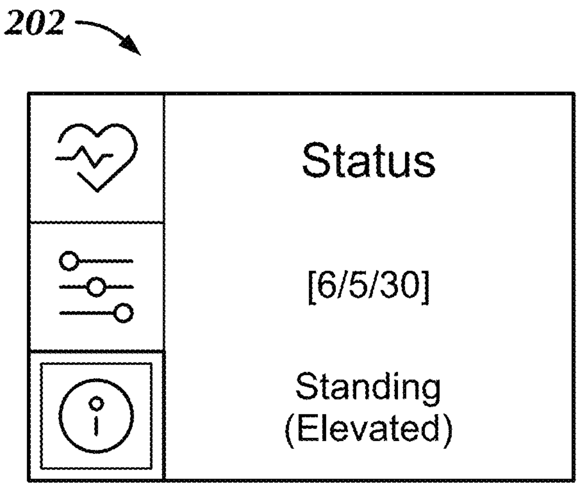
FIG. 2.1L

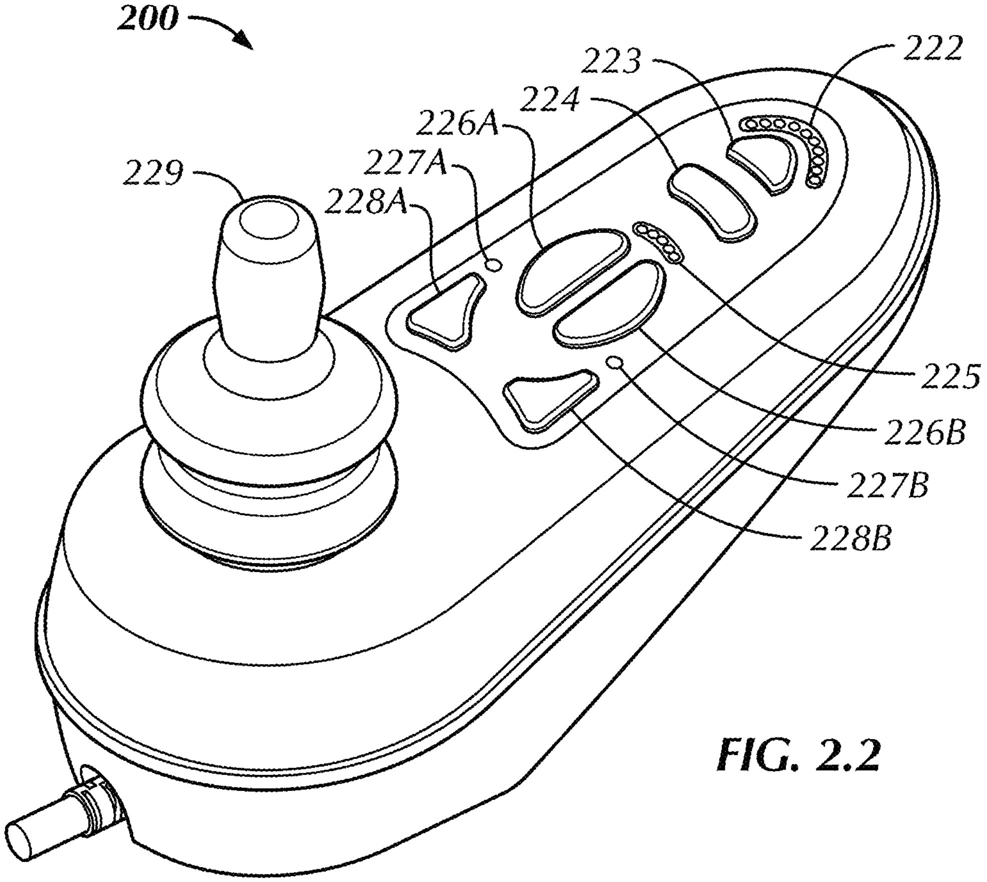
FIG. 2.2

POSTURAL LIFTING EXOSKELETON FOR PEOPLE WITH DISABILITIES

CROSS-REFERENCE TO RELATED APPLICATIONS

This application claims the benefit of U.S. Provisional Application No. 63/673,102, filed on Jul. 18, 2024, and titled "POSTURAL LIFTING EXOSKELETON FOR PEOPLE WITH DISABILITIES." U.S. Provisional Application No. 63/673,102 is hereby incorporated herein by reference.

BACKGROUND

An electric powered wheelchair is an essential mobility device for people who have limited or no upper and/or lower extremity movement such as those diagnosed with spinal cord injury, cerebral palsy, or muscular dystrophy. Many users/people not only use their wheelchair indoors but also outdoors when going to work, a doctor's appointment, or a grocery store.

SUMMARY

In general, embodiments described herein relate to a postural lifting exoskeleton. The exoskeleton may include a chair, a set of electric actuators, and a footplate. The chair may include a first portion and a second portion, in which (i) a first armrest may be affixed to a right side of the first portion and a second armrest may be affixed to a left side of the first portion, (ii) a first control panel may be affixed to the first armrest and a second control panel is affixed to the second armrest, (iii) a rear side of the first portion is affixed to a first frame that is affixed to a second frame (in which the first frame may be affixed to a third frame via a first electric actuator), and (iv) the second portion may be affixed to the third frame (in which the second frame may be affixed to the third frame via a second electric actuator).

The set of electric actuators may include at least the first electric actuator and the second electric actuator. Upon receiving a first request from a user via the second control panel, a third control panel (that is located underneath the third frame) may trigger at least the first electric actuator and the second electric actuator to transform the exoskeleton from a first position to a second position, in which the exoskeleton may be transformed to the second position in order to bring the user to an orthostatic position standing on the footplate. Separately, upon receiving a second request from the user via the second control panel, the third control panel may trigger at least the first electric actuator and the second electric actuator to transform the exoskeleton from the second position to the first position, in which the exoskeleton may be transformed to the first position in order to bring the user to a sitting position on the chair.

The footplate may be operatively connected to a fourth frame (that is affixed to the third frame), in which (i) once the user is in the orthostatic position, the footplate's oscillatory movement may cause the user's ankles to move upwards and downwards in order to improve the user's blood circulation, and (ii) the footplate's oscillatory movement may be managed by the second control panel.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 1.1 illustrates a first isometric view of the postural lifting exoskeleton (in its sitting position) in accordance with one or more embodiments disclosed herein.

FIG. 1.2 illustrates a second isometric view of the postural lifting exoskeleton (in its sitting position) in accordance with one or more embodiments disclosed herein.

FIG. 1.3 illustrates a third isometric view of the postural lifting exoskeleton (in its standing position) in accordance with one or more embodiments disclosed herein.

FIG. 1.4 illustrates an isometric view of a chair of the postural lifting exoskeleton in accordance with one or more embodiments disclosed herein.

FIG. 1.5 illustrates an isometric view of a backrest support frame and a seat support frame of the postural lifting exoskeleton in accordance with one or more embodiments disclosed herein.

FIG. 1.6 illustrates electric actuators that are affixed to the backrest support frame and seat support frame of the postural lifting exoskeleton in accordance with one or more embodiments disclosed herein.

FIG. 1.7 illustrates (i) a leg belt and (ii) a four-point supporting belt of the postural lifting exoskeleton in accordance with one or more embodiments disclosed herein.

FIG. 1.8 illustrates an emergency button of the postural lifting exoskeleton in accordance with one or more embodiments disclosed herein.

FIG. 1.9 illustrates a closer side view of the postural lifting exoskeleton (in its sitting position) in accordance with one or more embodiments disclosed herein.

FIG. 1.10A illustrates a fourth isometric view of the postural lifting exoskeleton (with a closer view of a power supply safety belt) in accordance with one or more embodiments disclosed herein.

FIG. 1.10B illustrates the power supply (indicated with an arrow) that powers at least one or more control panels of the postural lifting exoskeleton in accordance with one or more embodiments disclosed herein.

FIG. 1.10C illustrates a closer rear view of the postural lifting exoskeleton in accordance with one or more embodiments disclosed herein.

FIG. 1.10D illustrates a closer rear view of the postural lifting exoskeleton in accordance with one or more embodiments disclosed herein.

FIG. 1.11A illustrates a closer side view of the postural lifting exoskeleton in accordance with one or more embodiments disclosed herein.

FIG. 1.11B illustrates a closer isometric view of the postural lifting exoskeleton in accordance with one or more embodiments disclosed herein.

FIG. 1.11C illustrates a closer isometric view of an anti-fall wheel of the postural lifting exoskeleton in accordance with one or more embodiments disclosed herein.

FIG. 1.11D illustrates a closer isometric view of an anti-fall wheel of the postural lifting exoskeleton in accordance with one or more embodiments disclosed herein.

FIG. 1.12A illustrates a fifth isometric view of the postural lifting exoskeleton (with a closer view of a drive wheel and a swivel wheel) in accordance with one or more embodiments disclosed herein.

FIG. 1.12B illustrates an electric motor of the postural lifting exoskeleton in accordance with one or more embodiments disclosed herein.

FIG. 1.12C illustrates a sixth isometric view of the postural lifting exoskeleton (with a closer view of a physical lock) in accordance with one or more embodiments disclosed herein.

FIGS. 1.12D-E illustrate a seventh isometric view of the postural lifting exoskeleton (with a closer view of a swivel wheel) in accordance with one or more embodiments disclosed herein.

FIG. 1.12F illustrates an eighth isometric view of the postural lifting exoskeleton (with a closer view of an anti-fall wheel) in accordance with one or more embodiments disclosed herein.

FIG. 1.13 illustrates a ninth isometric view of the postural lifting exoskeleton (with a closer view of a first control panel and a second control panel) in accordance with one or more embodiments disclosed herein.

FIG. 1.14 illustrates a tenth isometric view of the postural lifting exoskeleton (with a closer view of the first control panel) in accordance with one or more embodiments disclosed herein.

FIGS. 1.15A-C illustrate a closer view of a front side of the postural lifting exoskeleton in accordance with one or more embodiments disclosed herein.

FIG. 1.16 illustrates adjustment capabilities of (i) a second portion of a chair and (ii) a first portion of the chair (indicated with arrows) of the postural lifting exoskeleton in accordance with one or more embodiments disclosed herein.

FIG. 1.17 illustrates adjustment capabilities of a first armrest of the chair (indicated with an arrow) of the postural lifting exoskeleton in accordance with one or more embodiments disclosed herein.

FIG. 1.18 illustrates (i) a first adjustment knob (indicated in the top zoomed-in view) to adjust a position of a set of knee support components and (ii) a second adjustment knob (indicated in the bottom zoomed-in view) to adjust a position of the set of knee support components of the postural lifting exoskeleton in accordance with one or more embodiments disclosed herein.

FIG. 1.19 illustrates how to operate the physical lock of the postural lifting exoskeleton in accordance with one or more embodiments disclosed herein.

FIG. 1.20 illustrates movement capabilities (indicated with arrows) of a footplate of the postural lifting exoskeleton in accordance with one or more embodiments disclosed herein.

FIG. 2.1A illustrates an isometric view of the second control panel of the postural lifting exoskeleton in accordance with one or more embodiments disclosed herein.

FIG. 2.1B illustrates (i) a home screen of the second control panel and (ii)-(iii) how to navigate through different options provided by the home screen (indicated with arrows) in accordance with one or more embodiments disclosed herein.

FIG. 2.1C illustrates (i) how to select an option on a display of the second control panel and (ii) different chair adjustment options provided by the second control panel of the postural lifting exoskeleton in accordance with one or more embodiments disclosed herein.

FIG. 2.1D illustrates an elevation decision screen provided by the display of the second control panel in accordance with one or more embodiments disclosed herein.

FIGS. 2.1E-F illustrate elevation status of the exoskeleton provided by the display of the second control panel in accordance with one or more embodiments disclosed herein.

FIG. 2.1G illustrates different options provided by the home screen (presented as (i)-(ii)) of the second control panel in accordance with one or more embodiments disclosed herein.

FIG. 2.1H illustrates a circulatory support decision screen provided by the display of the second control panel in accordance with one or more embodiments disclosed herein.

FIG. 2.1I illustrates a screen (of the second control panel) that is indicating an oscillation angle set for the footplate of the postural lifting exoskeleton in accordance with one or more embodiments disclosed herein.

FIG. 2.1J illustrates a screen (of the second control panel) that is indicating a number of oscillations per drive cycle set for the footplate of the postural lifting exoskeleton in accordance with one or more embodiments disclosed herein.

FIG. 2.1K illustrates a screen (of the second control panel) that is indicating a time interval between drive cycles set for the footplate of the postural lifting exoskeleton in accordance with one or more embodiments disclosed herein.

FIG. 2.1L illustrates a screen (of the second control panel) that is indicating a status of the postural lifting exoskeleton in accordance with one or more embodiments disclosed herein.

FIG. 2.2 illustrates an isometric view of the first control panel of the postural lifting exoskeleton in accordance with one or more embodiments disclosed herein.

DETAILED DESCRIPTION

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase “operatively connected” may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, the law protects and incentives employers (or organizations) who want to promote the inclusion of people with disabilities (PWD) among their peers/ranks. PWD may work less hours, and may need special accommodations and materials. The inclusion of PWD to the workforce may be important for a related organization’s public image and generating job opportunities for PWD benefits both employees and employers (of that organization). Moreover, PWD may need to be able to engage in other activities (e.g., socializing with their peers) in a work environment as well.

However, in most cases, PWD end up working in low-paying jobs and/or performing almost irrelevant activities in a work environment because employers (of an organization) are usually not willing to risk overall productivity (and global performance) of the organization. Beyond that, in the current job/labor market, most of the job positions are inaccessible to PWD. For example, for lower-limb amputees and wheelchair users, assembly lines are unsuitable to work because assembly line workers/employees need to adapt to standing in an orthostatic position (e.g., standing in an upright posture), which is a great challenge to overcome. For at least this reason, including PWD to the labor market still remains a challenge, especially assembly lines (or job positions that require working at assembly lines or at workbenches) are off limits to lower-limb amputees and wheelchair users.

Further, in some cases, electric linear actuators drive several motorized wheelchairs with postural lifting/elevation functions and ergonomic adjustments. However, none of those motorized wheelchairs was not produced to enable PWD to work in the industry, especially from a therapeutic perspective. Some of the recent approaches and/or studies have demonstrated that, for PWD (e.g., paraplegics, amputees, people with reduced mobility because of musculoskeletal injuries, etc.), adapting to a standing position is important because standing in a natural human posture increases the pressure on the joints and bones, while improving blood circulation across a human’s body. However, another recent study has shown that a decrease in blood pressure and heart rate is expected for an individual with immobility when that individual placed in an orthostatic position. The aforementioned physiological changes may cause long-term complications if a person (e.g., an individual with immobility) uses the postural elevation function frequently and for a long period of time.

From a different perspective, in general, assembly lines are not designed to accommodate wheelchair users. All workers/employees are supposed to walk through the aisles between different assembly lines. Occasionally, such aisles might be shared with equipment that stands there temporarily while some activity is occurring. Even if there is enough space, wheelchair users may need to deviate from such obstacles. Therefore, a device that enables such freedom of movement to wheelchair users is needed because these users may also be able to co-live and move around in such an environment.

For at least the reasons discussed above and without requiring resource-intensive efforts (e.g., time, engineering, etc.), a fundamentally different approach/device/equipment is needed (e.g., a postural lifting exoskeleton to be used by PWD (e.g., lower-limb amputees, wheelchair users, etc.) during work activities (in a work environment) for their holistic inclusion to the work environment, an equipment that enables wheelchair users (and people with missing lower limbs) to work in an orthostatic position at assembly lines and provide a performance similar to those without such disabilities, etc.).

Embodiments disclosed herein relate to a postural lifting exoskeleton for PWD (e.g., employees with disability, employees with reduced mobility, etc.). As discussed below, one or more embodiments disclosed herein advantageously ensure that: (i) an electric powered wheelchair is produced to provide mobility for people who are not able to walk, stand, or use a manual wheelchair (because of, for example, cerebral palsy and other psychomotor disorders, loss of limbs, limb deformity, joint injuries, heart and respiratory deficiencies, etc.), but are quite capable of managing the electric powered wheelchair; (ii) a corresponding user’s fitness, strength, balance, mobility, and coordination is managed (especially in different daily situations that the user may be faced with); (iii) the user’s safety and comfort are improved (via, for example, a set of anti-fall wheels, a four-point supporting belt, a leg belt (or a pelvic safety belt), etc.); (iv) with the use of the postural lifting exoskeleton, a more inclusive and productive workplace (in a related organization) is created for PWD; (v) the postural lifting exoskeleton can be used in other workplace related scenarios in order to spread a human-centered productivity wave across organizations; (vi) PWD are allowed/enabled to work at one or more assembly lines (of a related organization) in an orthostatic position; (vii) PWD can work safely and autonomously at assembly lines (where, to make this possible, the exoskeleton operates as a motorized wheelchair with postural lifting functions and ergonomic adjustments); (viii) in a work environment, PWD can reach the same productivity levels as their non-PWD colleagues/peers so that nobody (e.g., supervisors, colleagues, etc.) in that work environment doubts about their performance; (ix) job opportunities (e.g., in research and development, manufacturing, etc.) are provided to PWD; (x) in order to improve blood circulation (especially in the lower limbs) and to minimize the risk of clot formation, a foot platform (e.g., an oscillating footplate) is provided to make a related user’s ankles move upwards and downwards; (xi) the exoskeleton is equipped with several devices and adjustments to reduce the cost of adapting assembly lines to PWD and to make working conditions of PWD at assembly lines easier; (xii) the width of the exoskeleton is suitable for regular assembly line aisles; (xiii) PWD are assisted in manual tasks to increase their safety and productivity while working, for example, at a production line; and/or (xiv) the exoskeleton can be used in any environment that requires a user to remain in an orthostatic position to perform a work activity.

The following describes various embodiments disclosed herein.

Turning now to FIG. 1.1, FIG. 1.1 illustrates/shows a first isometric view of the postural lifting exoskeleton (in its sitting position) in accordance with one or more embodiments disclosed herein. In one or more embodiments, based on the concept of "human-machine hybrid," the postural lifting exoskeleton (see FIG. 1.1) operates as a motorized wheelchair capable of taking an individual with a disability in the lower limbs to his/her workstation (in a work environment), elevating the individual, and sustaining the individual in a vertical position (e.g., in an orthostatic position) while the individual is performing, for example, one or more assembly operations.

The postural lifting exoskeleton includes a postural lifting mechanism (see FIG. 1.3) in a motorized wheelchair that (i) is ergonomically comfortable and safe (for, at least, PWD), and (ii) allows orthostatism (of an individual's body) without physiological changes in cases of prolonged use (e.g., to increase the quality of life of PWD).

As being a standing electric wheelchair (that is designed for PWD to work, at least, in factory environments), users/individuals may precisely operate/control the postural lifting exoskeleton while (i) sitting on the exoskeleton (where the exoskeleton is in its sitting position (e.g., in its normal position, in its first position, etc.) (see FIG. 1.1)) and (ii) standing on the exoskeleton (where the exoskeleton is in its standing position (e.g., in its elevated position, in its second position, etc.) (see FIG. 1.3)). In one or more embodiments, in its sitting position, the exoskeleton looks and behaves similar to a regular motorized wheelchair, and in its standing position, the exoskeleton imposes almost no risk from an engineering perspective and provides maximum usability from a user's perspective.

As like any other population, PWD population also value autonomy. To this end, in one or more embodiments, the postural lifting exoskeleton enable its users to autonomously, e.g.: (i) get on and off from the exoskeleton, (ii) change his/her working position/location, (iii) activate the postural lifting mechanism (e.g., via a human-machine interface (HMI) module (or a second control panel), see FIG. 2.1), (iv) activate subtle and personal ergonomic adjustments (e.g., via the HMI module), (v) move to recreational areas (e.g., in a work environment), (vi) use restrooms, (vii) reach high shelves in a work environment, (viii) access vending machines and/or pay phones, (ix) press elevator buttons, (x) access furniture in office environments, (xi) access to work positions that require the user to stand, and/or (xi) move to emergency exits. Separately, to safely perform at least the aforementioned activities (within a traditional work shift duration), the exoskeleton's power supply (e.g., a battery, see FIG. 1.10B) also lasts long enough.

In one or more embodiments, the postural lifting exoskeleton protects its user's health (at least, via an "oscillating" footplate (114)). For example, the exoskeleton makes sure that a disabled user could keep himself/herself in an orthostatic position for a period of time similar to that of a regular worker at an assembly line. By this way, at least, (i) the functioning of the user's urinary tract may be improved, (ii) calcium levels in the user's urine may be reduced, (iii) leg muscle spasticity of the user may be decreased, and/or (iv) the functioning of the user's digestive tract may be improved. Additional details of the footplate are described below in reference to FIGS. 1.15A-C and 1.20.

As yet another example, the exoskeleton (i) improves the independence and productivity of a disabled user, (ii) improves his/her blood circulation, blood pressure, blood saturation, heart rate, range of motion, and bone density, and (iii) provides physical and physiological well-being (to the user).

As used herein, a disabled user/person may mean a human with a disability in his/her lower limbs and, because of that, has a reduced mobility.

As used herein, an "assembly line" is a manufacturing process (often called a progressive assembly) in which parts (usually interchangeable parts) are added as the semi-finished assembly moves from a workstation to a workstation, where the parts are added in sequence until the final assembly is produced.

As used herein, an "exoskeleton" is a wearable structure that support and assist movement, or augment the capabilities of the human body.

In one or more embodiments, as being an assistive device with wheels and lifting/elevating mechanisms for PWD (or for people with reduced mobility), the postural lifting exoskeleton includes, at least: (i) a chair (or a seat system) including (a) a first portion (e.g., a backrest) (102) that is attached/affixed to a first frame (129) and (b) a second portion (e.g., a seat) (108) that is affixed to a third frame (127), in which a first armrest (104B) is affixed to a right side of the first portion (102) and a second armrest (104A) is affixed to a left side of the first portion (102); (ii) a first control panel (106) that is affixed to the first armrest (104B) via a first connecting rod (107B) and a knob; (iii) a second control panel (110) that is affixed to the second armrest (104A) via a second connecting rod (107A) and a knob; (iv) a first knee support component (112B) and a second knee support component (112A), in which the first knee support component (112B) and the second knee support component (112A) are operatively connected to (or in operative connection with) each other via a connecting rod/bar (111); (v) an L-shaped connecting rod (113) that is welded to the connecting rod (111) in order to operatively connect the first knee support component (112B) and the second knee support component (112A) to a front side (e.g., 164, FIG. 1.15A) of a fourth frame; (vi) a first calf support component (115B) and a second calf support component (115A), in which the first calf support component (115B) and the second calf support component (115A) are operatively connected to the front side of the fourth frame; (vii) the footplate (114); (viii) a first traction system including a first drive wheel (118A), a first electric motor (120A), and a first braking system (not shown) that are operatively connected to a left side (133A) of the fourth frame; (ix) a second traction system including a second drive wheel (118B), a second electric motor (not shown), and a second braking system (not shown) that are operatively connected to a right side (133B) of the fourth frame; (x) a first swivel wheel (122A) with a fork that is operatively connected to the left side (133A) of the fourth frame; (xi) a second swivel wheel (e.g., 122B, FIG. 1.2) with a fork that is operatively connected to the right side (133B) of the fourth frame; (xii) a first anti-fall wheel (116A) that is operatively connected to the left side (133A) of the fourth frame; (xiii) a second anti-fall wheel (116B) that is operatively connected to the right side (133B) of the fourth frame; (xiv) the power supply (126), which is located at a rear side of the exoskeleton and is operatively connected to a bottom side (e.g., 133C, FIG. 1.10B) of the fourth frame; (xv) a first fixed handle (128A)

and a second fixed handle (e.g., 128B, FIG. 1.2) that are affixed to a second frame (e.g., 131, FIG. 1.2); (xvi) (a) a first electric actuator (e.g., 130D, FIG. 1.5) that is affixed to the first frame (129) and the third frame (127), (b) a second electric actuator (e.g., 130A, FIG. 1.2) that is affixed to the second frame (131) and the third frame (127), (c) a third electric actuator (e.g., 130B, FIG. 1.6) that is operatively connected to the front side of the fourth frame and the third frame (127), and (d) a fourth electric actuator (e.g., 130C, FIG. 1.6) that is operatively connected to the front side of the fourth frame and the third frame (127); and/or (xvii) a first shock absorber (117A) that is operatively connected to the left side (133A) of the fourth frame and a first electric motor cover (e.g., 149A, FIG. 1.12A), a second shock absorber (not shown) that is operatively connected to the right side (133B) of the fourth frame and a second electric motor cover (not shown), a third shock absorber (124A) that is operatively connected to the left side (133A) of the fourth frame and the fork of the first swivel wheel (122A), and a fourth shock absorber (e.g., 124B, FIG. 1.2) that is operatively connected to the right side (133B) of the fourth frame and the fork of the second swivel wheel (122B). The postural lifting exoskeleton may include additional, fewer, and/or different components without departing from the scope of the embodiments disclosed herein. Each component referenced in FIG. 1.1 is described below.

In one or more embodiments, the aforementioned components (of the exoskeleton) may be affixed (or operatively connected) to each other and/or to a corresponding frame(s) via standard mechanical mechanisms (e.g., bolts, screws, nuts, studs, rivets, welding, etc.). Other mechanical or non-mechanical (e.g., glue, an adhesive tape, etc.) mechanisms for affixing (or operatively connecting) the aforementioned components to each other and/or to the corresponding frame(s) may be used without departing from the scope of the embodiments disclosed herein.

For example, to provide the maximum comfort and safety (of a related user) in the most demanding transportation conditions, the wheels (e.g., 118A, 118B, 122A, and 122B) may be affixed to a corresponding frame via one or more suspensions (or shock absorbers to, at least, minimize shock, vibration, and/or displacement transmitted to the chair and thereby to the user) and may operate in conjunction with one or more braking systems, in which, in order to adjust a suspension (e.g., 117A), an administrator/user (i) may turn the suspension clockwise to make the suspension harder and (ii) may turn the suspension counterclockwise to make the suspension soft.

In one or more embodiments, "connected" may refer to "directly connected", in which there is a seal in between, for example, the fourth electric actuator (e.g., 130C, FIG. 1.6) and the front side (e.g., 164, FIG. 1.15A) of the fourth frame. Alternatively, "connected" may refer to "connected via one or more physical components in between". For example, the fourth electric actuator (e.g., 130C, FIG. 1.6) is connected to the front side (e.g., 164, FIG. 1.15A) of the fourth frame, in which at least one physical component is mechanically touching the fourth electric actuator and the front side of the fourth frame.

In one or more embodiments, each of the frames (e.g., 127, 129, etc.) of the exoskeleton may be implemented as other types of structures adapted to host, position, orient, and/or otherwise physically, mechanically, electrically, and/or thermally manage the aforementioned components of the exoskeleton.

In one or more embodiments, for maximum durability of the postural lifting exoskeleton, stability of the exoskeleton, efficiency of the exoskeleton, safety of a user (e.g., in case of unexpected accidents (and associated injuries) during user transportation), horizontal and/or vertical mobility of the user, and traction of the exoskeleton, the exoskeleton may support, for example, a maximum user weight of 120 kilograms.

Further, the postural lifting exoskeleton may have a computerized numerical control (CNC) cut chassis (a solid, mechanical structure (including, at least, shafts and moving parts) that enables the aforementioned components to be positioned with respect to each other) and, at least, the aforementioned components of the exoskeleton may be made of metal, steel alloy, or any combination thereof. For example, the first frame (129) (e.g., the backrest support frame), the second frame (e.g., 131, FIG. 1.2), the third frame (127) (e.g., the seat support frame), the fourth frame, the first electric motor cover (e.g., 149A, FIG. 1.12A), and a second electric motor cover may be made of (but not limited to) aluminum, galvanized steel, stainless steel, copper steel, a composite material that is durable, etc., in which the frames may be laser cut and mechanically formed. As yet another example, the drive wheels (118A, 118B) may be 12-inch aluminum wheels with anti-puncture tires and the swivel wheels (122A, 122B) may be 8-inch by 2-inch solid swivel wheels with steel forks.

The aforementioned examples are not intended to limit the scope of the embodiments disclosed herein and the postural lifting exoskeleton (and its components) may be configured to have any shape/form and support any capacity without departing from the scope of the embodiments disclosed herein.

In one or more embodiments, a set of fixations of the exoskeleton may be made through screws and some specific welding points. Further, a first sliding mechanism (e.g., 164A, FIG. 1.2) as part of the first frame (129) may use bronze bushings to enable ergonomic adjustments of the first portion (102) of the chair and slide up/down movement of the first sliding mechanism for a corresponding user's comfort and safety (e.g., upon receiving the user's request). Similarly, a second sliding mechanism (not shown) as part of the third frame (127) may use bronze bushings to enable ergonomic adjustments of the second portion (108) of the chair and slide front/rear movement of the second sliding mechanism for the corresponding user's comfort and safety (e.g., upon receiving the user's request).

Those skilled in the art will appreciate that while each component of the postural lifting exoskeleton is illustrated as having a particular size, shape, and placement, each of the aforementioned components may have any size, shape, and placement (while still providing the same functionalities) without departing from the scope of the embodiments disclosed herein.

Turning now to FIG. 1.2, FIG. 1.2 shows a second isometric view of the postural lifting exoskeleton (in its sitting position) in accordance with one or more embodiments disclosed herein. As described above in reference to FIG. 1.1, the postural lifting exoskeleton includes, at least: (i) the chair including (a) the first portion (102) that is affixed to the first frame (129) and (b) the second portion that is affixed to the third frame (127), in which the first armrest (104B) is affixed to the right side of the first portion (102) and the second armrest (104A) is affixed to the left side of the first portion (102); (ii) the first control panel that is affixed to the first armrest (104B) via the first connecting rod and the knob; (iii) the second control panel (110) that is affixed to the second armrest (104A) via the second connecting rod (107A) and the knob; (iv) the first knee support component and the second knee support component (112A); (v) the L-shaped connecting rod that is welded to the connecting rod in order to operatively connect the first knee support component and the second knee support component (112A) to the front side of the fourth frame; (vi) the first calf support component and the second calf support component (115A); (vii) the footplate; (viii) the first traction system including the first drive wheel (118A), the first electric motor (120A), and the first braking system that are operatively connected to the left side (133A) of the fourth frame; (ix) the second traction system including the second drive wheel, the second electric motor, and the second braking system that are operatively connected to the right side (133B) of the fourth frame; (x) the first swivel wheel (122A) with the fork that is operatively connected to the left side (133A) of the fourth frame; (xi) the second swivel wheel (122B) with the fork that is operatively connected to the right side (133B) of the fourth frame; (xii) the first anti-fall wheel (116A) that is operatively connected to the left side (133A) of the fourth frame; (xiii) the second anti-fall wheel that is operatively connected to the right side (133B) of the fourth frame; (xiv) the power supply (126); (xv) the first fixed handle (128A) and the second fixed handle (128B) that are affixed to the second frame (131); (xvi) a set of electric actuators (e.g., 130A); (xvii) a set of shock absorbers (e.g., 117A, 124A, 124B, etc.); (xvii) a first part (e.g., a first fixation component) (132A) of a four-point supporting belt that is affixed to the first frame (129) and a second part (132B) of the four-point supporting belt that is affixed to the first frame (129); (xviii) a first part (125A) of a power supply safety belt that is affixed to the bottom side of the fourth frame; (xix) a latch (150) of the power supply safety belt, in which the latch is part of a second part of the power supply belt that is affixed to the bottom side of the fourth frame; and/or (xx) the first sliding mechanism (164A) (or a first part of the first sliding mechanism).

In one or more embodiments, a "non-slip" fixed handle (128A, 128B) may be made of silicon rubber, any other materials, and/or any combination thereof that enables the fixed handle perform its functions. Further, the first fixed handle (128A) and the second fixed handle (128B) may be used by an administrator/operator to transport a user from a first location in an environment to a second location in the environment when, for example, the power supply (126) does not provide enough power to an electric motor (e.g., 120A) of a drive wheel (e.g., 118A).

Turning now to FIG. 1.3, FIG. 1.3 illustrates a third isometric view of the postural lifting exoskeleton (in its standing position) in accordance with one or more embodiments disclosed herein. As described above in reference to FIG. 1.1, the postural lifting exoskeleton includes, at least: (i) the chair including (a) the first portion (102) that is affixed to the first frame (129) and (b) the second portion (108) that is affixed to the third frame (127), in which the first armrest (104B) is affixed to the right side of the first portion (102) and the second armrest (104A) is affixed to the left side of the first portion (102); (ii) the first control panel (106) that is affixed to the first armrest (104B) via the first connecting rod (107B) and the knob; (iii) the second control panel (110) that is affixed to the second armrest (104A) via the second connecting rod (107A) and the knob; (iv) the first knee support component (112B) and the second knee support component (112A); (v) the L-shaped connecting rod (113) that is welded to the connecting rod (111) in order to operatively connect the first knee support component (112B) and the second knee support component (112A) to the front side of the fourth frame; (vi) the first calf support component (115B) and the second calf support component (115A); (vii) the footplate (114); (viii) the first traction system including the first drive wheel (118A), the first electric motor (120A), and the first braking system that are operatively connected to the left side (133A) of the fourth frame; (ix) the second traction system including the second drive wheel (118B), the second electric motor, and the second braking system that are operatively connected to the right side (133B) of the fourth frame; (x) the first swivel wheel (122A) with the fork that is operatively connected to the left side (133A) of the fourth frame; (xi) the second swivel wheel with the fork that is operatively connected to the right side (133B) of the fourth frame; (xii) the first anti-fall wheel (116A) that is operatively connected to the left side (133A) of the fourth frame; (xiii) the second anti-fall wheel (116B) that is operatively connected to the right side (133B) of the fourth frame; (xiv) the power supply (126); (xv) the first fixed handle (128A) and the second fixed handle that are affixed to the second frame; (xvi) the set of electric actuators; (xvii) the set of shock absorbers (e.g., 124A, etc.); and/or (xvii) the first part (125A) of the power supply belt that is affixed to the bottom side of the fourth frame.

In one or more embodiments, upon receiving a first request (e.g., a request to elevate the exoskeleton) from a user (e.g., a disabled user) via the second control panel (110), the third control panel (e.g., 141, FIG. 1.10D) that is located underneath the third frame (see FIG. 1.10D) triggers (e.g., sends a signal to) a set of electric actuators (e.g., 130A-130D, FIG. 1.6) to transform the exoskeleton from a first position (e.g., the sitting position, see FIG. 1.1) to a second position (e.g., the standing position, as shown in FIG. 1.3), by changing the orientation of the first frame (129), the second frame (131), and the third frame (127) relative to gravity. In one or more embodiments, the exoskeleton may be transformed to the second position, for example, in order to bring the user to an orthostatic position (standing on the footplate (114)) so that the user has both horizontal and vertical mobility (and maneuverability) to perform an action (or a service type of event) in a work environment.

The action may be, for example (but not limited to): accessing a top shelf, changing a sensor of a computing device, changing a hardware component (e.g., a semiconductor chip) of the computing device, changing a filter, performing a soldering operation on a workbench, assembling a second hardware component of the computing device, etc.

In one or more embodiments, upon receiving a second request (e.g., a request to lower the exoskeleton) from the user via the second control panel (110), the third control panel (e.g., 141, FIG. 1.10D) triggers the set of electric actuators (e.g., 130A-130D, FIG. 1.6) to transform the exoskeleton from the second position to the first position, by changing the orientation of the first frame (129), the second frame (131), and the third frame (127) relative to gravity. In one or more embodiments, the exoskeleton may be transformed to the first position, for example, in order to bring the user to a sitting position on the chair. Further, as illustrated in FIGS. 1.1 and 1.3, (i) a first height of the exoskeleton in the second position is higher than a second height of the exoskeleton in the first position, (ii) a rear side of the first portion (102) is affixed to the first frame (129), in which the first frame (129) is affixed to the second frame (131), and (iii) the second portion (108) is affixed to the third frame (127).

As discussed above and in reference to FIG. 1.6, the postural lifting exoskeleton includes one or more electric actuators (e.g., 130A-130D) (or a set of linear electric actuators (managed by the third control panel) for ergonomic adjustments) that are operatively connected to a set of four-bar mechanisms. In one or more embodiments, in order to safely elevate the exoskeleton (e.g., in order to transfer the user from a seated position to a standing position, without causing any discomfort to the user), the third control panel (e.g., 141, FIG. 1.10D) may follow the following order: (i) make sure that the leg belt and the four-point supporting belt (e.g., safety straps) are in place; (ii) make sure that a corresponding handle(s) are released, for example, by the user; (iii) release the first anti-fall wheel (116A) and the second anti-fall wheel (116B) so that the anti-fall wheels can touch the ground/surface (e.g., the set of anti-fall wheels are in place) (see FIG. 1.11A); (iii) receive an elevation confirmation, via the second control panel (110), from the user; (iv) send, via the second control panel (110), a notification to the user to remind that the user needs to lean on the first portion (102) of the chair during the elevation process, and (v) trigger the set of electric actuators (e.g., 130A-130D, FIG. 1.6) to initiate the elevation process of the exoskeleton. Once the exoskeleton is transformed to the second position, the user may slowly move the exoskeleton from a first location in an environment to a second location in the environment via the first control panel (106).

Those skilled in the art will appreciate that while each of the actuators (e.g., 130A-130D, FIG. 1.6) is described as an electric actuator (e.g., a 24 Volt (24V) linear electric actuator), each of the actuators may be any type of actuator (e.g., an electro-mechanical actuator, a pneumatic actuator, a hydraulic actuator, etc.) without departing from the scope of the embodiments disclosed herein.

As used herein, an "actuator" (or an actuator system) may refer to a physical component or an element to move and/or manage the motion of a mechanism or a system (e.g., the postural lifting exoskeleton). Referring to FIGS. 1.1 and 1.3, the electric actuators (e.g., 130A-130D, FIG. 1.6) are operable to lift/elevate/raise or lower the exoskeleton (more specifically, the first portion (102) and the second portion (108) of the chair), for example, in order to change a working position of a corresponding user (e.g., a disabled user) along a vertical direction (e.g., relative to gravity, relative to the ground in which the wheels of the exoskeleton are standing on (see FIG. 1.11A), etc.). Additionally, in order to change the working position of the user, each electric actuator may operate (or be controlled) independently or may operate in conjunction with another electric actuator.

Turning now to FIG. 1.4, FIG. 1.4 illustrates an isometric view of the chair of the postural lifting exoskeleton in accordance with one or more embodiments disclosed herein. In one or more embodiments, the chair includes the first portion (102) that is affixed to the first frame (e.g., 129, FIG. 1.2) and the second portion (108) that is affixed to the third frame (e.g., 127, FIG. 1.2), in which the first armrest (104B) is affixed to the right side of the first portion (102) and the second armrest (104A) is affixed to the left side of the first portion (102). In one or more embodiments, each of the first armrest (104B) and the second armrest (104A) may be a retractable armrest to provide the maximum functionality to the user.

Further, padded upholstery (with built-in high-density cushion) of the chair components (e.g., 102, 108, 104A, and 104B) may be covered in (but not limited to) leather for protection and comfort of the user.

Turning now to FIG. 1.5, FIG. 1.5 illustrates an isometric view of a backrest support frame (i.e., the first frame) and a seat support frame (i.e., the third frame) of the postural lifting exoskeleton in accordance with one or more embodiments disclosed herein.

In one or more embodiments, the postural lifting exoskeleton includes, at least: (i) the chair including (a) the first portion (102) that will be affixed to the first frame (129) and (b) the second portion (108) that will be affixed to the third frame (127), in which the first armrest (104B) is affixed to the right side of the first portion (102) and the second armrest (e.g., 104A, FIG. 1.2) is affixed to the left side of the first portion (102); (ii) the first control panel (106) that is affixed to the first armrest (104B) via the first connecting rod (107B) and the knob; (iii) the second control panel (110) that is affixed to the second armrest via the second connecting rod (107A) and the knob; (iv) the first electric actuator (130D) that is affixed to the first frame (129) and the third frame (127); and/or (v) a first part (e.g., a first fixation component) (137A) of the leg belt (e.g., 136, FIG. 1.7) that is affixed to a left side of the third frame (127) and a second part (137B) of the leg belt that is affixed to a right side of the third frame (127).

Turning now to FIG. 1.6, FIG. 1.6 illustrates electric actuators that are affixed to the backrest support frame (i.e., the first frame) and the seat support frame (i.e., the third frame) of the postural lifting exoskeleton in accordance with one or more embodiments disclosed herein.

In one or more embodiments, the postural lifting exoskeleton includes, at least: (i) the first electric actuator (130D) that is affixed to the first frame (e.g., 129, FIG. 1.5) and the third frame (127), through a hollow volume formed by the first frame and the second frame (131) (said another way, the first electric actuator is disposed within the hollow volume formed by the first frame and the second frame); (ii) the second electric actuator (130A) that is affixed to the second frame (131) and the third frame (127); (iii) the third electric actuator (130B) that is operatively connected to the front side (e.g., 164, FIG. 1.15A) of the fourth frame and the third frame (127); and/or (iv) the fourth electric actuator (130C) that is operatively connected to the front side of the fourth frame and the third frame (127).

In one or more embodiments, because the postural lifting exoskeleton is implemented as a mechanical structure that is adapted to host, position, orient, and/or otherwise physically, mechanically, electrically, and/or thermally manage each component of the exoskeleton, at least the aforementioned electric actuators may be densely packed without negatively impacting the operation of the exoskeleton, especially when the exoskeleton is in its first position (see FIG. 1.1).

Turning now to FIG. 1.7, FIG. 1.7 illustrates (i) the leg belt and (ii) the four-point supporting belt (e.g., an upper torso seat belt) of the postural lifting exoskeleton in accordance with one or more embodiments disclosed herein.

In one or more embodiments, the postural lifting exoskeleton includes, at least: (i) the first part (137A) of the leg belt (136) that is affixed to the left side of the third frame; (ii) the second part (137B) of the leg belt (136) that is affixed to the right side of the third frame; and/or (iii) a latch and buckle mechanism (138). In one or more embodiments, a related user may need to wear the leg belt (136) tightly (without discomforting himself/herself) in front of his/her pelvis (e.g., in full contact with the front of the user's body close to the junction of his/her thigh and pelvis) so that the angles of the belt is within a comfortable range of, for example, 30° to 75° (horizontally).

In one or more embodiments, the postural lifting exoskeleton further includes, at least: (i) the first part (132A) of the four-point supporting belt (134) that is affixed to the first frame; (ii) the second part (132B) of the four-point supporting belt (134) that is affixed to the first frame; (iii) the third part (132C) of the four-point supporting belt (134) that is affixed to the third frame; (iv) the fourth part (132D) of the four-point supporting belt (134) that is affixed to the third frame; (v) a first latch and buckle mechanism (135A) of the four-point supporting belt (134); (vi) a second latch and buckle mechanism (135B) of the four-point supporting belt (134); (vii) a third latch and buckle mechanism (135C) of the four-point supporting belt (134); and/or (viii) a fourth latch and buckle mechanism (135D) of the four-point supporting belt (134).

In one or more embodiments, a related user may need to wear the four-point supporting belt (134) tightly (without discomforting himself/herself) over his/her shoulder and across his/her chest.

Referring to FIGS. 1.1, 1.7 and 1.9, user protection/safety components (e.g., the leg belt (136), the four-point supporting belt (134), the set of knee support components (112A, 112B), the set of calf support components (115A, 115B), and the set of anti-fall (or anti-tip) wheels (116A, 116B)) hold and support the user in a safe and comfortable position, while improving the stability of the postural lifting exoskeleton.

In one or more embodiments, in order to transfer the user/operator from, for example, his/her chair to the postural lifting exoskeleton, retractable/movable armrests (e.g., 104A, 104B, FIG. 1.17) of the exoskeleton may need to be raised (see FIG. 1.17). With the help of a rotation mechanism that is part of each armrest (e.g., the rotation mechanism of the first armrest (e.g., 104B, FIG. 1.1) is located where the first armrest is affixed to the first portion (e.g., 102, FIG. 1.1)), each armrest may be raised or lowered so that the user may be safely transferred to the exoskeleton. After the transfer process is completed (and for the user's stability and safety), the user may need to put on the leg belt (136), the four-point supporting belt (134), and the set of knee support components (e.g., 112A-B, FIG. 1.1), for example, for the user's safety, stability, and productivity in an orthostatic position while operating in a production line. Once the user protection components are fitted, the user may return the armrests to their original position (see FIG. 1.1).

Turning now to FIG. 1.8, FIG. 1.8 illustrates an emergency button of the postural lifting exoskeleton in accordance with one or more embodiments disclosed herein. In one or more embodiments, the emergency button (or an electromechanical lock) (139) is affixed (or releasably affixed) to the third frame (127) via its housing (140), in which the housing (140) hosts an indicator (e.g., a red light-emitting diode (LED)) (166) that turns on, for example, when the emergency button (139) is pressed by a related user.

Pressing/pushing the emergency button (139) may allow the user to disable/stop/deactivate the exoskeleton instantly (for example, in an emergency situation), interrupting any action being performed by the user and/or by the exoskeleton (e.g., for a safe operation of the exoskeleton). In its emergency mode, the postural lifting exoskeleton will only be able to return to its normal execution mode after the emergency button (139) is returned to its initial state (e.g., the non-pressed state), by turning the button clockwise.

Turning now to FIG. 1.9, FIG. 1.9 illustrates a closer side view of the postural lifting exoskeleton (in its sitting position) in accordance with one or more embodiments disclosed herein.

In one or more embodiments, the postural lifting exoskeleton includes, at least: (i) the first calf support component (115B) and the second calf support component (115A), in which the first calf support component (115B) and the second calf support component (115A) are operatively connected to the front side (e.g., 164, FIG. 1.15A) of the fourth frame; (ii) the footplate (114); (iii) the first knee support component (112B) and the second knee support component (112A), in which the first knee support component (112B) and the second knee support component (112A) are operatively connected to each other via the connecting rod (111); (iv) the L-shaped connecting rod (113) that is welded to the connecting rod (111) in order to operatively connect the first knee support component (112B) and the second knee support component (112A) to the front side of the fourth frame; (v) the first control panel (106); (vi) an adjustment knob (162) to adjust a vertical position (relative to the ground) of the first knee support component (112B) and the second knee support component (112A); (vii) an oscillation mechanism (160) (e.g., a timed electric actuator for circulatory support to a related user) that controls oscillation/movement of the footplate (114); and/or (viii) a circulatory support electric actuator (163) that adjusts the height of the footplate (114) from the ground.

Further, padded upholstery of (i) the first knee support component (112B) and the second knee support component (112A) and (ii) the first calf support component (115B) and the second calf support component (115A) may be covered in (but not limited to) leather for protection and comfort of a related user.

Turning now to FIG. 1.10A, FIG. 1.10A illustrates a fourth isometric view of the postural lifting exoskeleton (with a closer view of a power supply safety belt) in accordance with one or more embodiments disclosed herein.

In one or more embodiments, the postural lifting exoskeleton includes, at least: (i) the first part (125A) of the power supply safety belt that is affixed to the bottom side (133C) of the fourth frame; (ii) the latch (150) of the power supply safety belt, in which the latch is part of the second part (125B) of the power supply belt that is affixed to the bottom side (133C) of the fourth frame; and/or (iii) the power supply (126), which is located at the rear side of the exoskeleton and is operatively connected to the bottom side (133C) of the fourth frame.

Those skilled in the art will appreciate that while the power supply (126) is shown as located at the rear side of the exoskeleton, the power supply (126) may be placed at location in the exoskeleton without departing from the scope of the embodiments disclosed herein.

In one or more embodiments, the power supply (126) may be a rechargeable battery (e.g., a lithium-ion rechargeable battery with a total capacity of 24V Ampere-hour (Ah)) to power (or distribute direct current (DC) power to) one or more components/modules/electronics (e.g., lifting/lowering/adjustment electric actuators (e.g., 130A-D, FIG. 1.6), the circulatory support electric actuator (or the footplate electric actuator) (e.g., 163, FIG. 1.9), the first control panel (e.g., 106, FIG. 1.1), the second control panel (e.g., 110, FIG. 1.1), the third control panel (e.g., 141, FIG. 1.10D), etc.) of the postural lifting exoskeleton. Further, if the exoskeleton hosts more than one power supply, the exoskeleton may also host a 50 A unipolar circuit breaker (for example, between two batteries connected in series) for protection against possible short circuits.

In one or more embodiments, in order to satisfy a related user's requirements and by considering possible work conditions of different work environments, the postural lifting exoskeleton may include one or more additional batteries (e.g., backup power sources) to support, for example, an ongoing operation performed by the user when the power supply (126) is discharged. Said another way, in order to provide power supply resiliency, the postural lifting exoskeleton may have an additional power supply feed (e.g., a redundant battery). In this manner, the exoskeleton may ensure that the user has no downtime while performing an operation, for example, on a workbench.

In one or more embodiments, the power supply (126) may be developed based on, for example (but not limited to): lithium-ion battery chemistry, nickel-cadmium battery chemistry, lithium polymer battery chemistry, etc.

Turning now to FIG. 1.10B, FIG. 1.10B illustrates the power supply (indicated with an arrow) that powers at least one or more control panels of the postural lifting exoskeleton in accordance with one or more embodiments disclosed herein.

In one or more embodiments, the postural lifting exoskeleton includes, at least: (i) the first electric actuator (130D); (ii) the power supply (126); and/or (iii) the fourth frame, in which the bottom side of the fourth frame is tagged as "133C", the right side of the fourth frame is tagged as "133B", and the left side of the fourth frame is tagged as "133A". In one or more embodiments, in order to remove the power supply (126) from the exoskeleton (for example, via its handle), a related administrator may first need to disconnect one or more power cables and then unfasten the latch (e.g., 150, FIG. 1.10A).

Turning now to FIG. 1.10C, FIG. 1.10C illustrates a closer rear view of the postural lifting exoskeleton in accordance with one or more embodiments disclosed herein.

In one or more embodiments, the postural lifting exoskeleton includes, at least: (i) the first part (125A) of the power supply safety belt that is affixed to the bottom side of the fourth frame, in which the bottom side of the fourth frame is tagged as "133C", the right side of the fourth frame is tagged as "133B", and the left side of the fourth frame is tagged as "133A"; and/or (ii) the power supply (126), which is located at the rear side of the exoskeleton and is operatively connected (or mounted) to the bottom side (133C) of the fourth frame. In one or more embodiments, an area of the power supply (126) may be less than or equal to an area of the bottom side (133C) of the fourth frame.

As used herein, "mounting" a particular component on another component refers to positioning the particular component to be in physical contact with the other component, such that the other component provides structural support, positioning, structural load transfer, stabilization, shock absorption, some combination thereof, or the like with regard to the particular component.

Turning now to FIG. 1.10D, FIG. 1.10D illustrates a closer rear view of the postural lifting exoskeleton in accordance with one or more embodiments disclosed herein.

In one or more embodiments, the postural lifting exoskeleton includes, at least: (i) the third control panel (141) that is located at the rear side of the exoskeleton and is operatively connected (or mounted) to the bottom side of the fourth frame, in which the bottom side of the fourth frame is tagged as "133C" (see FIG. 1.10C), the right side of the fourth frame is tagged as "133B", and the left side of the fourth frame is tagged as "133A"; and/or (ii) the power supply (126), which is located at the rear side of the exoskeleton and is operatively connected (or mounted) to the bottom side of the fourth frame.

In one or more embodiments, as being the "brain" area of the postural lifting exoskeleton, the third control panel (141) may be a computing device (or may represent an embedded system) to manage/control various components/modules (e.g., lifting/lowering/adjustment electric actuators (e.g., 130A-D, FIG. 1.6), the footplate electric actuator (e.g., 163, FIG. 1.9), the first control panel (e.g., 106, FIG. 1.1), the second control panel (e.g., 110, FIG. 1.1), the first electric motor (120A), the first braking system, the second electric motor, the second braking system, etc.) of the exoskeleton. To this end, the third control panel (141) may include, at least, a power module and a control module. Each of the aforementioned components may be controlled independently and be configured in accordance with a related user's requirements.

In one or more embodiments, the third control panel (141) and the power supply (126) may be densely positioned/disposed with respect to one another (or stacked on top of each other) at the rear side of the exoskeleton (or at any location on the exoskeleton), without negatively affecting the functionality of each other and the functionality of a set of electrical or mechanical connection cables.

In one or more embodiments, the control module may include/host, at least, an update button, an update acceptance button, a sensor system, one end of the set of electrical or mechanical connection cables (where the other end may be operatively connected to a related component of the exoskeleton), and one or more input ports (e.g., a universal serial bus (USB) input port) to perform, for example, a service maintenance. The update button may be intended to manage the process of updating the exoskeleton's firmware and/or software (and a booting process after performing an update). When the update button is in its "standard position/state", the exoskeleton may operate normally. Additionally, when the update button is in its "update position", the exoskeleton may enter into a firmware and/or software update mode, in which a related administrator may initiate performing, for example, software updates for an application executing on the third control panel (141) via the USB input port. In one or more embodiments, in its update mode, the third control panel (141) may not be able to manage one or more components of the exoskeleton. For this reason, the administrator may need to ensure that no one is using the exoskeleton in this mode. Further, the update acceptance button is intended to accept/reject one or more firmware and/or software updates received for the third control panel (141).

In one or more embodiments, the sensor system may include functionality to, e.g.: (i) capture sensory input (e.g., sensor data) in real-time (e.g., under milliseconds) or near real-time and in the form of text, audio, video, touch or motion (where, the captured data may be grouped as: (a) data that needs no further action and does not need to be stored, (b) data that should be retained for later analysis and/or record keeping, and (c) data that requires an immediate action/response), (iii) provide to other entities, store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the third control panel (141) may perform other functionalities without departing from the scope of the embodiments disclosed herein.

For example, the sensor system may monitor a state of a scene (e.g., objects disposed in a scene). The monitoring may be performed by obtaining sensor data from sensors that are adapted to obtain information regarding the scene, in which the third control panel (141) may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, an orientation/position (relative to gravity) of the chair's components, an orientation of the set of anti-fall wheels (e.g., 116A-B, FIG. 1.1), an orientation of the footplate (e.g., 114, FIG. 1.1), etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors affixed at different locations on the exoskeleton. A sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a position sensor, a biological sensor, a differential pressure sensor, a corrosion sensor, a pressure sensor, an inertial measurement sensor, a vibration sensor, etc.

In one or more embodiments, one or more sensors may be mounted/affixed to appropriate control locations on the exoskeleton.

As used herein, "software" may mean (but not limited to), one or more computer readable (or executable) instructions that cause a computer or other electronic device to perform functions, actions, or behave in a desired manner. The instructions may be embodied in various forms such as routines, algorithms, or programs including separate applications (or code) from dynamically linked libraries. Software may also be implemented in various forms such as a stand-alone program, a function call, a servlet, an applet, instructions stored in memory, part of an operating system, or other type of executable instructions. It will be appreciated by one of ordinary skill in the art that the form of software is dependent on, for example, requirements of a desired application, the environment it executes on, or the requirements of a programmer, or the like.

While described as a physical device, the control module may be implemented as a logical entity (e.g., a program executing using a number of printed circuit board components (not shown)). For example, the third control panel (141) may host a program that provides the functionality of the control module.

In one or more embodiments, the power module may include power management electronics and may be configured to manage a power distribution to a component of the exoskeleton. Said another way, the power module may be configured to determine which component(s) of the exoskeleton need to receive power from the power supply (126). For example, when the first drive wheel (e.g., 118A, FIG. 1.11A) needs to be activated, the power supply (126) may be instructed by the power module to provide/distribute power to the first electric motor (e.g., 120A, FIG. 1.1) using, for example, a pulse-width-modulation (PWM) signal. As yet another example, when the first electric actuator (e.g., 130D, FIG. 1.5) needs to be activated, the power supply (126) may be instructed by the power module to distribute power to the first electric actuator.

While described as a physical device, the power module may be implemented as a logical entity. For example, the third control panel (141) may host a program that provides the functionality of the power module.

As used herein, a "computing device" may be a mechanical structure for housing of, for example, the control module and power module. The computing device may be adapted to utilize services provided by other components of the exoskeleton. In one or more embodiments, the computing device may be ready-to-use (e.g., pre-configured with software, hardware, etc.) when deployed to, for example, to a customer site. However, the customer may alter a configuration of the pre-configured computing device after the deployment. For example, the customer may increase memory capacity of the computing device after the deployment. As yet another example, the customer may increase processor capacity of the computing device after the deployment.

In one or more embodiments, to provide services (e.g., information processing, communications, data storage, data retrieval, simulations, operational control, etc.), a computing device may utilize resources provided by a number of hardware components hosted within the computing device. The computing device may include one or more computer processors (e.g., a processor may refer to an integrated circuit for processing instructions), non-persistent storage devices (e.g., volatile memory devices), persistent storage devices (e.g., non-transitory computer readable medium), one or more printed circuit boards, a communication interface (e.g., Bluetooth interface, infrared interface, network interface, optical interface, etc., that includes an integrated circuit for connecting the computing device to a network (e.g., a local area network (LAN), a wide area network (WAN), Internet, etc.) and/or to another device), one or more input devices (e.g., a touchscreen, a keyboard, a mouse, a microphone, a touchpad, an electronic pen, etc.), one or more output devices (e.g., a display, a printer, an external storage device, etc.), peripheral components interconnects, special purpose hardware components, and numerous other components. One or more of the output devices may be the same or different from the input devices. The input and output devices may be locally or remotely connected to the computer processors, non-persistent storage devices, and persistent storage devices. Many different types of computing devices exist, and the aforementioned input and output devices may take other forms.

As used herein, "computing" refers to any operations that may be performed by a computer, including (but not limited to): computation, data storage, data retrieval, communications, etc.

Turning now to FIG. 1.11A, FIG. 1.11A illustrates a closer side view of the postural lifting exoskeleton in accordance with one or more embodiments disclosed herein.

In one or more embodiments, the postural lifting exoskeleton (in its standing position) includes, at least: (i) the first anti-fall wheel (116A) (in its "touching the ground" position, enabled by the third control panel (e.g., 141, FIG. 1.10D)) that is operatively connected to the left side (e.g., 133A, FIG. 1.1) of the fourth frame; (ii) the first traction system including the first drive wheel (118A), the first electric motor (120A), and the first braking system that are operatively connected to the left side of the fourth frame; (iii) the footplate (114); and/or (iv) the first swivel wheel (122A) with the fork that is operatively connected to the left side of the fourth frame.

In one or more embodiments, the first electric motor (120A) is capable to provide power to (or cut off power to)

(with the help of the third control panel (e.g., 141, FIG. 1.10D)) to the first drive wheel (118A). Further, each of the set of anti-fall wheels (e.g., 116A-B) may be in its "touching the ground" position (a) to provide support to a related user when the user is performing an operation at a workbench, (b) to prevent the exoskeleton from tipping forward, and (c) to improve accuracy, mobility performance, and stabilization of the exoskeleton so that the user may use the exoskeleton more safely and accurately to perform one or more operations.

Turning now to FIG. 1.11B, FIG. 1.11B illustrates a closer isometric view of the postural lifting exoskeleton in accordance with one or more embodiments disclosed herein.

In one or more embodiments, the postural lifting exoskeleton (in its sitting position) includes, at least: (i) the second anti-fall wheel (116B) (in its "retracted" position, enabled by the third control panel (e.g., 141, FIG. 1.10D)) that is operatively connected to the right side (e.g., 133B, FIG. 1.1) of the fourth frame via its fork (143B); (ii) the second traction system including the first drive wheel (118B), the second electric motor, and the second braking system that are operatively connected to the right side of the fourth frame; (iii) the footplate (114); and/or (iv) a first footplate guide (142B) that operatively connect the footplate (114) to the front side of the fourth frame (e.g., the footplate is operatively connected to the fourth frame that is affixed to the third frame).

Turning now to FIG. 1.11C, FIG. 1.11C illustrates a closer isometric view of an anti-fall wheel of the postural lifting exoskeleton in accordance with one or more embodiments disclosed herein.

In one or more embodiments, the postural lifting exoskeleton (in its standing position) includes, at least: (i) the second anti-fall wheel (116B) (in its "touching the ground" position) that is operatively connected to the right side (e.g., 133B, FIG. 1.1) of the fourth frame via its fork (143B); (ii) the second traction system including the second drive wheel (118B), the second electric motor, and the second braking system that are operatively connected to the left side of the fourth frame; (iii) the footplate (114); (iv) the first footplate guide (142B) that operatively connect the footplate (114) to the front side of the fourth frame; and/or (v) a wheel axle (144B) of the second anti-fall wheel (116B).

Turning now to FIG. 1.11D, FIG. 1.11D illustrates a closer isometric view of an anti-fall wheel of the postural lifting exoskeleton in accordance with one or more embodiments disclosed herein.

In one or more embodiments, the postural lifting exoskeleton includes, at least: (i) the wheel axle (144B) of the second anti-fall wheel (e.g., 116B, FIG. 1.11C) that is operatively connected to the right side (e.g., 133B, FIG. 1.1) of the fourth frame via its fork; and/or (ii) an "automatic" electric actuator (145B) that manages the position (e.g., the "touching the ground" position, the "retracted" position, etc.) of the second anti-fall wheel (upon receiving a request/signal from the third control panel (e.g., 141, FIG. 1.10D)).

Turning now to FIG. 1.12A, FIG. 1.12A illustrates a fifth isometric view of the postural lifting exoskeleton (with a closer view of a drive wheel and a swivel wheel) in accordance with one or more embodiments disclosed herein.

In one or more embodiments, the postural lifting exoskeleton (in its sitting position) includes, at least: (i) the first traction system including the first drive wheel (118A), the first electric motor (120A), and the first braking system that are operatively connected to the left side (e.g., 133A, FIG. 1.1) of the fourth frame; (ii) the first electric motor cover (149A); (iii) the first swivel wheel (122A) with its fork that is operatively connected to the left side of the fourth frame; (iv) the first anti-fall wheel (116A) that is operatively connected to the left side of the fourth frame; (v) a first mounting axle/shaft (146A) that is used to mount/fix the first drive wheel (118A) to the first electric motor (120A); and/or (vi) a second mounting axle (147A) that is used to mount the first swivel wheel (122A) to its fork.

Turning now to FIG. 1.12B, FIG. 1.12B illustrates an electric motor of the postural lifting exoskeleton in accordance with one or more embodiments disclosed herein.

As used herein, an electric motor (e.g., 120A) is a component that converts electrical energy into mechanical energy, usually in the form of rotational motion. Said another way, an electric motor is a device that uses electric power to generate motive power. An electric motor may be electrically powered either by a battery pack (e.g., 126, FIG. 1.10A) or by being plugged into a power source using, for example, a power cord (e.g., a power wire, a power cable, etc.). Electric motors may be in many different forms depending on the type of current flow they use, the design of their coils (e.g., windings), and how they generate a magnetic field.

As used herein, a "cable" includes any cable, conduit, or line that carries one or more conductors and that is flexible over at least a portion of its length. A cable may include a connector portion, such as a plug, at one or more of its ends.

In one or more embodiments, as a part of the first traction system, the first electric motor (120A) (e.g., 320 Watt (W) DC 24V motor) may include, at least, the first mounting axle/shaft (146A) that is used to mount/fix the first drive wheel to the first electric motor (120A) and a first physical lock (148A) that allows/blocks rotation of the first drive wheel (and, indirectly, allows/blocks movement of the postural lifting exoskeleton from a first location in an environment to a second location in the environment).

Similarly, as a part of the second traction system, the second electric motor may include, at least, a third mounting axle (not shown) that is used to mount the second drive wheel (e.g., 118B, FIG. 1.1) to the second electric motor and a second physical lock (not shown) that allows/blocks rotation of the second drive wheel (and, indirectly, allows/blocks movement of the postural lifting exoskeleton from the first location to the second location).

Turning now to FIG. 1.12C, FIG. 1.12C illustrates a sixth isometric view of the postural lifting exoskeleton (with a closer view of a physical lock) in accordance with one or more embodiments disclosed herein.

In one or more embodiments, the postural lifting exoskeleton (in its sitting position) includes, at least: (i) the first electric actuator (130D); (ii) the second electric actuator (130A); (ii) the left side (133A), the right side (133B), and the bottom side (133C) of the fourth frame; (iii) the power supply (126), which is located at the rear side of the exoskeleton and is operatively connected to the bottom side (133C) of the fourth frame; (iv) the first shock absorber (117A) that is operatively connected to the left side (133A) of the fourth frame; (v) the first electric motor cover (149A); and/or (vi) the first physical lock (148A).

Turning now to FIGS. 1.12D-E, FIGS. 1.12D-E illustrate a seventh isometric view of the postural lifting exoskeleton (with a closer view of a swivel wheel) in accordance with one or more embodiments disclosed herein. Referring to FIG. 1.12D, FIG. 1.12D shows how to remove the first swivel wheel (122A) (with its fork (153A) and a fourth mounting axle (152A) that is affixed to the fork (153A)) from a first mounting housing/bushing (154A). As indicated, to perform the removal process, a spanner (or a wrench) may be used to remove/open a fixing nut (151A) that holds the fourth mounting axle (152A) in place.

As indicated by FIG. 1.12E, the fixing nut (151A) is located on an upper side of the first mounting bushing (154A), in which, by turning the fixing nut (151A) counterclockwise, an administrator may open the fixing nut (151A) and perform the removal of the first swivel wheel (122A) (with its fork (153A) and the fourth mounting axle)).

Turning now to FIG. 1.12F, FIG. 1.12F illustrates an eighth isometric view of the postural lifting exoskeleton (with a closer view of an anti-fall wheel) in accordance with one or more embodiments disclosed herein. Referring to FIG. 1.12F (right zoomed-in view), FIG. 1.12F shows how to remove the first anti-fall wheel (116A) (with its fork (143A) and a fifth mounting axle (155A) that is affixed to the fork (143A)) from a second mounting bushing (156A). As indicated, to perform the removal process, a spanner (or a wrench) may be used to remove a second fixing nut (151B) that holds the fifth mounting axle (155A) in place.

Further, referring to FIG. 1.12F (left zoomed-in view), the second fixing nut (151B) is located on an upper side of the second mounting bushing (156A), in which, by turning the second fixing nut (151B) counterclockwise, an administrator may open the second fixing nut (151B) and perform the removal of the first anti-fall wheel (116A) (with its fork (143A) and the fifth mounting axle)).

Turning now to FIG. 1.13, FIG. 1.13 illustrates a ninth isometric view of the postural lifting exoskeleton (with a closer view of the first control panel and the second control panel) in accordance with one or more embodiments disclosed herein.

Referring to FIG. 1.13 (left zoomed-in view), the first control panel (106) is affixed to the first armrest (104B) via the first connecting rod (107B) and the knob (157B), in which an administrator may horizontally adjust a position of the first control panel (106), via the knob (157B), along the first connecting rod (107B) (or along the first armrest).

Referring to FIG. 1.13 (right zoomed-in view), the second control panel (110) is affixed to the second armrest (104A) via the second connecting rod (107A) and the knob (157A), in which the administrator may horizontally adjust a position of the second control panel (110), via the knob (157A), along the second connecting rod (107A) (or along the second armrest).

Turning now to FIG. 1.14, FIG. 1.14 illustrates a tenth isometric view of the postural lifting exoskeleton (with a closer view of the first control panel) in accordance with one or more embodiments disclosed herein.

Referring to FIG. 1.14, the first control panel (106) is affixed to the first armrest (104B) via the first connecting rod (107B), in which the first armrest (104B) is affixed to the right side of the first portion (102) and the first control panel (106) includes, at least, a charger port (159) to charge/recharge the power supply (e.g., 126, FIG. 1.1).

FIGS. 1.15A-C illustrate a closer view of a front side of the postural lifting exoskeleton in accordance with one or more embodiments disclosed herein.

Turning now to FIG. 1.15A, the postural lifting exoskeleton (in its sitting position) includes, at least: (i) the first anti-fall wheel (116A) (in its "touching the ground" position) and the second anti-fall wheel (116B) (in its "touching the ground" position); (ii) the first drive wheel (118A) and the second drive wheel (118B); (iii) a first side guide (161B) (which is operatively connected to the front side (164) of the fourth frame) for height adjustment of the first footplate guide (142B); (iv) a second side guide (161A) (which is operatively connected to the front side (164) of the fourth frame) for height adjustment of a second footplate guide (142A); (v) the footplate (114); (vi) the first knee support component (112B) and the second knee support component (112A); (vii) the L-shaped connecting rod (113) that is welded to the connecting rod (e.g., 111, FIG. 1.1) in order to operatively connect the first knee support component (112B) and the second knee support component (112A) to the front side (164) of the fourth frame; (viii) the timed electric actuator (160) that controls oscillation/movement of the footplate (114); and/or (ix) the adjustment knob (162) to adjust a vertical position (relative to the ground) of the first knee support component (112B) and the second knee support component (112A).

In one or more embodiments, upon receiving a request/signal from the third control panel (e.g., 141, FIG. 1.10D), the timed electric actuator (160) may control oscillatory movement of the footplate (114) in terms of, at least, a number of oscillations per drive cycle, an oscillation angle, and/or an interval between drive cycles. Further, upon receiving a request/signal from the third control panel, the footplate electric actuator (163) may adjusts the height of the footplate (114) from the ground (along the first side guide (161B) and the second side guide (161A), via the first footplate guide (142B) and the second footplate guide (142A)).

In one or more embodiments, the footplate (114) may have a functionality for stimulating the return of venous blood (of a related user) and ensuring the user's safe use of the postural lifting exoskeleton for prolonged periods. For example, once the user is in the orthostatic position, the footplate's oscillatory movement may cause the user's ankles to move upwards and downwards in order to, at least, improve the user's blood circulation/flow, minimize a risk of clot formation in the user's lower limbs, improve a functioning of the user's urinary tract, promote the user's foot dorsiflexion, decrease the user's possible leg muscle spasticity, and/or improve a functioning of the user's digestive tract.

As indicated above, the footplate (114) (in conjunction with the timed electric actuator (160), in which both components form a system called circulatory support system (CSS)) performs the function of the human calf in the gait process/cycle, something lost in the condition of paraplegia and limited in the condition of amputation. To this end, the CSS promotes foot dorsiflexion (e.g., reducing and increasing the anterior angle of an ankle) automatically, in which the foot dorsiflexion, at least, (i) improves venous blood's return to the user's heart (to maintain regular diastolic and systolic blood pressure) and (ii) can be programmed via the second control panel (e.g., 110, FIG. 1.1) at a certain number of cycles per minute.

Turning now to FIG. 1.15B, the postural lifting exoskeleton (in its sitting position) includes, at least: (i) the first anti-fall wheel (in its "retracted" position) and the second anti-fall wheel (116B) (in its "retracted" position); (ii) the first drive wheel (118A) and the second drive wheel (118B); (iii) the first side guide (which is operatively connected to the front side of the fourth frame) for height adjustment of the first footplate guide; (iv) the second side guide (161A) (which is operatively connected to the front side of the fourth frame) for height adjustment of the second footplate guide; (v) the footplate (114); (vi) the first knee support component (112B) and the second knee support component (112A); (vii) the L-shaped connecting rod (113) that is welded to the connecting rod in order to operatively connect the first knee support component (112B) and the second knee support component (112A) to the front side of the fourth frame; (viii) the timed electric actuator (160) that controls oscillatory movement of the footplate (114); (ix) the footplate electric actuator (163); and/or (ix) the adjustment knob (162) to adjust a vertical position (relative to the ground) of the first knee support component (112B) and the second knee support component (112A).

Turning now to FIG. 1.15C, the postural lifting exoskeleton includes, at least: (i) the second side guide (161A) (which is operatively connected to the front side of the fourth frame) for height adjustment of the second footplate guide; (ii) the footplate (114); and/or (iii) the timed electric actuator (160) that controls oscillatory movement of the footplate (114), in which the oscillatory movement of the footplate (114) is indicated by a curved arrow.

Turning now to FIG. 1.16, FIG. 1.16 illustrates adjustment capabilities of (i) the second portion of the chair and (ii) the first portion of the chair (indicated with double-sided arrows) of the postural lifting exoskeleton in accordance with one or more embodiments disclosed herein.

In one or more embodiments, upon receiving a request from a related user via the second control panel (e.g., 110, FIG. 1.1), the third control panel (e.g., 141, FIG. 1.10D) may trigger (or send a signal to) the first electric actuator (e.g., 130D, FIG. 1.6) that is affixed to the first frame (129) to perform one or more backrest elevation/height adjustments of the first frame (129) (e.g., to perform vertical slide up/down movements of the first portion (102)), along the first sliding mechanism (e.g., 164A, FIG. 1.2), for the user's comfort and safety. In one or more embodiments, the user may send this request, for example (but not limited to), for a better eye-level conversation with a colleague, for an easy transfer to the exoskeleton, and/or for reaching higher areas in a work environment.

In one or more embodiments, upon receiving another request from the user via the second control panel (e.g., 110, FIG. 1.1), the third control panel (e.g., 141, FIG. 1.10D) may trigger the second electric actuator (e.g., 130A, FIG. 1.2) that is affixed to the second frame (e.g., 131, FIG. 1.2) and the third frame (127) to perform one or more backrest angle/incline/tilt adjustments of the first frame (129) (e.g., to perform incline movements of the first portion (102)) for the user's comfort and safety. In one or more embodiments, the user may send this request, for example (but not limited to), to accommodate his/her postural deformities and/or to ease pain.

In one or more embodiments, upon receiving another request from the user via the second control panel (e.g., 110, FIG. 1.1), the third control panel (e.g., 141, FIG. 1.10D) may trigger the third electric actuator (e.g., 130B, FIG. 1.6) that is operatively connected to the front side (e.g., 164, FIG. 1.15A) of the fourth frame and the third frame (127) to perform one or more horizontal seating position adjustments of the third frame (127) (e.g., to perform horizontal slide up/down movements of the second portion (108)) for the user's comfort and safety. In one or more embodiments, the user may send this request, for example (but not limited to), for an easy transfer to the exoskeleton, to accommodate his/her postural deformities, and/or to ease pain.

Turning now to FIG. 1.17, FIG. 1.17 illustrates adjustment capabilities of the first armrest of the chair (indicated with an arrow) of the postural lifting exoskeleton in accordance with one or more embodiments disclosed herein.

In one or more embodiments, for his/her comfort and safety (e.g., before performing an operation at a workstation) and/or while transferring a related user from his/her chair to the postural lifting exoskeleton, the user may move (e.g., raise, lower, etc.) a corresponding armrest (e.g., the first armrest (104B) and/or the second armrest (104A)) manually. Said another way, for example, the user is allowed to bring the first armrest (104B) from a first position to a second position, in which the first position and second position are perpendicular to each other. Similarly, for example, the user is also allowed to bring the second armrest (104A) from the first position to second position.

Turning now to FIG. 1.18, FIG. 1.18 illustrates (i) a first adjustment knob (indicated in the top zoomed-in view) to adjust a position of a set of knee support components and (ii) a second adjustment knob (indicated in the bottom zoomed-in view) to adjust a position of the set of knee support components of the postural lifting exoskeleton in accordance with one or more embodiments disclosed herein.

Referring to the top zoomed-in view of FIG. 1.18, for his/her comfort and safety (e.g., before performing an operation at a workstation) and/or while transferring a related user from his/her chair to the postural lifting exoskeleton, the user may adjust a horizontal position of the first knee support component (112B) and the second knee support component (112A) via the first adjustment knob (165) manually. Further, as indicated in both zoomed-in views, the first knee support component (112B) and the second knee support component (112A) are operatively connected to each other via the connecting rod (111), in which the L-shaped connecting rod (113) that is welded to the connecting rod (111).

Referring to the bottom zoomed-in view of FIG. 1.18, for his/her comfort and safety (e.g., before performing an operation at a workstation) and/or while transferring the user from his/her chair to the postural lifting exoskeleton, the user may adjust the vertical position (relative to the ground and/or relative to the first calf support component (115B) and the second calf support component (115A)) of the first knee support component (112B) and the second knee support component (112A) via the first adjustment knob (162) manually.

Turning now to FIG. 1.19, FIG. 1.19 illustrates how to operate the physical lock of the postural lifting exoskeleton in accordance with one or more embodiments disclosed herein.

Referring to FIG. 1.19, the first physical lock (148A) may allow or block rotation of the first drive wheel (e.g., 118A, FIG. 1.1) and, indirectly, may allow or block movement of the postural lifting exoskeleton from a first location in an environment to a second location in the environment. Similarly, the second physical lock (not shown) may allow or block rotation of the second drive wheel (e.g., 118B, FIG. 1.1) and, indirectly, may allow or block movement of the postural lifting exoskeleton from the first location to the second location.

For example, upon receiving a request from the user via the first control panel and when the physical locks are off, the third control panel may trigger the set of drive wheels via the set of electric motors to transport the user from a first location in an environment to a second location in the environment.

In one or more embodiments, to manually operate the exoskeleton, these physical locks may need to be released (so that the drive wheels can rotate) by turning each physical lock counterclockwise. While turning each physical lock counterclockwise (indicated with an arrow), a related user may not move the exoskeleton using a joystick (e.g., 229, FIG. 2.2) of the first control panel (e.g., 220, FIG. 2.2). In one or more embodiments, each of the locks may be composed of an electric solenoid that actuates a mechanical locking mechanism, with its own control and actuation circuit that may be housed underneath the first electric motor cover (149A), near the first shock absorber (117A).

Turning now to FIG. 1.20, FIG. 1.20 illustrates movement capabilities (indicated with arrows) of the footplate of the postural lifting exoskeleton in accordance with one or more embodiments disclosed herein.

In one or more embodiments, upon receiving a request from a related user via the second control panel (e.g., 110, FIG. 1.1), the third control panel (e.g., 141, FIG. 1.10D) may trigger the timed electric actuator (e.g., 160, FIG. 1.15A) to change oscillatory movement of the footplate (114) in terms of, at least, a number of oscillations per drive cycle, an oscillation angle, and/or an interval between drive cycles (indicated by a double-sided circular arrow).

In one or more embodiments, upon receiving another request from the user via the second control panel (e.g., 110, FIG. 1.1), the third control panel (e.g., 141, FIG. 1.10D) may trigger the footplate electric actuator (e.g., 163, FIG. 1.15A) to adjust the height of the footplate (114) from the ground (along the first side guide (e.g., 161B, FIG. 1.15A) and the second side guide (e.g., 161A, FIG. 1.15A), via the first footplate guide (142B) and the second footplate guide (142A)), as indicated by a double-sided arrow. Further, referring to FIG. 1.20, the first footplate guide (142B) and the second footplate guide (142A) are operatively connected to the front side (164) of the fourth frame.

Turning now to FIG. 2.1A, FIG. 2.1A illustrates an isometric view of the second control panel of the postural lifting exoskeleton in accordance with one or more embodiments disclosed herein.

In one or more embodiments, as being the HMI module (e.g., as being a computing device), the second control panel (200) includes, at least, a case/structure (201) that hosts a set of navigation buttons (e.g., an “up” button (203), a “down” button (205), etc.), a “power on/off” button (207), an “elevate” button (206), an “enter/confirm” button (204), and a display (202). These buttons may allow a related user to navigate through different menus and/or pages (see FIGS. 2.1B-2.1L) on the display (202).

In one or more embodiments, the second control panel (200) is in operative connection with the third control panel (e.g., 141, FIG. 1.10D). Those skilled in the art will appreciate that while the second control panel (200) is shown as affixed to the second armrest (e.g., 104A, FIG. 1.1), the second control panel (200) may be affixed to any component of the exoskeleton without departing from the scope of the embodiments disclosed herein. Further, those skilled in the art will appreciate that the second control panel (200) may be supplied with power directly or indirectly without departing from the scope of the embodiments disclosed herein.

In one or more embodiments, (i) in order to activate the elevation of the exoskeleton (e.g., to transform the exoskeleton from its sitting position (or its first position) (see FIG. 1.1) to its standing position (or its second position) (see FIG. 1.3)), a related user may need to press the elevate button (206), (ii) the up button (203) and the down bottom (205) may allow the user to see an animation indicating which option the user is currently in (when the display (202) shows a home screen (e.g., a main menu)), (iii) when the user presses the down button (205) twice, the user will be taken to a status screen (see FIG. 2L) so that the user can check the status of the exoskeleton, (iv) by pressing the up button (203), the user may navigate through different control options so that the user may change one or more settings (e.g., elevating the footplate (e.g., 114, FIG. 1.1), changing an oscillation angle of the footplate, etc.) of the exoskeleton, (v) by pressing the down button (205), the user may navigate through different control options so that the user may change one or more settings (e.g., lowering the footplate (e.g., 114, FIG. 1.1), changing an oscillation angle of the footplate, etc.) of the exoskeleton, (vi) the enter button (204) may provide one or more functionalities (e.g., confirming actions, accessing options, etc.) to the user (see FIG. 2.1C), and/or (vii) the power on/off button (207) may allow the user to power on/off the second control panel (200), in which the power on/off button (207) does not activate/de-activate the first control panel (e.g., 106, FIG. 1.1) and the third control panel (e.g., 141, FIG. 1.10D).

The second control panel (200) may enable, at least, anthropometric adjustments of the exoskeleton for different users (e.g., for different body types), for example, by allowing a user to adjust (based on the user’s preference) one or more settings of the CSS (e.g., the footplate (e.g., 114, FIG. 1.1) and the timed electric actuator (e.g., 160, FIG. 1.9)) for better user adaptation and usability in a manufacturing environment. In one or more embodiments, the user may use an initiation mechanism (e.g., the enter button (204), the elevate button (206), etc.) to signal the third control panel (e.g., 141, FIG. 1.10D) for instructing the power supply (e.g., 126, FIG. 1.3) so that a corresponding component(s) (e.g., the fourth electric actuator (e.g., 130C, FIG. 1.6)) may receive power (from the power supply) to perform what the user is requested (e.g., transforming the exoskeleton from its sitting position (see FIG. 1.1) to its standing position (see FIG. 1.3) so that the user can be transferred from a sitting position to an upright position).

In one or more embodiments, anthropometric adjustments may include, for example (but not limited to): backrest (e.g., 102, FIG. 1.1) elevation adjustments, backrest angle adjustments, seat (e.g., 108, FIG. 1.1) elevation adjustments, horizontal seating position adjustments, adjustments to elevate/lower the footplate (e.g., 114, FIG. 1.1), etc.

In one or more embodiments, a graphical user interface (GUI) may be displayed on the display (202) using functionalities of a display engine (not shown), in which the display engine is operatively connected to the second control panel (200). The display engine may be implemented using hardware (or a hardware component), software (or a software component), or any combination thereof. One or more screens (see FIGS. 2.1B-2.1L) may be displayed in any visual format that would allow the user to easily comprehend (e.g., read and parse) listed information on the display (202).

One of ordinary skill will appreciate that the second control panel (200) may perform other functionalities without departing from the scope of the embodiments disclosed herein.

Turning now to FIG. 2.1B, FIG. 2.1B illustrates (i) a home screen of the second control panel and (ii)-(iii) how to navigate through different options provided by the home screen (indicated with arrows) in accordance with one or more embodiments disclosed herein.

Referring to FIG. 2.1B(i), the display (202) may show the home screen of the second control panel, in which, by pressing the up button (e.g., 203, FIG. 2.1A) or the down button (e.g., 205, FIG. 2.1A), a related user may navigate through different icons (top to bottom) to view one or more available settings/adjustments listed under a specific icon. For example, by viewing a top icon (where the currently viewed icon is surrounded with a square), the user may view “status”, “angle”, and “cycle” as available settings/options to select (or act on).

As yet another example, referring to FIG. 2.1B(ii)-(iii) and by pressing the down button (e.g., 205, FIG. 2.1A), the user may navigate to a middle icon (indicated with a down arrow symbol) to view available settings listed under the middle icon and may navigate to a bottom icon (indicated with a down arrow symbol) to view available settings listed under the bottom icon.

Turning now to FIG. 2.1C, FIG. 2.1C illustrates (i) how to select an option on the display of the second control panel and (ii) different chair adjustment options provided by the second control panel of the postural lifting exoskeleton in accordance with one or more embodiments disclosed herein.

Referring to FIG. 2.1C(i), the enter button (e.g., 204, FIG. 2.1A) may provide one or more functionalities (e.g., confirming actions, accessing options, etc.) to a related user via the display (202). For example, when/after the user presses the enter button (e.g., 204, FIG. 2.1A) (indicated by a horizontal arrow) while viewing the settings provided under the middle icon, the user may notice that the image of the middle icon is changed (e.g., via a color change, via removing the square surrounding the middle icon, etc.). Further, in this example, when/after the user presses the enter button (e.g., 204, FIG. 2.1A), the user may also notice that the appearance of a guiding triangle near an option (e.g., ▷ Backrest) that is listed under the middle icon, in which the guiding triangle indicates the option the user is currently operating on.

Referring to FIG. 2.1C(ii), the user may use the up button (e.g., 203, FIG. 2.1A) and the down button (e.g., 205, FIG. 2.1A) to navigate through a current submenu (e.g., through the options provided by the middle icon), as well as enter the current submenu using the enter button (e.g., 204, FIG. 2.1A). Further, using the enter button, the user may confirm one or more settings that are previously defined (by the user) under the current submenu.

In one or more embodiments, using adjustment options displayed under the middle icon/page, the user may perform one or more ergonomic adjustments (by pressing the up button, the down button, and/or the enter button), for example, (a) backrest related adjustments such as backrest elevation/height adjustments and backrest incline adjustments (see FIG. 1.16), (b) seat related adjustments such as horizontal seating position adjustments (see FIG. 1.16), and (c) base (e.g., the footplate (e.g., 114, FIG. 1.1)) related adjustments such as footplate elevation/height adjustments (see FIG. 1.20).

Turning now to FIG. 2.1D, FIG. 2.1D illustrates an elevation decision screen provided by the display of the second control panel in accordance with one or more embodiments disclosed herein.

Referring to FIG. 2.1D, a related user may press the elevate button (e.g., 206, FIG. 2.1A) to elevate the exoskeleton (e.g., to transform the exoskeleton from its sitting position (see FIG. 1.1) to its standing position (see FIG. 1.3) so that the user can be transferred from a sitting position to an upright/orthostatic position). Before initiating the elevation of the exoskeleton, the user may be asked to confirm his/her elevation decision on a decision screen shown on the display (202). To confirm the elevation decision, the user may need to press the enter button (e.g., 204, FIG. 2.1A) on the "YES" option. If the user mistakenly pressed the elevate button (e.g., 206, FIG. 2.1A) and/or does not want to elevate the exoskeleton, the user may need to press the down button (e.g., 205, FIG. 2.1A) and then press the enter button (e.g., 204, FIG. 2.1A) on the "NO" option.

Turning now to FIG. 2.1E-F, FIG. 2.1E-F illustrate elevation status of the exoskeleton provided by the display of the second control panel in accordance with one or more embodiments disclosed herein.

Referring to FIG. 2.1E, after the user confirmed his/her elevation decision on the decision screen (see FIG. 2.1D), the display (202) shows an elevation status to the user. For example, a first elevation status may indicate "in progress" while the exoskeleton is being elevated by the fourth electric actuator (e.g., 130C, FIG. 1.6). As yet another example and referring to FIG. 2.1F, a second elevation status may indicate "completed" once the elevation of the exoskeleton is completed. Once the exoskeleton is transferred to its standing/raised position (see FIG. 1.3), the user may use the first control panel (e.g., 106, FIG. 1.1) to move the exoskeleton in the lowest speed (e.g., "speed mode 1"), for example, to approach a workbench.

Additionally, after these two statuses are shown to the user on the elevation status screen, the display (202) may start showing the home screen to the user so that the user may operate the exoskeleton normally, for example, to make seat adjustments and/or to start working on the workbench at production line.

Turning now to FIG. 2.1G, FIG. 2.1G illustrates different options provided by the home screen (presented as (i)-(ii)) of the second control panel in accordance with one or more embodiments disclosed herein.

Referring to FIG. 2.1G, the display (202) may show the home screen of the second control panel, in which, by pressing the up button (e.g., 203, FIG. 2.1A) or the down button (e.g., 205, FIG. 2.1A), a related user may navigate through different icons (top to bottom) to view one or more available settings/adjustments listed under a specific icon. For example, by viewing a top icon (where the currently viewed icon is surrounded with a square), the user may view "status", "angle", "cycle", "time", and "exit" as available settings/options to select (or act on). In one or more embodiments, in order to exit from a page that the user is currently viewing, the user may need to use the up button (e.g., 203, FIG. 2.1A) or the down button (e.g., 205, FIG. 2.1A), and then press the enter button (e.g., 204, FIG. 2.1A) on the "exit" option (for example, to go back to the home screen).

As indicated, the second control panel (e.g., 200, FIG. 2.1A) may enable the user to manage the footplate's (e.g., 114, FIG. 1.1) oscillatory movement via a set of oscillation parameter settings including (but not limited to) a number of oscillations per drive cycle (indicated as "cycle"), an oscillation angle (indicated as "angle"), and an interval between drive cycles (indicated as "time"), in which the footplate's oscillatory movement causes the user's ankles to move upwards and downwards.

For example, when/after the user presses the enter button (e.g., 204, FIG. 2.1A) while viewing the "status" setting provided under the first icon (indicated by "▷ Status"), the display (202) may show a current status of the exoskeleton to the user on a status screen (see FIG. 2.1L). In the status screen, the display may specify information about the set of oscillation parameter settings and the exoskeleton's current status (e.g., standing/elevated), in which the information may be expressed in brackets, for example, [an oscillation angle/a number of oscillations per drive cycle/an interval between drive cycles].

Turning now to FIG. 2.1H, FIG. 2.1H illustrates a support decision screen provided by the display of the second control panel in accordance with one or more embodiments disclosed herein.

Referring to FIG. 2.1H, for example, once a related user presses the enter button (e.g., 204, FIG. 2.1A) on the "exit" option (and before bringing the user to the home screen), the user may be asked to confirm his/her circulatory support deactivation decision on a decision screen shown on the display (202). To confirm the circulatory support deactivation decision, the user may need to press the enter button (e.g., 204, FIG. 2.1A) on the "YES" option. If the user does not want to deactivate the circulatory support provided by the footplate (through its oscillatory movement), the user may need to press the down button (e.g., 205, FIG. 2.1A) and then press the enter button (e.g., 204, FIG. 2.1A) on the "NO" option.

Turning now to FIG. 2.1I, FIG. 2.1I illustrates a screen (of the second control panel) that is indicating an oscillation angle set for the footplate of the postural lifting exoskeleton in accordance with one or more embodiments disclosed herein.

Referring to FIG. 2.1I, the oscillation angle of the footplate (e.g., 114, FIG. 1.1) may vary from, for example, 6° to 15°. As displayed on an angle adjustment screen (provided by the display (202)), a current oscillation angle of the footplate is set to 10° by a related user. In one or more embodiments, once the user determines the oscillation angle, the footplate (e.g., 114, FIG. 1.1) may gradually build up to its user-determined oscillation angle (illustrated by upward diagonal stripes) by the timed electric actuator (e.g., 160, FIG. 1.9)) so that the footplate may not suddenly start oscillating (for example, to prevent user discomfort).

Turning now to FIG. 2.1J, FIG. 2.1J illustrates a screen (of the second control panel) that is indicating a number of oscillations per drive cycle set for the footplate of the postural lifting exoskeleton in accordance with one or more embodiments disclosed herein.

Referring to FIG. 2.1J, the number of oscillations per drive cycle of the footplate (e.g., 114, FIG. 1.1) may represent a number of oscillatory movements performed by the footplate. As indicated on a number of oscillation cycles adjustment screen, for example, if the cycle is set to "5×" (by a related user), this means that the footplate will make five oscillations per drive cycle (in each period of time determined by the user (e.g., in each minute)). After the requested number of oscillations are performed, the footplate may return to its starting/original/horizontal position.

Further, referring to FIG. 2.1J, the number of oscillation cycles adjustment screen may also show a current status of the number of oscillation cycles via a status bar (e.g., how much of the oscillations is completed (illustrated by upward diagonal stripes) and how much of the oscillations is not completed).

Turning now to FIG. 2.1K, FIG. 2.1K illustrates a screen (of the second control panel) that is indicating a time interval between drive cycles set for the footplate of the postural lifting exoskeleton in accordance with one or more embodiments disclosed herein.

Referring to FIG. 2.1K, the time interval between drive cycles may indicate a time interval set by a related user between each oscillation/drive cycle. As indicated on a time interval adjustment screen, for example, if the time interval is set to "00:30" seconds (by the user), this means that, in every 30 seconds, the footplate (e.g., 114, FIG. 1.1) will start oscillating. Said another way, the footplate will provide circulatory support to the user at 30 seconds intervals (e.g., a 30-second pattern).

Further, referring to FIG. 2.1K, the time interval adjustment screen may also show how much of the time interval (set by the user) is passed via a time bar (e.g., how much of the time interval is passed (illustrated by upward diagonal stripes) and how much of the time interval is not passed).

Turning now to FIG. 2.1L, FIG. 2.1L illustrates a screen (of the second control panel) that is indicating a status of the postural lifting exoskeleton in accordance with one or more embodiments disclosed herein.

Referring to FIG. 2.1L, the display may specify information about the set of oscillation parameter settings (e.g., the set of circulatory support settings) and the exoskeleton's current status (e.g., standing/elevated), in which the information may be expressed in brackets, for example, [an oscillation angle/a number of oscillations per drive cycle/an interval between drive cycles]. For example, the display may specify the set of oscillation parameter settings as [6/5/30] and the exoskeleton's current status as "standing." In one or more embodiments, the user may be displayed with the information shown in FIG. 2.1L (i) when/after the user presses the enter button (e.g., 204, FIG. 2.1A) while viewing the "status" setting provided under the first icon (indicated by "▷ Status") or (ii) when/after the user presses the down button (e.g., 205, FIG. 2.1A) twice on the home screen.

Turning now to FIG. 2.2, FIG. 2.2 illustrates an isometric view of the first control panel of the postural lifting exoskeleton in accordance with one or more embodiments disclosed herein.

In one or more embodiments, as being a computing device, the first control panel (220) includes, at least, a power supply charge indicator (222), a "power on/off" button (223), a horn button (224), a speed/program indicator (225), a speed decrement button (226A), a speed increment button (226B), a first mode LED (227A), a second mode LED (227B), a first actuator button (228A), a second actuator button (228B), a joystick (229), and a power supply charger input/port (e.g., 159, FIG. 1.14).

In one or more embodiments, the first control panel (220) is in operative connection with the third control panel (e.g., 141, FIG. 1.10D). Those skilled in the art will appreciate that while the first control panel (220) is shown as affixed to the first armrest (e.g., 104B, FIG. 1.1), the first control panel (220) may be affixed to any component of the exoskeleton without departing from the scope of the embodiments disclosed herein. Further, those skilled in the art will appreciate that the first control panel (220) may be supplied with power directly or indirectly without departing from the scope of the embodiments disclosed herein.

In one or more embodiments, the first control panel (220) is a fully programmable, modular electronic controller system that allows a related user to operate the exoskeleton. The user may use the joystick (229) to control the direction and speed of the exoskeleton (more specifically, the direction and speed of each drive wheel (e.g., 118A, 118B, FIG. 1.1) independently) in order to, for example, transport himself/herself from a first location in an environment to a second location in the environment (e.g., when the exoskeleton is in the first position or is in the second position). When the user moves/pushes the joystick (229) from its neutral (center) position, the first control panel (220) sends a signal to the third control panel (e.g., 141, FIG. 1.10D) (i) to release an electromagnetic brake of each drive wheel and (ii) to control the speed and acceleration of each drive wheel so that the user can be travelled, for example, to the second location (in a sitting position or in an orthostatic position). The farther the user pushes the joystick (229) from its neutral position, the faster the exoskeleton moves. When the user releases the joystick (229) and allows the joystick (229) to return its neutral position, the electromagnetic brakes will be engaged, which will cause the exoskeleton to decelerate and come to a complete stop.

In one or more embodiments, the power on/off button (223) may allow the user to power on/off the first control panel (220), in which the power on/off button (203) does not activate/de-activate the second control panel (e.g., 110, FIG. 1.1) and the third control panel (e.g., 141, FIG. 1.10D). Separately, the user should not press the power on/off button (223) button when the joystick (229) is out of its normal/central position.

In one or more embodiments, the user may press the speed increment button (226B) to increase the speed of the drive wheels (e.g., 118A, 118B, FIG. 1.1), for example, while travelling to the second location. Similarly, the user may press the speed decrement button (226A) to decrease the speed of the drive wheels (e.g., 118A, 118B, FIG. 1.1), for example, to perform an operation near a workstation. Further, a current speed setting/level may be displayed on LEDs of the speed indicator (225).

In one or more embodiments, the horn button (224) may activate a warning horn to attract attention of, for example, pedestrians, as the postural lifting exoskeleton is very silent and can move at a speed faster than a person walking.

In one or more embodiments, the power supply charge indicator (222) may include ten LEDs arranged in an arc over the power on/off button (223). The power supply charge indicator (222) may indicate how much charge is left in the power supply (e.g., 126, FIG. 1.1) using LED codes (e.g., left red LEDs flashing slowly or steady, all LEDs blinking once every 2.5 seconds, etc.). When the first control panel (220) is turned on (via the power on/off button (223)), the indicator (222) may show an estimate of remaining charge, where after one minute of operation, the indicator (222) may give more accurate information. For example, as the power supply voltage drops, the number of LEDs reduces from right to left. As yet another example, when the power supply capacity drops to 10% or below, the left red LEDs of the indicator (222) may flash.

In one or more embodiments, the amount of power supply charge may depend on a number of factors, for example (but not limited to): how the exoskeleton is being used, the temperature of the power supply (e.g., 126, FIG. 1.1), how long the power supply has been used, etc. The useful life of the power supply may also reduce with the amount of charging and discharging of the power supply. To ensure longer power supply life, users should not use the exoskeleton with a minimum load.

In one or more embodiments, if the power supply charge indicator (222) shows red, yellow, and green lights, this means that the power supply (e.g., 126, FIG. 1.1) is fully charged. If the indicator (222) does not show green lights, a related user is advised to recharge the power supply. If the indicator (222) only shows red lights, the power supply must be recharged immediately before use.

Further, the power supply charge indicator (222) may also show the status/state of the power supply (e.g., 126, FIG. 1.1). For example, a stable indicator may mean no issues are reported/found with respect to the power supply. As yet another example, a glowing indicator may mean the power supply is charging/recharging.

One of ordinary skill will appreciate that the second control panel (220) may perform other functionalities without departing from the scope of the embodiments disclosed herein.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A postural lifting exoskeleton, comprising:
a chair,
wherein the chair comprises a first portion and a second portion,
wherein a first armrest is affixed to a right side of the first portion and a second armrest is affixed to a left side of the first portion,
wherein a first control panel (CP) is affixed to the first armrest and a second CP is affixed to the second armrest,
wherein a rear side of the first portion is affixed to a first frame, wherein the first frame is affixed to a second frame, wherein the first frame is affixed to a third frame via a first electric actuator (EA),
wherein the second portion is affixed to the third frame, wherein the second frame is affixed to the third frame via a second EA;
a set of EAs comprising at least the first EA and the second EA,
wherein, upon receiving a first request from a user via the second CP, a third CP that is located underneath the third frame triggers at least the first EA and the second EA to transform the exoskeleton from a first position to a second position,
wherein the exoskeleton is transformed to the second position in order to bring the user to an orthostatic position standing on a footplate,
wherein, upon receiving a second request from the user via the second CP, the third CP triggers at least the first EA and the second EA to transform the exoskeleton from the second position to the first position, wherein the exoskeleton is transformed to the first position in order to bring the user to a sitting position on the chair; and
the footplate,
wherein the footplate is operatively connected to a fourth frame that is affixed to the third frame,
wherein, once the user is in the orthostatic position, oscillatory movement of the footplate causes the user's ankles to move upwards and downwards in order to improve the user's blood circulation, and
wherein the oscillatory movement of the footplate is managed by the second CP.

2. The postural lifting exoskeleton of claim 1, wherein the postural lifting exoskeleton is configured for use by the user with a disability in their lower limbs.

3. The postural lifting exoskeleton of claim 1, further comprising:
a set of anti-fall wheels;
a set of safety straps, wherein the user is not allowed to elevate the exoskeleton to the second position without the set of anti-fall wheels and the set of safety straps being in place; and a four-point supporting belt and a leg belt, wherein, once the user is transferred to the exoskeleton, the third control panel ensures that the leg belt and the four-point supporting belt are in place for the user's safety, stability, and productivity in the orthostatic position while operating in a production line.

4. The postural lifting exoskeleton of claim 1, wherein, upon receiving a third request from the user via the second CP, the third CP triggers a first sliding mechanism to ergonomically adjust the first portion, wherein, upon receiving a fourth request from the user via the second CP, the third CP triggers a second sliding mechanism to ergonomically adjust the second portion, wherein, upon receiving a fifth request from the user via the first CP and when a physical lock is off, the third CP triggers a set of wheels via a set of electric motors to transport the user from a first location in an environment to a second location in the environment, and wherein the set of wheels transport the user from the first location to the second location when the exoskeleton is in the first position or is in the second position.

5. The postural lifting exoskeleton of claim 4, wherein the first frame, the second frame, the third frame, and the fourth frame are laser cut and mechanically formed, and wherein the first sliding mechanism and the second sliding mechanism use bronze bushings to enable ergonomic adjustments of the first portion and the second portion.

6. The postural lifting exoskeleton of claim 1, further comprising:

a four-point supporting belt and a leg belt; and a set of knee support components and a set of calf support components, wherein the set of knee support components and the set of calf support components provide protection and comfort to the user.

7. The postural lifting exoskeleton of claim 6, wherein the set of knee support components and the set of calf support components are operatively connected to the fourth frame, wherein the leg belt is affixed to the third frame, and wherein a first part of the four-point supporting belt is affixed to the first frame and a second part of the four-point supporting belt is affixed to the third frame.

8. The postural lifting exoskeleton of claim 6, wherein the user is allowed to vertically and horizontally adjust a position of the set of knee support components.

9. The postural lifting exoskeleton of claim 1, wherein the first CP comprises at least one selected from a group consisting of a joystick, a power on/off button, a speed increment button, a speed decrement button, a horn button, a speed indicator, a power supply charge indicator, and a power supply charger input.

10. The postural lifting exoskeleton of claim 1, further comprising:

a power supply, wherein the power supply is a rechargeable battery to power at least the set of EAs, the first CP, the second CP, and the third CP.

11. The postural lifting exoskeleton of claim 10, wherein a set of handles is affixed to the second frame in order to transport the user from a first location in an environment to a second location in the environment when the power supply does not provide power to a set of electric motors of a set of drive wheels.

12. The postural lifting exoskeleton of claim 1, wherein the second CP is a human-machine interface (HMI) module and the second CP enables at least anthropometric adjustments of the exoskeleton for different users.

13. The postural lifting exoskeleton of claim 12, wherein the anthropometric adjustments comprise at least one selected from a group consisting of backrest elevation adjustments, backrest angle adjustments, seat elevation adjustments, horizontal seating position adjustments, and adjustments to elevate the footplate.

14. The postural lifting exoskeleton of claim 12, wherein the second CP further enables managing the oscillatory movement of the footplate via a set of oscillation parameter settings comprising a number of oscillations per drive cycle, an oscillation angle, and an interval between drive cycles.

15. The postural lifting exoskeleton of claim 14, wherein the second CP comprises at least one selected from a group consisting of a plurality of navigation buttons, a power on/off button, an elevate button, and a display, wherein the power on/off button does not activate the first CP and the third CP, wherein the plurality of navigation buttons allows the user to navigate through different menus on the display, and wherein, in order to transfer the exoskeleton from the first position to the second position, the user sends the first request by pressing the elevate button.

16. The postural lifting exoskeleton of claim 1, further comprising:

an emergency button that is affixed to the third frame, wherein the emergency button allows the user to disable the exoskeleton instantly in an emergency situation.

17. The postural lifting exoskeleton of claim 1, further comprising:

a set of electric motors, a set of braking systems, a set of aluminum drive wheels with anti-puncture tires, a set of swivel wheels with steel forks, and a set of anti-fall wheels.

18. The postural lifting exoskeleton of claim 1, wherein the user is allowed to adjust a position of the first CP along the first armrest, and wherein the user is allowed to adjust a position of the second CP along the second armrest.

19. The postural lifting exoskeleton of claim 18, wherein the user is allowed to bring the first armrest from a third position to a fourth position, wherein the third position and the fourth position are perpendicular to each other, and wherein the user is allowed to bring the second armrest from the fourth position to the third position.

20. The postural lifting exoskeleton of claim 1, wherein a first height of the exoskeleton in the second position is higher than a second height of the exoskeleton in the first position.

* * * * *